United States Patent
Tsubata

(10) Patent No.: US 8,659,712 B2
(45) Date of Patent: Feb. 25, 2014

(54) ACTIVE MATRIX SUBSTRATE, METHOD FOR MANUFACTURING ACTIVE MATRIX SUBSTRATE, LIQUID CRYSTAL PANEL, METHOD FOR MANUFACTURING LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 385 days.

(21) Appl. No.: 13/123,718

(22) PCT Filed: Jul. 23, 2009

(86) PCT No.: PCT/JP2009/063207
§ 371 (c)(1),
(2), (4) Date: Apr. 12, 2011

(87) PCT Pub. No.: WO2010/067639
PCT Pub. Date: Jun. 17, 2010

(65) Prior Publication Data
US 2011/0194031 A1   Aug. 11, 2011

(30) Foreign Application Priority Data
Dec. 10, 2008   (JP) .................................. 2008-314685

(51) Int. Cl.
*G02F 1/1343*   (2006.01)
(52) U.S. Cl.
USPC ............................................. 349/38; 349/39
(58) Field of Classification Search
None
See application file for complete search history.

(56) References Cited

U.S. PATENT DOCUMENTS

| | | | |
|---|---|---|---|
| 5,343,216 A | 8/1994 | Katayama et al. | |
| 5,726,720 A * | 3/1998 | Watanabe et al. | 349/43 |
| 6,490,019 B2 * | 12/2002 | Lee et al. | 349/113 |
| 2001/0052889 A1 | 12/2001 | Fukunishi | |
| 2002/0036724 A1 * | 3/2002 | Ha | 349/38 |

(Continued)

FOREIGN PATENT DOCUMENTS

| | | |
|---|---|---|
| EP | 0 375 233 A2 | 6/1990 |
| EP | 0 421 386 A2 | 4/1991 |

(Continued)

OTHER PUBLICATIONS

Official Communication issued in International Patent Application No. PCT/JP2009/063207, mailed on Sep. 1, 2009.

(Continued)

*Primary Examiner* — Lucy Chien
(74) *Attorney, Agent, or Firm* — Keating & Bennett, LLP

(57) ABSTRACT

An active matrix substrate of the present invention for use in a liquid crystal panel includes a scanning signal line (16*x*), a data signal line (15*x*), and a transistor (12*a*) connected to the scanning signal line (16*x*) and the data signal line (15*x*), with first and second pixel electrodes (17*a* and 17*b*) provided in each pixel (101), one of the pixel electrodes (17*a*) being connected to the data signal line (15*x*) via the transistor (12*a*). The active matrix substrate includes first and second capacitor electrodes (37*a* and 38*a*) electrically connected to the pixel electrode (17*a*), capacitors being formed between the capacitor electrodes (37*a* and 38*a*) and the other pixel electrode (17*b*), respectively. This makes it possible to improve yields of manufacture of capacitively-coupled pixel-division type active matrix substrates and liquid crystal panels including the same.

20 Claims, 45 Drawing Sheets

(56) References Cited

U.S. PATENT DOCUMENTS

| | | |
|---|---|---|
| 2002/0058362 A1 | 5/2002 | Ohtani et al. |
| 2004/0125248 A1 | 7/2004 | Song |
| 2005/0162599 A1 | 7/2005 | Kurihara et al. |
| 2006/0023137 A1 | 2/2006 | Kamada et al. |
| 2006/0290827 A1 | 12/2006 | Kihara et al. |
| 2009/0009449 A1 | 1/2009 | Uchida et al. |
| 2010/0066937 A1* | 3/2010 | Yamashita et al. ............... 349/58 |

FOREIGN PATENT DOCUMENTS

| | | |
|---|---|---|
| EP | 0 438 138 A2 | 7/1991 |
| JP | 05-066415 A | 3/1993 |
| JP | 06-102537 A | 4/1994 |
| JP | 11-007046 A | 1/1999 |
| JP | 2006-039290 A | 2/2006 |
| JP | 2006-330634 A | 12/2006 |
| WO | 02/065203 A1 | 8/2002 |
| WO | 2007/091365 A1 | 8/2007 |

OTHER PUBLICATIONS

Official Communication issued in corresponding European Patent Application No. 09831745.6, mailed on May 4, 2012.

* cited by examiner

ACTIVE MATRIX SUBSTRATE, METHOD FOR MANUFACTURING ACTIVE MATRIX SUBSTRATE, LIQUID CRYSTAL PANEL, METHOD FOR MANUFACTURING LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to an active matrix substrate having a plurality of pixel electrodes provided in each pixel region and a liquid crystal display device (of a pixel-division type) employing the same.

BACKGROUND ART

In order to improve the dependence of the gamma characteristic of a liquid crystal display device on viewing angles (e.g., to suppress excess brightness and the like on the screen), a liquid crystal display (of a pixel-division type, e.g., see Patent Literature 1) has been proposed which has a plurality of subpixels provided in each pixel, which controls the subpixels so that they have different levels of luminance, and which displays a halftone by means of area coverage modulation of the subpixels.

As shown in FIG. 47, an active matrix substrate described in Patent Literature 1 has three pixel electrodes 121a to 121c arranged in each pixel region along a data signal line 115 and has a transistor 116 having its source electrode 116s leading to a contact electrode 117a, with the contact electrode 117a connected to a control electrode 118 via a drawing wire 119, with the control electrode 18 connected to a contact electrode 117b via a drawing wire 126, with the contact electrode 117a and the pixel electrode 121a connected to each other via a contact hole 120a, with the contact electrode 117b and the pixel electrode 121c connected to each other via a contact hole 120b, with the pixel electrode 121b, which is electrically floating, overlapping the control electrode 118 via an insulating layer, and with the pixel electrode 121b capacitively coupled to each of the pixel electrodes 121a to 121c (capacitively-coupled pixel-division type). Further, the active matrix substrate has a retention capacitor formed in an overlap section between the control electrode 118 and a capacitor wire 113. A liquid crystal display device employing such an active matrix substrate enables subpixels corresponding to the pixel electrodes 121a and 121c to serve as bright subpixels and enables a subpixel corresponding to the pixel electrode 121b to serve as a dark subpixel, and can display a halftone by means of area coverage modulation of the (two) bright subpixels and the (one) dark subpixel.

CITATION LIST

Patent Literature 1

Japanese Patent Application Publication, Tokukai, No. 2006-39290 (Publication Date: Feb. 9, 2006)

SUMMARY OF INVENTION

Technical Problem

However, if, in the active matrix substrate of FIG. 47, the control electrode 118 and the pixel electrode 121b are short-circuited, for example, the pixel electrode 121b will no longer be capacitively coupled to the pixel electrode 121a, although it is possible to avoid writing of a signal potential to the pixel electrode 121b from the data signal line by cutting off the drawing wire 119.

In this way, the conventional active matrix substrate is likely to have a defect in the subpixel (dark subpixel) corresponding to the pixel electrode 121b, thus posing a risk of reduction in yield.

In view of the foregoing problems, the present invention proposes capacitively-coupled pixel-division type active matrix substrates configured so that a yield thereof can be improved.

Solution to Problem

A present active matrix substrate includes a scanning signal line, a data signal line, and a transistor connected to the scanning signal line and the data signal line, with first and second pixel electrodes provided in each pixel region, the first pixel electrode being connected to the data signal line via the transistor, the active matrix substrate including first and second capacitor electrodes electrically connected to one of the first and second pixel electrodes, a capacitor being formed between the other one of the first and second pixel electrodes and the first capacitor electrode, a capacitor being formed between the other pixel electrode and the second pixel electrode.

The foregoing configuration is such that in a capacitively-coupled pixel-division type active matrix substrate, first and second pixel electrodes provided in each pixel region are connected to each other via two capacitors (coupling capacitors). Thus, even if there occurs a defect in one of the capacitors during the manufacturing process or the like, the first and second pixel electrodes can be kept capacitively coupled to each other by the other capacitor electrode. For example, even if the first capacitor electrode and the second pixel electrode are short-circuited in a configuration where the first capacitor electrode and the second capacitor electrode are electrically connected to the first pixel electrode with a capacitor formed between the first capacitor electrode and the second pixel electrode and a capacitor formed between the second capacitor electrode and the second pixel electrode, the first and second pixel electrodes can be capacitively coupled to each other by the capacitor (coupling capacitor) formed between the second capacitor electrode and the second pixel electrode, by cutting off the first capacitor electrode between the site of connection of the first capacitor electrode to the first pixel electrode and the short-circuited site. This makes it possible to increase yields of manufacture of the present active matrix substrate and a liquid crystal panel including the same.

The present active matrix substrate may also be configured such that one conducting electrode of the transistor, the first capacitor electrode, and the second capacitor electrode exist in one layer. This makes it possible to simplify the layer structure of the active matrix substrate and the manufacturing process.

The present active matrix substrate may also be configured such that at least part of the first capacitor electrode overlaps the other pixel electrode via an interlayer insulating film covering a channel of the transistor, and at least part of the second capacitor electrode overlaps the other pixel electrode via the interlayer insulating film.

The present active matrix substrate may also be configured such that: each of the first and second pixel electrodes has an outer periphery consisting of a plurality of sides; one of the sides of the first pixel electrode and one of the sides of the second pixel electrode are adjacent to each other; and each of the first and second pixel electrodes is disposed in such a way as to overlap a space between the two adjacent sides, the first pixel electrode, and the second pixel electrode.

The present active matrix substrate may also be configured such that: the transistor has one conducting electrode connected to the first pixel electrode via a contact hole, with the conducting electrode connected to the first capacitor electrode via a drawing wire drawn from the conducting electrode; and the first pixel electrode and the second capacitor electrode are connected to each other via a contact hole.

The present active matrix substrate may also be configured such that: the transistor has one conducting electrode connected to the first pixel electrode via a contact hole, with the first pixel electrode and the first capacitor electrode connected to each other via a contact hole; and the first pixel electrode and the second capacitor electrode are connected to each other via a contact hole.

The present active matrix substrate may also be configured such that: the transistor has one conducting electrode connected to the first pixel electrode via a contact hole; and the second pixel electrode and the first capacitor electrode are connected to each other via a contact hole, with the second pixel electrode and the second capacitor electrode connected to each other via a contact hole.

The present active matrix substrate may also be configured such that the first and second pixel electrode are arranged along a row-wise direction, it being assumed that the row-wise direction is a direction along which the scanning signal line extends.

The present active matrix substrate may also be configured such that as for two pixel regions that are adjacent to each other along the row-wise direction, the pixel electrode in one of the pixel regions and the second pixel electrode in the other pixel region are adjacent to each other along the row-wise direction.

The present active matrix substrate may also be configured such that the first pixel electrode surrounds the second pixel electrode.

The present active matrix substrate may also be configured such that the second pixel electrode surrounds the first pixel electrode.

The present active matrix substrate may also be configured to further include a retention capacitor wire that forms a capacitor with the first pixel electrode or an electric conductor electrically connected the first pixel electrode and forms a capacitor with the second pixel electrode or an electric conductor electrically connected the second pixel electrode. In this case, the present active matrix substrate may also be configured such that the retention capacitor wire extends along the same direction as the scanning signal line in such a way as to pass transversely across the center of the pixel region. Further, the present active matrix substrate may also be configured such that each of the first and second capacitor electrodes forms a capacitor with the retention capacitor wire.

The present active matrix substrate may also be configured such that the retention capacitor wire extends along the same direction as the scanning signal line in such a way as to pass transversely across the center of the pixel region.

The present active matrix substrate may also be configured such that each of the first and second capacitor electrodes forms a capacitor with the retention capacitor wire.

The present active matrix substrate may also be configured such that: the interlayer insulating film is composed of an inorganic insulating film and an organic insulating film that is thicker than the inorganic insulating film; and the interlayer insulating film has its organic insulating film removed in at least part of the interlayer insulating film that overlaps the first capacitor electrode and in at least part of the interlayer insulating film that overlaps the second capacitor electrode.

The present active matrix substrate may also be configured such that: the interlayer insulating film has a thin-film part, obtained by removing the organic insulating film, which includes a region that overlaps part of the first capacitor electrode and part of the second capacitor electrode; the first and second capacitor electrodes are disposed side by side along the direction along which the scanning signal line extends; and the first capacitor electrode straddles one side of the thin-film part, and the second capacitor electrode straddles a side opposite to that side.

Thus, even if the first and second capacitor electrodes are displaced along the row-wise direction in a configuration where coupling capacitors are formed between the first and second capacitor electrodes and the second pixel electrode, respectively, for example, the area of overlap between the first capacitor electrode and the second pixel electrode and the area of overlap between the second capacitor electrode and the second pixel electrode compensate for each other. This gives such an effect that the total capacitance of the two capacitors (coupling capacitors) is unlikely to change.

The present active matrix substrate may also be configured such that the thin-film part overlaps either the first or second pixel electrode.

Thus, in the case of a configuration where coupling capacitors are formed between the first and second capacitor electrodes and the second pixel electrode, respectively, for example, an effect of reducing the likelihood of the first and second capacitor electrodes and the second pixel electrode being short-circuited is obtained, in addition to the above effect.

The present active matrix substrate may also be configured such that a space between the first and second pixel electrodes functions as an alignment controlling structure.

The present active matrix substrate may also be configured such that: the first pixel electrode surrounds the second pixel electrode; the second pixel electrode has an outer periphery including two sides that are parallel to each other, and the first pixel electrode has an outer periphery including a side facing one of the two sides across a first space and a side facing the other side across a second space; the first capacitor electrode is disposed in such a way as to overlap the first pixel electrode, the first space, and the second pixel electrode, and the second capacitor electrode is disposed in such a way as to overlap the second pixel electrode, the second space, and the first pixel electrode.

Thus, even if the alignment of the first and second pixel electrodes is displaced along a direction orthogonal to the space with respect to the first and second capacitor electrodes, the area of overlap between the first capacitor electrode and the second pixel electrode and the area of overlap between the second capacitor electrode and the second pixel electrode compensate for each other. This gives such a merit that the total capacitance of the two capacitors (coupling capacitors) is unlikely to change. In this case, the first capacitor electrode and the second capacitor electrode can be configured to be line-symmetrical with each other about an axis represented by a line which is parallel to the first and second spaces and which passes centrally in between the two spaces.

A present active matrix substrate includes a scanning signal line, a data signal line, and a transistor connected to the scanning signal line and the data signal line, with first, second, and third pixel electrodes provided in each pixel region, the first pixel electrode being connected to the data signal line via the transistor, the third pixel electrode being electrically connected to the first pixel electrode, the active matrix substrate including: a first capacitor electrode electrically connected to the first pixel electrode; and a second capacitor electrode electrically connected to the third pixel electrode, a capacitor being formed between the first capacitor electrode and the second pixel electrode, a capacitor being formed between the second capacitor electrode and the second pixel electrode.

A present active matrix substrate includes a scanning signal line, a data signal line, and a transistor connected to the scanning signal line and the data signal line, with first, second, and third pixel electrodes provided in each pixel region, the first pixel electrode being connected to the data signal line via the transistor, the third pixel electrode being electrically connected to the first pixel electrode, the active matrix substrate including first and second capacitor electrodes electrically connected to the second pixel electrode, a capacitor being formed between the first capacitor electrode and the first pixel electrode, a capacitor being formed between the second capacitor electrode and the third pixel electrode.

A present active matrix substrate includes a scanning signal line, a data signal line, and a transistor connected to the scanning signal line and the data signal line, with first, second, and third pixel electrodes provided in each pixel region, the second pixel electrode being connected to the data signal line via the transistor, the active matrix substrate including first and second capacitor electrodes electrically connected to the second pixel electrode, a capacitor being formed between the first capacitor electrode and the first pixel electrode, a capacitor being formed between the second capacitor electrode and the third pixel electrode.

A present active matrix substrate includes a scanning signal line, a data signal line, and a transistor connected to the scanning signal line and the data signal line, with first, second, and third pixel electrodes provided in each pixel region, the second pixel electrode being connected to the data signal line via the transistor, the active matrix substrate including: a first capacitor electrode electrically connected to the first pixel electrode; and a second capacitor electrode electrically connected to the third pixel electrode, a capacitor being formed between the first capacitor electrode and the second pixel electrode, a capacitor being formed between the second capacitor electrode and the second pixel electrode.

The present active matrix substrate may also be configured to further include first and second retention capacitor wires in the pixel region, wherein the first capacitor electrode forms a capacitor with the first retention capacitor wire and the second capacitor electrode forms a capacitor with the second retention capacitor wire.

A present method for manufacturing an active matrix substrate is a method for manufacturing an active matrix substrate including a scanning signal line, a data signal line, and a transistor connected to the scanning signal line and the data signal line, with first and second pixel electrodes provided in each pixel region, the first pixel electrode being connected to the data signal line via the transistor, the method including the steps of: (i) forming a first capacitor electrode that is electrically connected to one of the first and second pixel electrodes and forms a capacitor with the other pixel electrode and a second capacitor electrode that is connected the one pixel electrode and forms a capacitor with the other pixel electrode; (ii) detecting at least either a short circuit between the first capacitor electrode and the other pixel electrode or a short circuit between the second capacitor electrode and the other pixel electrode; and (iii) if a short circuit between the first capacitor electrode and the other pixel electrode is detected, cutting off the first capacitor electrode between the site of connection of the first capacitor electrode to the one pixel electrode and the short-circuited site or, if a short circuit between the second capacitor electrode and the other pixel electrode is detected, cutting off the second capacitor electrode between the site of connection of the second capacitor electrode to the one pixel electrode and the short-circuited site.

A present method for manufacturing an active matrix substrate is a method for manufacturing an active matrix substrate including a scanning signal line, a data signal line, and a transistor connected to the scanning signal line and the data signal line, with first and second pixel electrodes provided in each pixel region, the first pixel electrode being connected to the data signal line via the transistor, the method including the steps of: (i) forming a first capacitor electrode that is electrically connected to one of the first and second pixel electrodes and forms capacitors with the other pixel electrode and a retention capacitor wire and a second capacitor electrode that is electrically connected to the one pixel electrode and forms capacitors with the other pixel electrode and the retention capacitor wire; (ii) detecting at least a short circuit between the first capacitor electrode and the other pixel electrode, a short circuit between the second capacitor electrode and the other pixel electrode, a short circuit between the first capacitor electrode and the retention capacitor wire, or a short circuit between the second capacitor electrode and the retention capacitor wire; and (iii) if a short circuit between the first capacitor electrode and the other pixel electrode or a short circuit between the first capacitor electrode and the retention capacitor wire is detected, cutting off the first capacitor electrode between the site of connection of the first capacitor electrode to the one pixel electrode and the short-circuited site or, if a short circuit between the second capacitor electrode and the other pixel electrode or a short circuit between the second capacitor electrode and the retention capacitor wire is detected, cutting off the second capacitor electrode between the site of connection of the second capacitor electrode to the one pixel electrode and the short-circuited site.

A present method for manufacturing an active matrix substrate is a method for manufacturing an active matrix substrate including a scanning signal line, a data signal line, and a transistor connected to the scanning signal line and the data signal line, with first and second pixel electrodes provided in each pixel, the first pixel electrode being connected to the data signal line via the transistor, the method including the steps of: (i) forming a first capacitor electrode that is electrically connected to one of the first and second pixel electrodes and forms a capacitor with the other pixel electrode and a second capacitor electrode that is connected the one pixel electrode and forms a capacitor with the other pixel electrode; (ii) detecting at least either a short circuit between the first capacitor electrode and the other pixel electrode or a short circuit between the second capacitor electrode and the other pixel electrode; and (iii) if a short circuit between the first capacitor electrode and the other pixel electrode is detected, cutting off the first capacitor electrode between the site of connection of the first capacitor electrode to the one pixel electrode and the short-circuited site or, if a short circuit between the second capacitor electrode and the other pixel electrode is detected, cutting off the second capacitor electrode between the site of connection of the second capacitor electrode to the one pixel electrode and the short-circuited site.

A present method for manufacturing an active matrix substrate is a method for manufacturing an active matrix substrate including a scanning signal line, a data signal line, and a transistor connected to the scanning signal line and the data signal line, with first and second pixel electrodes provided in each pixel region, the first pixel electrode being connected to the data signal line via the transistor, the method including the steps of: (i) forming a first capacitor electrode that is electrically connected to one of the first and second pixel electrodes and forms capacitors with the other pixel electrode and a retention capacitor wire and a second capacitor electrode that is electrically connected to the one pixel electrode and forms capacitors with the other pixel electrode and the retention capacitor wire; (ii) detecting at least a short circuit between the first capacitor electrode and the other pixel electrode, a short circuit between the second capacitor electrode and the other pixel electrode, a short circuit between the first capacitor electrode and the retention capacitor wire, or a short circuit between the second capacitor electrode and the retention capacitor wire; and (iii) if a short circuit between the first capacitor electrode and the other pixel electrode or a short circuit between the first capacitor electrode and the retention capacitor wire is detected, cutting off the first capacitor electrode between the site of connection of the first capacitor electrode to the one pixel electrode and the short-circuited site or, if a short circuit between the second capacitor electrode and the other pixel electrode or a short circuit between the second capacitor electrode and the retention capacitor wire is detected, cutting off the second capacitor electrode between the site of connection of the second capacitor electrode to the one pixel electrode and the short-circuited site.

The present liquid crystal panel includes such an active matrix substrate as described above. Further, the present liquid crystal display unit includes such a liquid crystal panel and a driver. Further, the present liquid crystal display device includes such a liquid crystal display unit and a light source device. Further, the present television receiver includes such a liquid crystal display device and a tuner section that receives a television broadcast.

Advantageous Effects of Invention

As described above, the present invention a capacitively-coupled pixel-division type active matrix substrate in which first and second pixel electrodes provided in each pixel region are connected to each other via two parallel capacitors (coupling capacitors). This allows the first and second pixel electrodes to, even if there occurs a defect in one of the capacitors during the manufacturing process or the like, be kept capacitively coupled to each other by the other capacitor electrode, thus increasing a yield of manufacture of the present active matrix substrate.

DESCRIPTION OF EMBODIMENTS

Examples of embodiments according to the present invention are described below with reference to the drawings. For convenience of explanation, let it be assumed below that the term "row-wise direction" refers to the direction along which a scanning signal line extends. However, it goes without saying that in the state of use (viewing) of a liquid crystal display device including the present liquid crystal panel (or an active matrix substrate for use therein), the scanning signal may extend along a transverse direction or along a longitudinal direction. It should also be noted that an alignment controlling structure that is provided to the liquid crystal panel is omitted appropriately from the descriptions.

Embodiment 1

Figure 1:
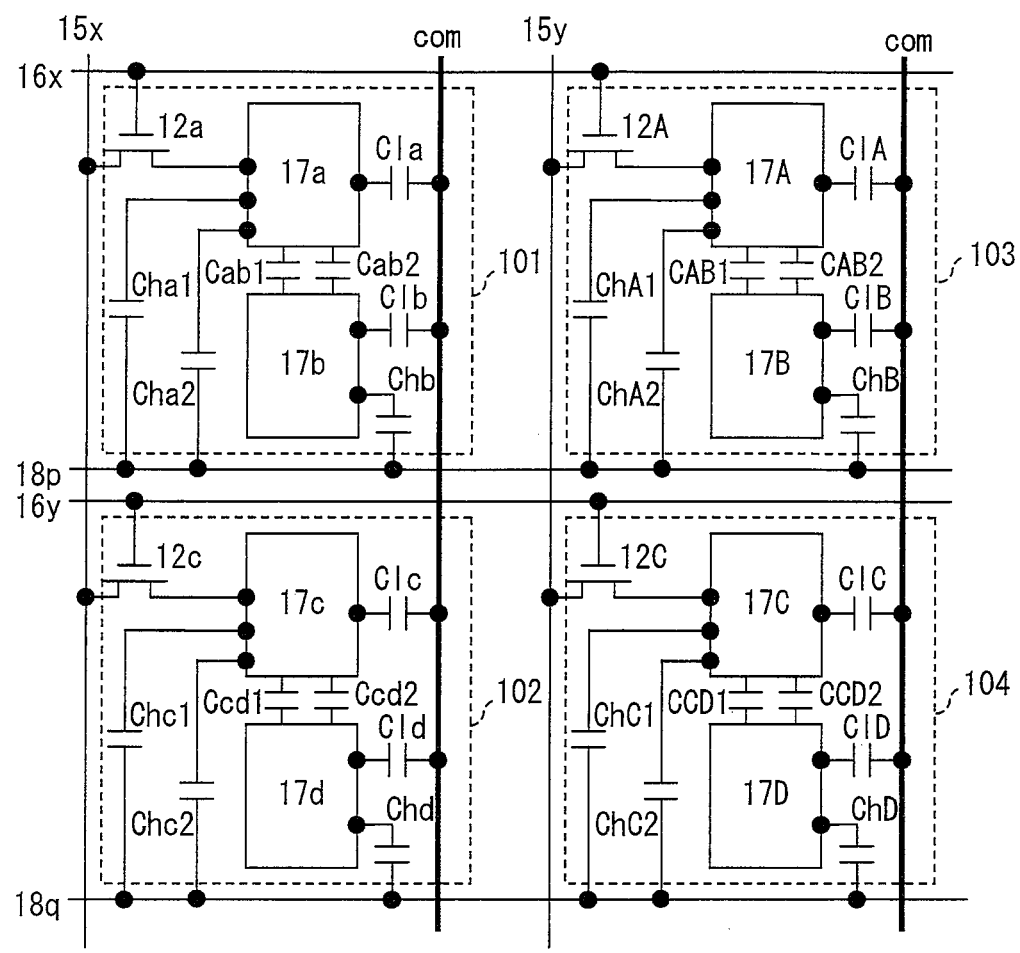
FIG. 1 is a circuit diagram showing the configuration of a liquid crystal panel according to Embodiment 1.

FIG. 1 is an equivalent circuit diagram showing part of a liquid crystal panel according to Embodiment 1. As shown in FIG. 1, the present liquid crystal panel includes: data signal lines ($15x$ and $15y$) extending along a column-wise direction (which corresponds to the vertical direction in the drawing); scanning signal lines ($16x$ and $16y$) extending along a row-wise direction (which corresponds to the horizontal direction in the drawing); pixels (101 to 104) arranged along the row-wise and column-wise directions; retention capacitor wires ($18p$ and $18q$); and a common electrode (counter electrode) com, with the pixels being identical in structure to one another. It should be noted that a column of pixels including the pixels 101 and 102 and a column of pixels including the pixels 103 and 104 are adjacent to each other, and that a row of pixels including the pixels 101 and 103 and a row of pixels including the pixels 102 and 104 are adjacent to each other.

In the present liquid crystal panel, there are provided one data signal line and one scanning signal line in correspondence with each pixel. Each pixel has two pixel electrodes provided therein, with the two pixel electrodes arranged along the column-wise direction. Specifically, the pixel 101 has two pixel electrodes $17a$ and $17b$ provided therein, and the pixel 102 has two pixel electrodes $17c$ and $17d$ provided therein, with the pixel electrodes $17a$, $17b$, $17c$, and $17d$ arranged in a line. Similarly, the pixel 103 has two pixel electrodes 17A and 17B provided therein, and the pixel 104 has two pixel electrodes 17C and 17D provided therein, with the pixel electrodes 17A, 17B, 17C, and 17D arranged in a line. Moreover, the pixel electrodes $17a$, $17b$, $17c$, and $17d$ are adjacent to the pixel electrodes 17A, 17B, 17C, and 17D along the row-wise direction, respectively. Further, the retention capacitor wire $18p$ passes transversely across each of the pixels 101 and 103, and the retention capacitor wire $18q$ passes transversely across each of the pixels 102 and 104.

In the pixel 101, the pixel electrodes $17a$ and $17b$ are connected to each other via coupling capacitors Cab1 and Cab2 arranged in parallel with each other, and the pixel electrode $17a$ is connected to the data signal line $15x$ via a transistor $12a$ connected to the scanning signal line $16x$, with retention capacitors Cha (Cha1 and Cha2) formed between the pixel electrode $17a$ and the retention capacitor wire $18p$, with a retention capacitor Chb formed between the pixel electrode $17b$ and the retention capacitor wire $18p$, with a liquid crystal capacitor C1$a$ formed between the pixel electrode $17a$ and the common electrode com, and with a liquid crystal capacitor C1$b$ formed between the pixel electrode $17b$ and the common electrode com.

Further, in the pixel 102, which is adjacent to the pixel 101 along the column-wise direction, the pixel electrodes $17c$ and $17d$ are connected to each other via coupling capacitors Ccb1 and Ccb2 arranged in parallel with each other, and the pixel electrode $17c$ is connected to the data signal line $15x$ via a transistor $12c$ connected to the scanning signal line $16y$, with retention capacitors Chc (Chc1 and Chc2) formed between the pixel electrode $17c$ and the retention capacitor wire $18q$, with a retention capacitor Chd formed between the pixel electrode $17d$ and the retention capacitor wire $18q$, with a liquid crystal capacitor C1$c$ formed between the pixel electrode $17c$ and the common electrode com, and with a liquid crystal capacitor C1$d$ formed between the pixel electrode $17d$ and the common electrode com.

Further, in the pixel 103, which is adjacent to the pixel 101 along the row-wise direction, the pixel electrodes 17A and 17B are connected to each other via coupling capacitors CAB1 and CAB2 arranged in parallel with each other, and the pixel electrode 17A is connected to the data signal line $15y$ via a transistor 12A connected to the scanning signal line $16x$, with retention capacitors ChA (ChA1 and ChA2) formed between the pixel electrode 17A and the retention capacitor wire $18p$, with a retention capacitor ChB formed between the pixel electrode 17B and the retention capacitor wire $18p$, with a liquid crystal capacitor C1A formed between the pixel electrode 17A and the common electrode com, and with a liquid crystal capacitor C1B formed between the pixel electrode 17B and the common electrode com.

In a liquid crystal display device including the present liquid crystal panel, sequential scanning is carried out, whereby the scanning signal lines $16x$ and $16y$ are selected in sequence. For example, when the scanning signal line $16x$ is selected, the pixel electrode $17a$ is connected to the data signal line $15x$ (via the transistor $12a$), and the pixel electrodes $17a$ and $17b$ are capacitively coupled to each other via the coupling capacitors Cab1 and Cab2. Therefore, Vb=Va×$\{(C1+C2)/(C1+Ch+C1+C2)\}$, where C1 is equal to the value of capacitance of C1$a$ and to the value of capacitance of C1$b$, Ch is equal to the value of capacitance of Cha and to the value of capacitance of Chb, C1 is equal to the value of capacitance of Cab1, C2 is equal to the value of capacitance of Cab2, Va is the potential that the pixel electrode $17a$ takes on after the transistor $12a$ turns OFF, and Vb is the potential that the pixel electrode $17b$ takes on after the transistor $12b$ turns OFF. That is, |Va|≥|Vb| (where, for example, |Va| means the difference in potential between Va and Vcom, which is equal to the potential of com). Consequently, when a halftone is displayed, the subpixel including the pixel electrode $17a$ serves as a bright subpixel, and the subpixel including the pixel electrode $17b$ serves as a dark subpixel, so that a display can be carried out by means of area coverage modulation of the bright and dark subpixels. This makes it possible to enhance the viewing angle characteristics of the liquid crystal display device.

Figure 2:
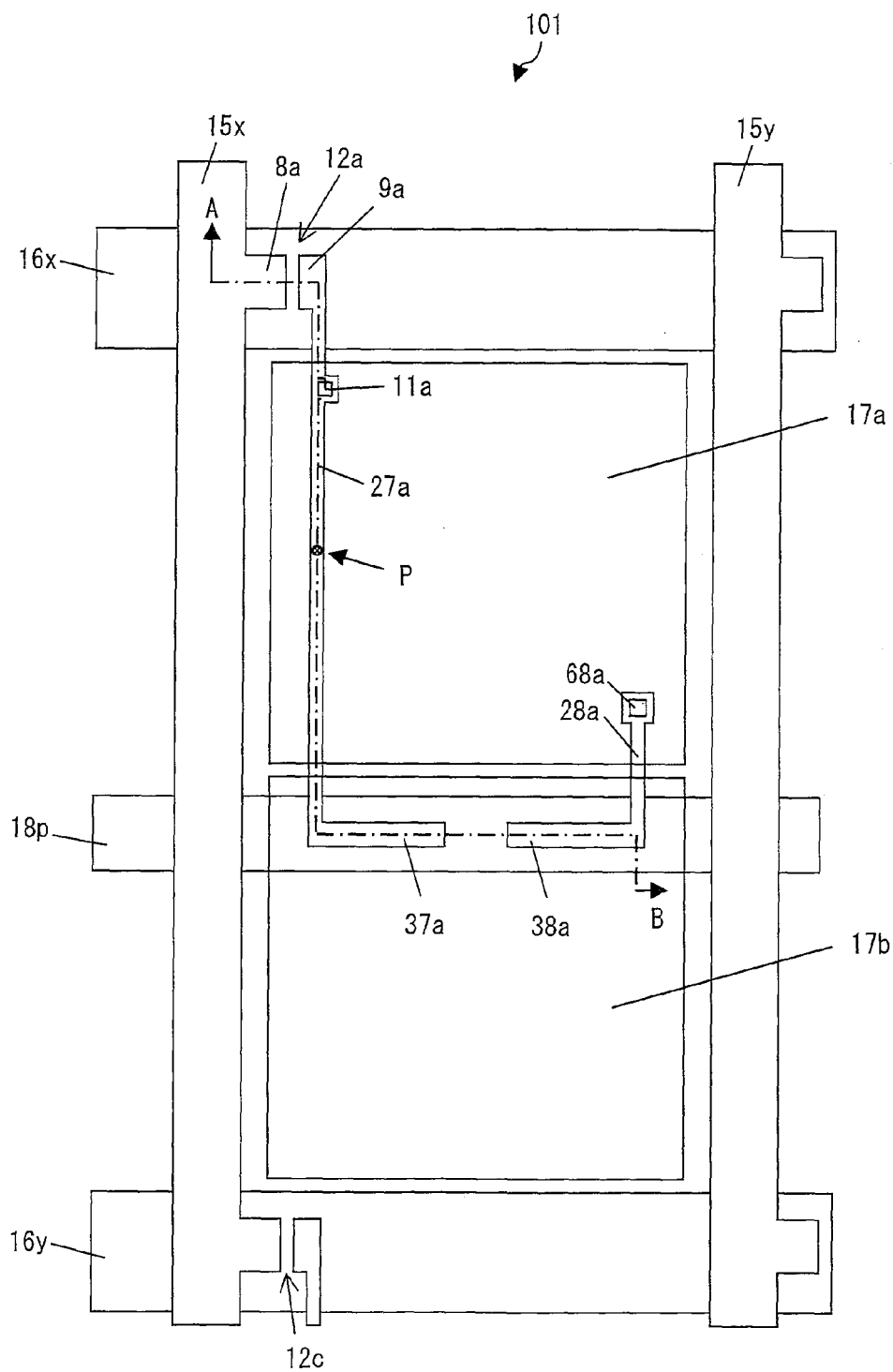
FIG. 2 is a plan view showing a specific example of the liquid crystal panel of FIG. 1.

FIG. 2 shows a specific example of the pixel 101 of FIG. 1. As shown in FIG. 2, the transistor 12a is disposed near an intersection between the data signal line 15x and the scanning signal line 16x. In a pixel region defined by the two signal lines (15x and 16x), the pixel electrodes 17a and 17b, both of which are rectangular, are arranged along the column-wise direction. The first pixel electrode has four outer peripheral sides, one of which is adjacent to one of the four outer peripheral sides of the second pixel electrodes. The retention capacitor wire 18p, which extends along the row-wise direction, is disposed in such a way as to overlap the pixel electrode 17b. Moreover, there are provided capacitor electrodes 37a and 38a in such a way as to overlap the retention capacitor wire 18p and the pixel electrode 17b.

More specifically, the capacitor electrode 37a extends along the same direction as the direction along which the retention capacitor wire 18p extends, and overlaps the retention capacitor wire 18p and the pixel electrode 17b. The capacitor electrode 38a, disposed side by side with the capacitor electrode 37a along the row-wise direction (which corresponds to the direction along which the retention capacitor wire 18p extends), extends along the same direction as the direction along which the retention capacitor wire 18p extends, and overlaps the retention capacitor wire 18p and the pixel electrode 17b.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a leads to the capacitor electrode 37a, which exists in the same layer, and is connected to the pixel electrode 17a via a contact hole 11a, and the capacitor electrode 37a overlaps the pixel electrode 17b via an interlayer insulating film, with the coupling capacitor Cab1 (see FIG. 1) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b via the interlayer insulting film, with the coupling capacitor Cab2 (see FIG. 1) between the pixel electrodes 17a and 17b formed in the overlap section between the capacitor electrode 38a and the pixel electrode 17b. Furthermore, the capacitor electrode 37a overlaps the retention capacitor wire 18p via a gate insulating film, with the retention capacitor Cha1 (see FIG. 1) formed in the overlap section between the capacitor electrode 37a and the retention capacitor wire 18p, and the capacitor electrode 38a overlaps the retention capacitor wire 18p via the gate insulating film, with the retention capacitor Cha2 (see FIG. 1) formed in the overlap section between the capacitor electrode 38a and the retention capacitor wire 18p. Moreover, the pixel electrode 17b and the retention capacitor wire 18p overlap each other via the interlayer insulating film and the gate insulating film, with the retention capacitor Chb (see FIG. 1) formed in the overlap section between the pixel electrode 17b and the retention capacitor wire 18p.

Figure 3:
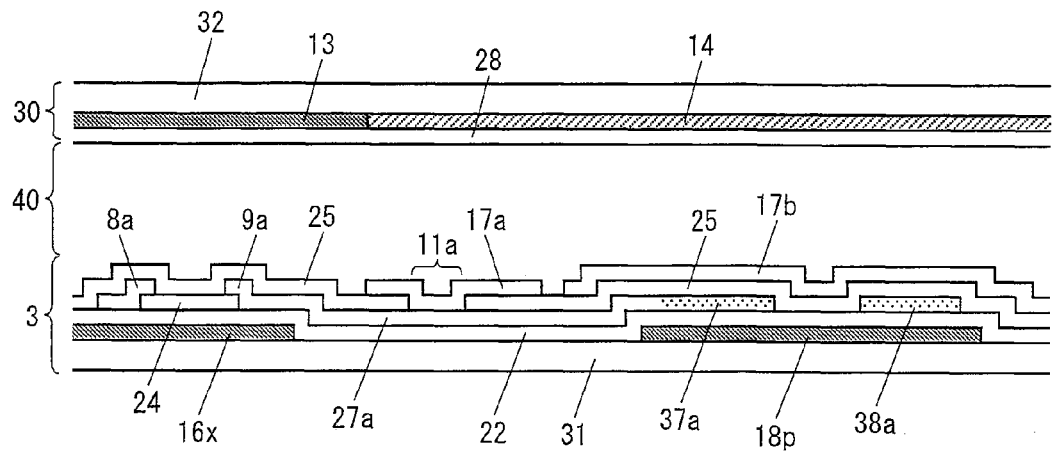
FIG. 3 is a cross-sectional view taken along arrows A-B in FIG. 2.

FIG. 3 is a cross-sectional view taken along arrows A-B in FIG. 2. As shown in FIG. 3, the present liquid crystal panel includes: an active matrix substrate 3, a color filter substrate 30 opposed to the active matrix substrate 3; and a liquid crystal layer 40 disposed between the two substrates (3 and 30).

The active matrix substrate 3 includes a glass substrate 31. Formed on the glass substrate 31 are the scanning signal line 16x and the retention capacitor wire 18p, with an inorganic insulating film 22 formed in such a way as to cover the scanning signal line 16x, the retention capacitor wire 18p, and the glass substrate 31. Formed on the inorganic insulating layer 22 are semiconductor layers 24 (an i layer and an n+ layer), the source and drain electrodes 8a and 9a, which are in contact with the n+ layer, the drain drawing wire 27a, and the capacitor electrodes 37a and 38a, with an inorganic interlayer insulating film 25 formed in such a way as to cover the semiconductor layers 24, the source and drain electrodes 8a and 9a, the drain drawing wire 27a, the capacitor electrodes 37a and 38a, and the inorganic insulating layer 22. Formed on the inorganic interlayer insulating film 25 are the pixel electrodes 17a and 17b, with an alignment film (not illustrated) further formed in such a way as to cover these (pixel electrodes 17a and 17b). It should be noted here that the contact hole 11a goes through the inorganic interlayer insulating film 25, thereby connecting the pixel electrode 17a and the drain drawing wire 27a to each other. Similarly, the contact hole (not illustrated) goes through the inorganic interlayer insulating film 25, thereby connecting the pixel electrode 17a and the capacitor electrode 38a to each other. Further, the capacitor electrode 37a, which leads to the drain drawing wire 27a in the same layer, overlaps the pixel electrode 17b via the inorganic interlayer insulating film 25, whereby the coupling capacitor Cab1 (see FIG. 1) is formed; and the capacitor electrode 38a overlaps the pixel electrode 17b via the inorganic interlayer insulating film 25, whereby the coupling capacitor Cab2 (see FIG. 1) is formed. Further, the capacitor electrode 37a overlaps the retention capacitor wire 18p via the inorganic gate insulating film 22, whereby the retention capacitor Cha1 (see FIG. 1) is formed; and the capacitor electrode 38a overlaps the retention capacitor wire 18p via the inorganic gate insulating film 22, whereby the retention capacitor Cha2 (see FIG. 1) is formed. Further, the pixel electrode 17b and the retention capacitor wire 18p overlap each other via the inorganic interlayer insulating film 25 and the inorganic gate insulating film 22, whereby the retention capacitor Chb (see FIG. 1) is formed.

Meanwhile, the color filter substrate 30 includes: a glass substrate 32; a colored layer 14 formed on the glass substrate 14; a common electrode (com) 28 formed on the colored layer 14; and an alignment film (not illustrated) formed in such a way as to cover the common electrode (com) 28.

Figure 5:
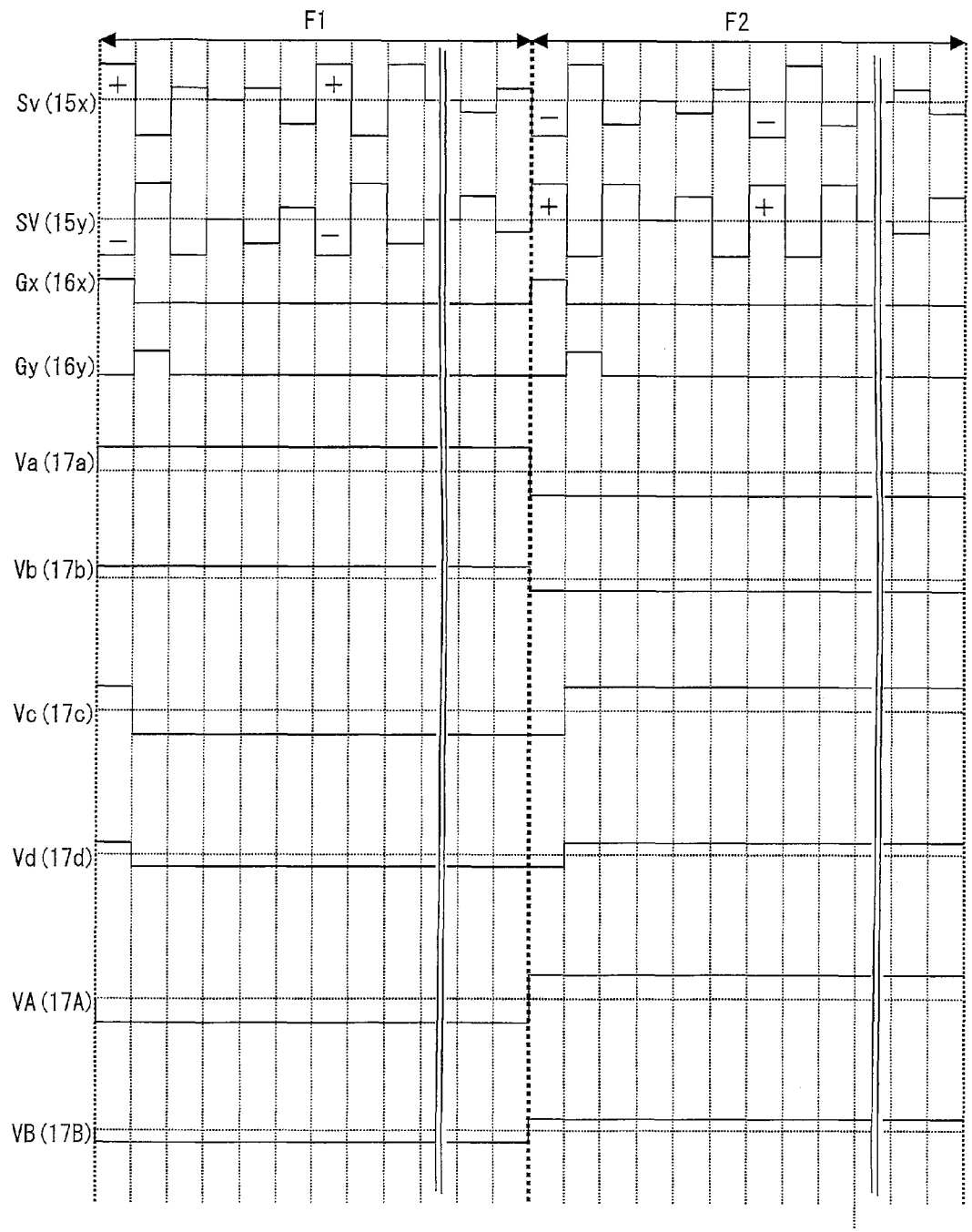
FIG. 5 is a timing chart showing a method for driving a liquid crystal display device including the liquid crystal panel of FIG. 1.

FIG. 5 is a timing chart showing a method for driving the present liquid crystal display device (liquid crystal display device of the normally black mode) including the liquid crystal panel shown in FIGS. 1 and 2. It should be noted that Sv and SV denote signal potentials that are supplied to two adjacent data signal lines (e.g., 15x and 15y), respectively; that Gx and Gy denote gate-on-pulse signals that are supplied to the scanning signal lines 16x and 16y, respectively; and that Va, Vb, VA, VB, Vc, and Vd denote the potentials of the pixel electrodes 17a, 17b, 17A, 17B, 17c, and 17d, respectively.

According to this driving method, as shown in FIG. 5, the scanning signal lines are selected in sequence, and the polarities of signal potentials that are supplied to the data signal lines are reversed every single horizontal scanning period (1H). Also, the polarities of signal potentials that are supplied during the same horizontal scanning periods of the respective frames are reversed every single frame, and during an identical horizontal scanning period, signal potentials opposite in polarities are supplied to two adjacent data signal lines.

Figure 6:
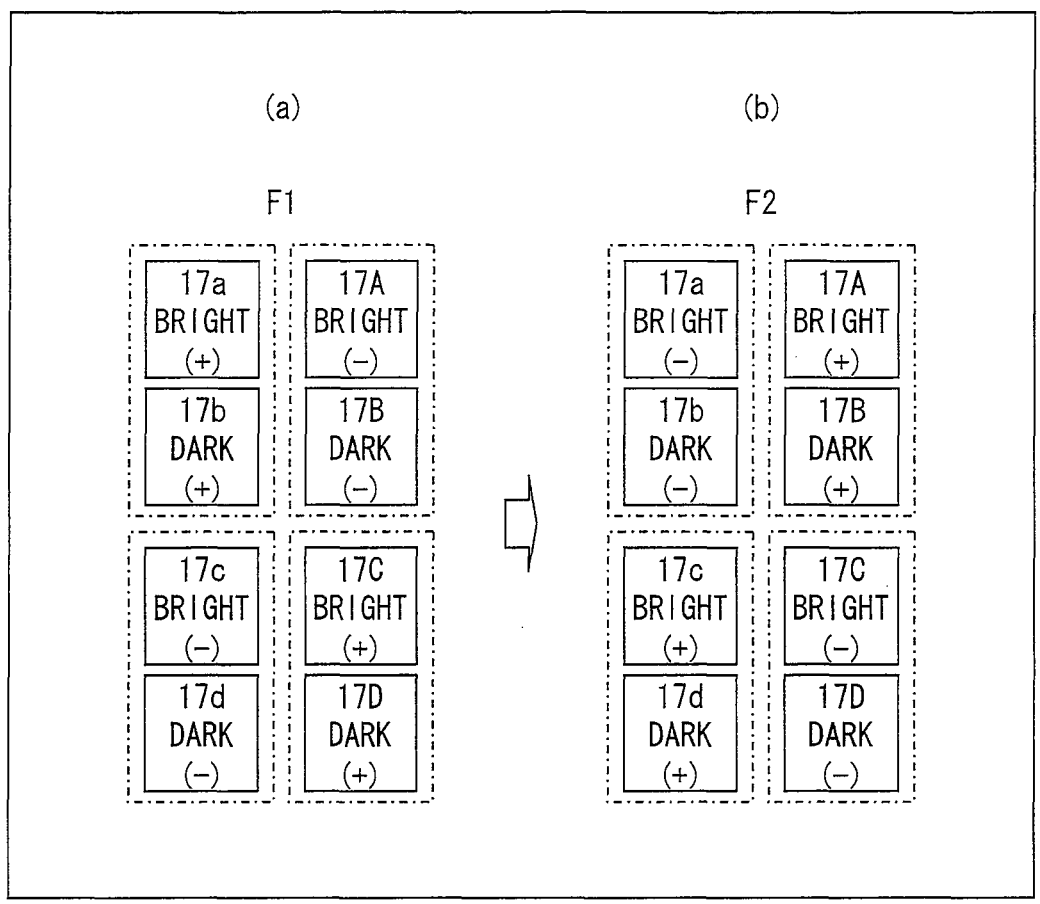
FIG. 6 is a schematic view showing the state of a display in each frame in the case of use of the driving method of FIG. 5.

Take two successive frames F1 and F2 as a specific example. In F1, the scanning signal lines are selected in sequence (e.g., the scanning signal lines 16x and 16y are selected in this order), and one of the two adjacent data signal lines (e.g., the data signal line 15x) is supplied with a signal potential of positive polarity during the first horizontal scanning period (e.g., including a period of writing to the pixel electrode 17a) and with a signal potential of negative polarity during the second horizontal scanning period (e.g., including a period of writing to the pixel electrode 17c), while the other one of the two data signal lines (e.g., the data signal line 15y) is supplied with a signal potential of negative polarity during the first horizontal scanning period (e.g., including a period of writing to the pixel electrode 17A) and with a signal potential of positive polarity during the second horizontal scanning period (e.g., including a period of writing to the pixel electrode 17C). This gives $|Va|\geq|Vb|$, $|Vc|\geq|Vd|$, and $|VA|\geq|VB|$ as shown in FIG. 5, with the result that the subpixel including the pixel electrode 17a (positive polarity) serves as a bright subpixel (hereinafter abbreviated as "bright"), that the subpixel including the pixel electrode 17b (positive polarity) serves as a dark subpixel (hereinafter abbreviated as "dark"), that the subpixel including the pixel electrode 17c (negative polarity) serves as "bright", that the subpixel including the pixel electrode 17d (negative polarity) serves as "dark", that the subpixel including the pixel electrode 17A (negative polarity) serves as "bright", and that the subpixel including the pixel electrode 17B (negative polarity) serves as "dark". As a whole, the subpixels look as shown in (a) of FIG. 6.

Further, in F2, the scanning signal lines are selected in sequence (e.g., the scanning signal lines 16x and 16y are selected in this order), and one of the two adjacent data signal lines (e.g., the data signal line 15x) is supplied with a signal potential of negative polarity during the first horizontal scanning period (e.g., including a period of writing to the pixel electrode 17a) and with a signal potential of positive polarity during the second horizontal scanning period (e.g., including a period of writing to the pixel electrode 17c), while the other one of the two data signal lines (e.g., the data signal line 15y) is supplied with a signal potential of positive polarity during the first horizontal scanning period (e.g., including a period of writing to the pixel electrode 17A) and with a signal potential of negative polarity during the second horizontal scanning period (e.g., including a period of writing to the pixel electrode 17C). This gives $|Va|\geq|Vb|$, $|Vc|\geq|Vd|$, and $|VA|\geq|VB|$ as shown in FIG. 5, with the result that the subpixel including the pixel electrode 17a (negative) serves as "bright", that the subpixel including the pixel electrode 17b (negative) serves as "dark", that the subpixel including the pixel electrode 17c (positive) serves as "bright", that the subpixel including the pixel electrode 17d (positive) serves as "dark", that the subpixel including the pixel electrode 17A (positive) serves as "bright", and that the subpixel including the pixel electrode 17B (positive) serves as "dark". As a whole, the subpixels look as shown in (b) of FIG. 6.

Figure 7:
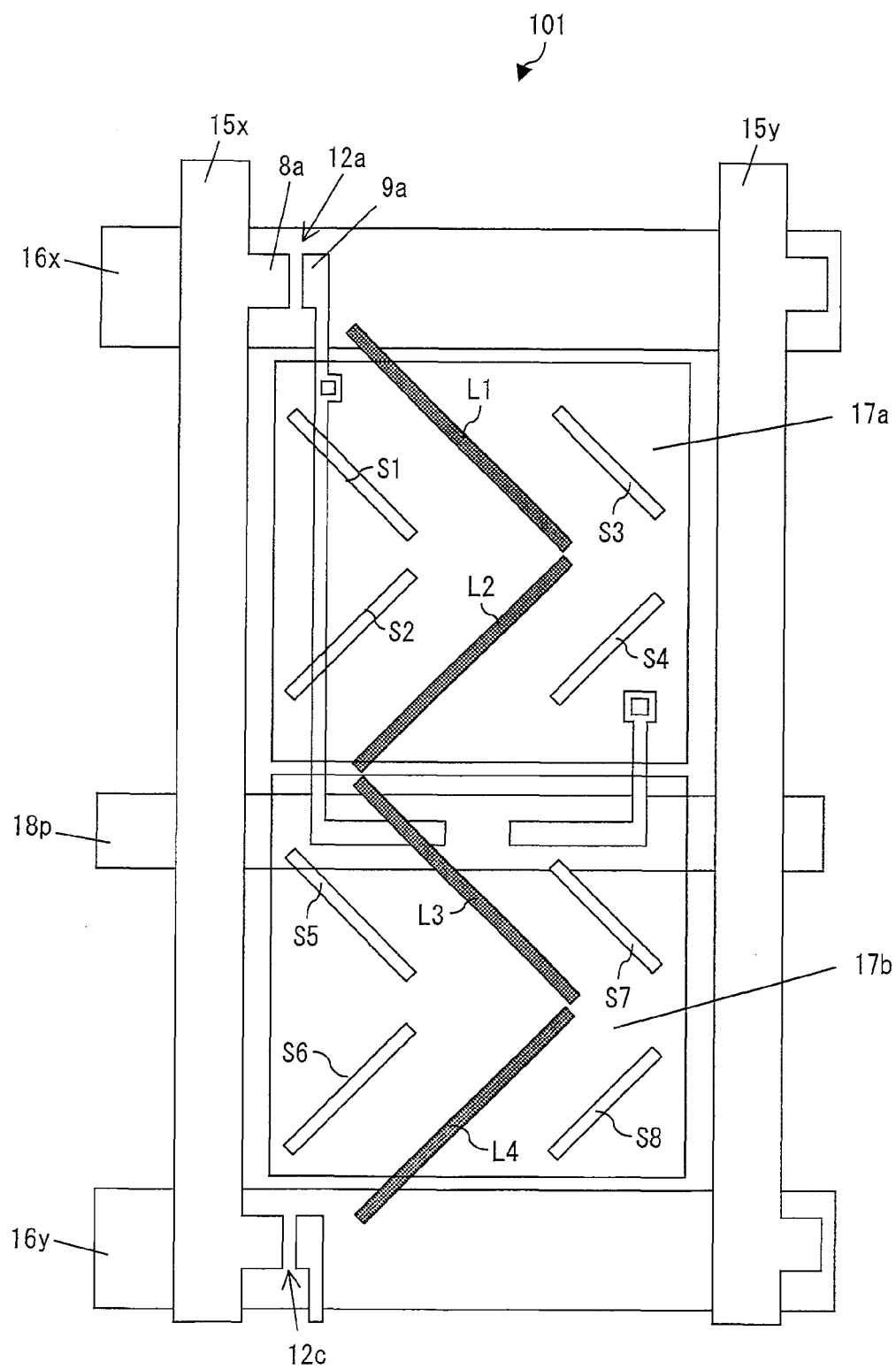
FIG. 7 is a plan view showing another specific example of the liquid crystal panel shown in FIG. 1.

It should be noted that FIG. 2 omits to show an alignment controlling structure. However, in a liquid crystal panel of an MVA (multidomain vertical alignment) type, for example, the pixel electrode 17a is provided with alignment controlling slits S1 to S4, with alignment controlling ribs L1 and L2 provided in that part of the color filter substrate which corresponds to the pixel electrode 17a, and the pixel electrode 17b is provided with alignment controlling slits S5 to S8, with alignment controlling ribs L3 and L4 provided in that part of the color filter substrate which corresponds to the pixel electrode 17b, as shown in FIG. 7, for example. Instead of such alignment controlling ribs being provided, alignment controlling slits may be provided in the common electrode of the color filter substrate.

In the liquid crystal panel of FIG. 2, the pixel electrodes 17a and 17b are connected (capacitively coupled) to each other via the two parallel coupling capacitors (Cab1 and Cab2). Therefore, even if the drain drawing wire 27a is cut off at P in FIG. 2 (during the manufacturing process or the like), for example, the pixel electrodes 17a and 17b can be kept capacitively coupled to each other by the capacitor electrode 38a. Alternatively, if the capacitor electrode 37a and the retention capacitor wire 18p or the pixel electrode 17b are short-circuited (during the manufacturing process or the like), the pixel electrodes 17a and 17b can be kept capacitively coupled to each other by carrying out a correcting step of either cutting off the drain drawing wire 27a at a point subsequent to the contact hole 11a, or cutting off the capacitor electrode 37a with a laser between the site of connection of the capacitor electrode 37a to the pixel electrode 17a and the short-circuited site. Alternatively, if the capacitor electrode 38a and the retention capacitor wire 18p or the pixel electrode 17b are short-circuited, the capacitor electrode 38a needs only be cut off with a laser between the contact hole 68a and the short-circuited site.

Figure 8:
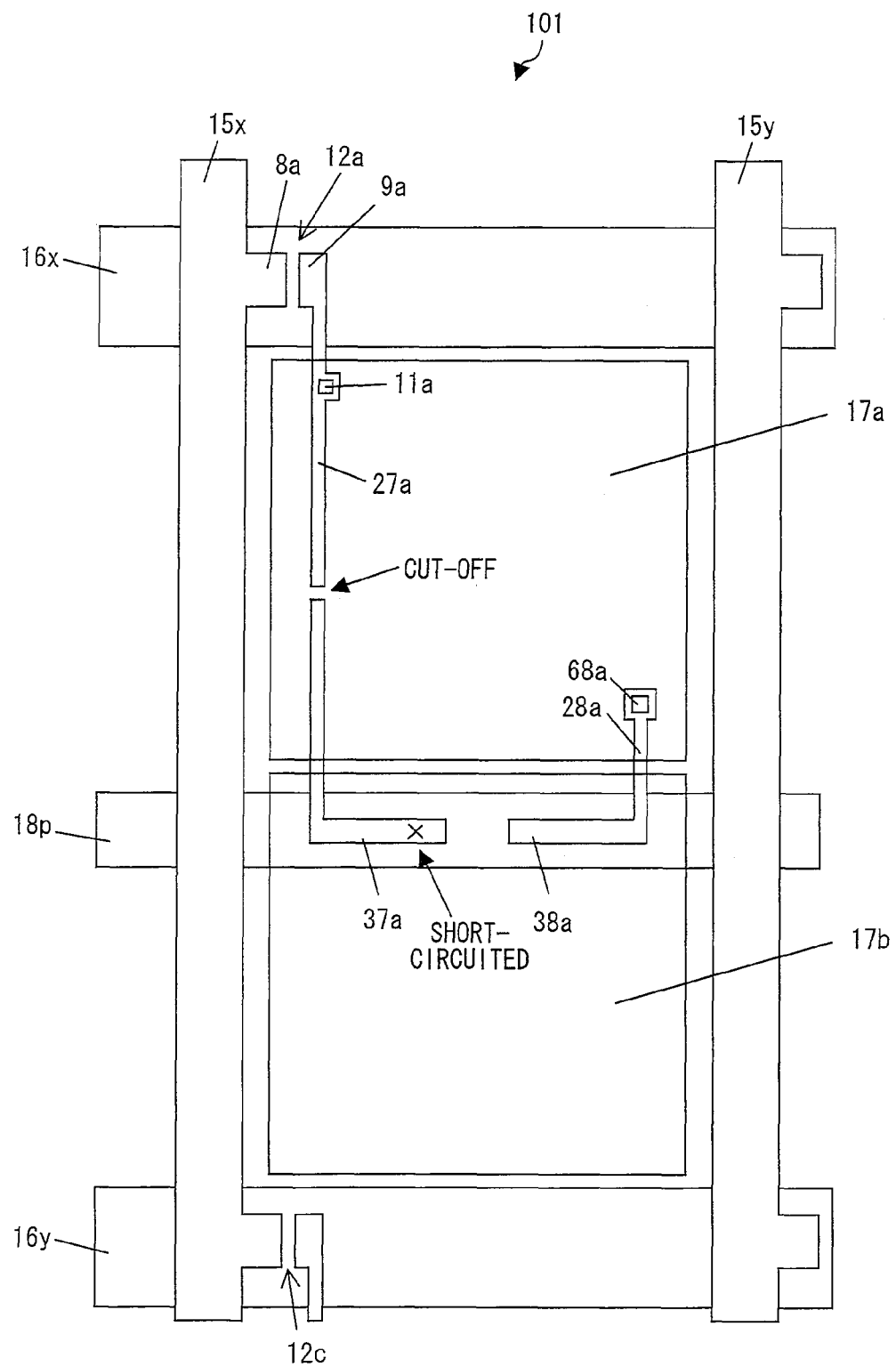
FIG. 8 is a plan view showing a method for correcting the liquid crystal panel of FIG. 2.

At an active matrix substrate stage, the correcting step is carried out by either irradiating the drain drawing wire 27a (at a point subsequent to the contact hole 11a) with a laser on the rear surface (glass-substrate side) of the active matrix substrate and thereby cutting off the drain drawing wire 27a (see FIG. 8), or irradiating the drain drawing wire 27a with a laser through a space between the pixel electrodes 17a and 17b on the front surface (side opposite to the glass substrate) of the active matrix substrate and thereby cutting off the drain drawing wire 27a. Alternatively, at a liquid crystal panel stage, the correcting step is carried out by irradiating the drain drawing wire 27a (at a point subsequent to the contact hole 11a) with a laser on the rear surface of the liquid crystal panel (glass-substrate side of the active matrix substrate) and thereby cutting off the drain drawing wire 27a.

Figure 47:
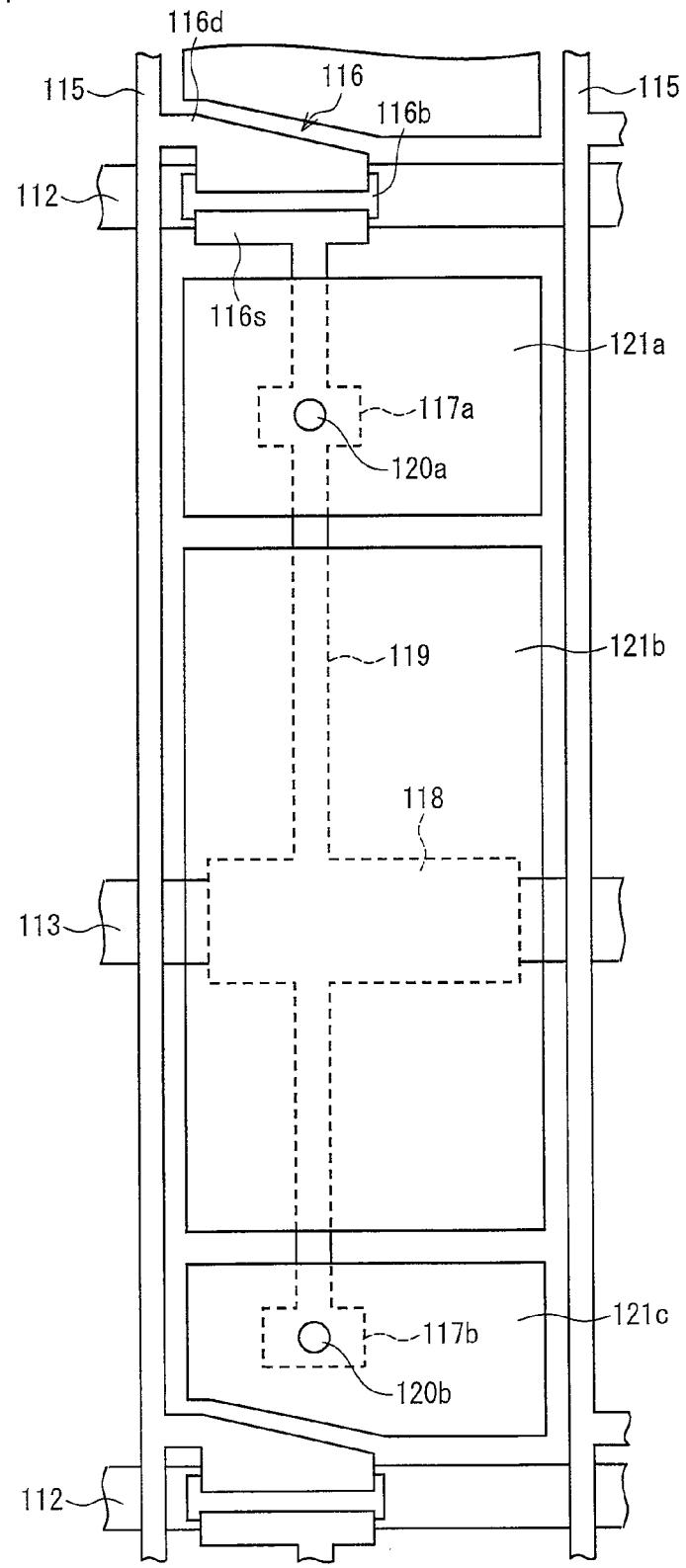
FIG. 47 is a plan view showing the configuration of a conventional liquid crystal panel.

For the reasons stated above, the present embodiment can increase yields of manufacture of liquid crystal panels and active matrix substrates for use therein. It should be noted that if, in the conventional active matrix substrate of FIG. 47 (for reference), the drawing wire 119 is cut off, it becomes impossible to control the potential of the pixel electrode 121b. Alternatively, if the control electrode 118 and the capacitor wire 113 are short-circuited, the pixel electrode 121b will no longer be capacitively coupled to the pixel electrodes 121a and 121c, although it is possible to write a signal potential to the pixel electrode 121b by cutting off the drawing wire 119.

Further, in the liquid crystal panel of FIG. 2, each of the capacitor electrodes 37a and 38a overlaps the pixel electrode 17b and the retention capacitor wire 18p. By thus making the capacitor electrodes 37a and 38a, which are provided to form coupling capacitors, function also as electrodes to form retention capacitors, an increase in aperture ratio can be brought about.

Next, a method for manufacturing the present liquid crystal panel is described. The method for manufacturing a liquid crystal panel includes: an active matrix substrate manufacturing step; a color filter substrate manufacturing step; and an assembling step of joining the two substrates together and filling a space therebetween with liquid crystals. Further, an inspecting step is carried out during or after at least either the active matrix substrate manufacturing step or the assembling step, and if a pixel (subpixel) defect is detected during the inspecting step, a correcting step of correcting the defect is added.

The active matrix substrate manufacturing step is described below.

First, a metal film of titanium, chromium, aluminum, molybdenum, tantalum, tungsten, copper, etc., an alloy film thereof, or a laminated film thereof (with a thickness of 1,000 Å to 3,000 Å) is formed by sputtering on a substrate of glass, plastic, etc. After that, patterning is carried out by a photolithographic technique (photo engraving process; hereinafter referred to as "PEP technique"), whereby scanning signal lines, gate electrodes of transistors (the scanning signal lines may serve also as gate electrodes), and retention capacitor wires are formed.

Next, a gate insulting film is formed by forming an inorganic insulating film (with a thickness of approximately 3,000 Å to 5,000 Å) of silicon nitride, silicon oxide, etc. by CVD (chemical vapor deposition) all over the substrate on which the scanning signal lines and the like have been formed.

Then, an intrinsic amorphous silicon film (with a thickness of 1,000 Å to 3,000 Å) and an n+ amorphous silicon film (with a thickness of 400 Å to 700 Å) doped with phosphorus are formed successively by CVD on the gate insulating film (all over the substrate). After that, patterning is carried out by the PEP technique, whereby a silicon laminate composed of the intrinsic amorphous silicon layer and the n+ amorphous silicon layer is formed in the shape of islands on the gate electrodes.

Then, a metal film of titanium, chromium, aluminum, molybdenum, tantalum, tungsten, copper, etc., an alloy film thereof, or a laminated film thereof (with a thickness of 1,000 Å to 3,000 Å) is formed by sputtering all over the substrate on which the silicon laminate has been formed. After that, patterning is carried out by the PEP technique, whereby data signal lines, source and drain electrodes of the transistors, drain drawing wires, and capacitor electrodes are formed.

Furthermore, the n+ amorphous silicon layer constituting the silicon laminate is etched away by using the source and drain electrodes as a mask, whereby channels of the transistors are formed. It should be noted here that although the semiconductor layer may be formed by an amorphous silicon layer as described above, a polysilicon film may be formed, or an improvement in crystallinity may be made by subjecting the amorphous silicon film or the polysilicon film to laser-annealing treatment. This leads to an increase in speed at which electrons moves within the semiconductor layer, thus allowing improved characteristics of the transistors (TFTs).

Next, an inorganic interlayer insulting film is formed by forming an inorganic insulating film (with a thickness of 2,000 Å to 5,000 Å) of silicon nitride, silicon oxide, etc. by CVD (chemical vapor deposition) all over the substrate on which the data signal lines and the like have been formed.

After that, contact holes are formed by etching away the interlayer insulating film by the PEP technique. Then, a transparent conductive film (with a thickness of 1,000 Å to 2,000 Å) composed of ITO (indium tin oxide), IZO (indium zinc oxide), zinc oxide, tin oxide, etc. is formed all over the interlayer insulating film in which the contact holes have been formed. After that, patterning is carried out by the PEP technique, whereby pixel electrodes are formed.

Finally, a polyimide resin is printed with a thickness of 500 Å to 1,000 Å on the pixel electrodes all over the substrate. After that, the polyimide resin is calcined and rubbed in one direction with rotating cloth, whereby an alignment film is formed. In this way, an active matrix substrate is manufactured.

The color filter substrate manufacturing step is described below.

First, after a thin chromium film or a film of resin containing a black pigment is formed on a substrate of glass, plastic, etc. (all over the substrate), patterning is carried out by the PEP technique, whereby a black matrix is formed. Next, a red, green, and blue color filter layer (with a thickness of approximately 2 μm) is pattern-formed by pigment dispersion in an empty area of the black matrix.

Then, a transparent conductive film (with a thickness of approximately 1,000 Å) composed of ITO, IZO, zinc oxide, tin oxide, etc. is formed on the color filter layer all over the substrate, whereby a common electrode (com) is formed.

Finally, a polyimide resin is printed with a thickness of 500 Å to 1,000 Å on the common electrode all over the substrate. After that, the polyimide resin is calcined and rubbed in one direction with rotating cloth, whereby an alignment film is formed. In this way, a color filter substrate is manufactured.

The assembling step is described below.

First, a sealing material composed of thermosetting epoxy resin or the like is applied by screen printing on either the active matrix substrate or the color filter substrate into the pattern of a frame lacking a part corresponding to a liquid crystal inlet, and spherical spacers having a diameter corresponding to the thickness of the liquid crystal layer and composed of plastic or silica are scattered on the other substrate.

Next, the active matrix substrate and the color filter substrate are joined together, and the sealing material is cured.

Finally, after a liquid crystal material is injected under reduced pressure into the space surrounded by the active matrix substrate, the color filter substrate, and the sealing material, a UV cure resin is applied to the liquid crystal inlet and irradiated with UV to seal in the liquid crystal material, whereby the liquid crystal layer is formed. In this way, a liquid crystal panel is manufactured.

The following describes a first inspecting step that is carried out during the active matrix substrate manufacturing step (e.g., after the formation of the pixel electrodes and before the formation of the alignment film) or after the active matrix substrate manufacturing step. In the first inspecting step, a site of incidence of a short circuit (short-circuited part) is detected by subjecting the active matrix substrate to appearance inspection, electro-optical inspection, etc. Examples of short circuits include a short circuit between a capacitor electrode and a retention capacitor wire and a short circuit between a capacitor electrode and a pixel electrode. It should be noted that the appearance inspection is intended to optically inspect a wiring pattern with a CCD camera or the like, and the electro-optical inspection is intended to electro-optically inspect a wiring pattern by, after placing a modulator (electro-optical element) so that it faces the active matrix substrate, applying a voltage to the space between the active matrix substrate and the modulator, allowing light to enter the space, and capturing a change in luminance of the light with a CCD camera.

If a short-circuited site is detected, a correcting step is carried out in which the short-circuited capacitor electrode or a conductor part connected thereto (e.g., a drain drawing wire) is cut off with a laser. This laser cutting uses the fourth harmonic component (at a wavelength of 266 nm) of a YAG (yttrium aluminum garnet) laser, for example. This improves cutting precision. Alternatively, if a short-circuited site is detected, a correcting step may be carried out in which of the pixel electrode connected to the short-circuited capacitor electrode via a contact hole, a part inside of the contact hole is removed (trimmed) by laser or the like. In the correcting step that is carried out after the first inspecting step, it is usually possible to irradiate the front surface (pixel-electrode side) or rear surface (substrate side) of the active matrix substrate with a laser.

It should be noted that the first inspecting step and the correcting step may also be carried out after the formation of the capacitor electrodes or after the formation of the channels of the transistor, as well as after the formation of the pixel electrodes. This makes it possible to correct a defect at an earlier stage of the manufacturing process and thus increase a yield of manufacture of active matrix substrates.

The following describes a second inspecting step that is carried out after the assembling step. In this second inspecting step, a short-circuited site is detected by subjecting the liquid crystal panel to lighting inspection. Examples of short circuits include a short circuit between a capacitor electrode and a retention capacitor wire and a short circuit between a capacitor electrode and a pixel electrode. Specifically, all the TFTs are turned on by supplying each signal scanning line with a gate inspection signal having a bias voltage of −10 V, a cycle of 16.7 msec, a pulse width of 50 μsec, and a pulse voltage of +15 V. Furthermore, by supplying each data signal line with a source inspection signal, having a potential of ±2 V, whose polarity is reversed every 16.7 msec, a signal potential corresponding to ±2 V is written to the pixel electrode via the source and drain electrodes of each TFT. At the same time, the common electrode (com) and the retention capacitor wires are supplied with a DC common electrode inspection signal having a potential of −1 V. At this time, a voltage is applied to a liquid crystal capacitor constituted between a pixel electrode and the common electrode and a retention capacitor constituted between a retention capacitor wire and a capacitor electrode, so that the subpixel constituted by that pixel electrode starts to light. And in a short-circuited site, the pixel electrode and the retention capacitor wire become conductive, with the result that a black dot appears (normally black). In this way, the short-circuited site is detected.

If a short-circuited site is detected, a correcting step is carried out in which the short-circuited capacitor electrode or a conductor part connected thereto (e.g., a drain drawing wire) is cut off with a laser. In the correcting step that is carried out after the second inspecting step, it is usual to irradiate the rear surface of the active matrix substrate (substrate side of the active matrix substrate) with a laser.

Figure 4:
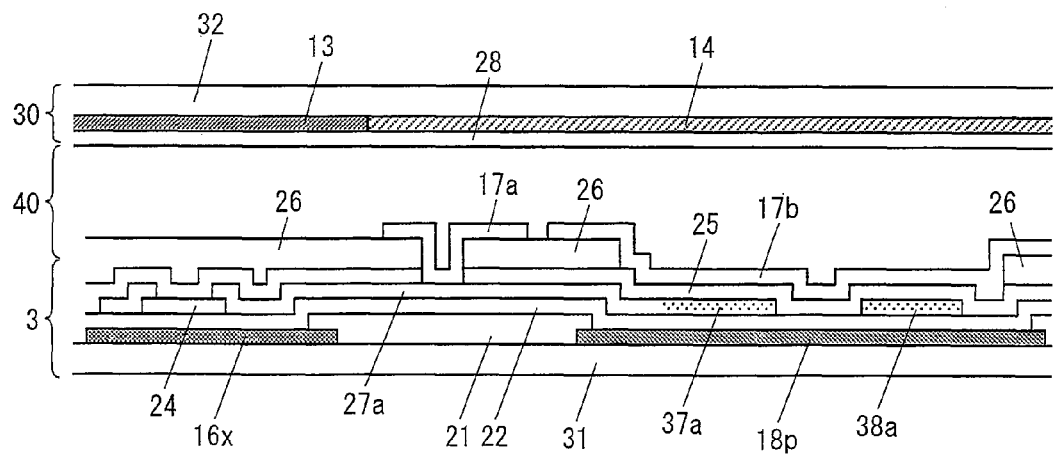
FIG. 4 is a cross-sectional view taken along arrows A-B in the configuration of a modification of FIG. 2.

Meanwhile, the A-B cross-section of FIG. 2 may also look as shown in FIG. 4. That is, a thick organic gate insulating film 21 and a thin inorganic gate insluting film 22 are formed on the glass substrate 31, and a thin inorganic interlayer insulating film 25 and a thick organic interlayer insulting film 26 are formed under the pixel electrodes. This brings about effects of reducing various parasitic capacitances, preventing wires from being short-circuited with each other, and reducing cracking or the like in a pixel electrode due to planarization. In this case, it is preferable that as shown in FIG. 4, that part of the organic gate insulating film 21 which is located under the capacitor electrodes 37a and 38a be bored through and that part of the organic interlayer insulating film 26 which is located above the capacitor electrodes 37a and 38a be bored through. This makes it possible to achieve the above effects while securing sufficient values of capacitance for the coupling capacitors (Cab 1 and Cab2) and the retention capacitors (Cha1, Cha2, and Chb).

Figure 45:
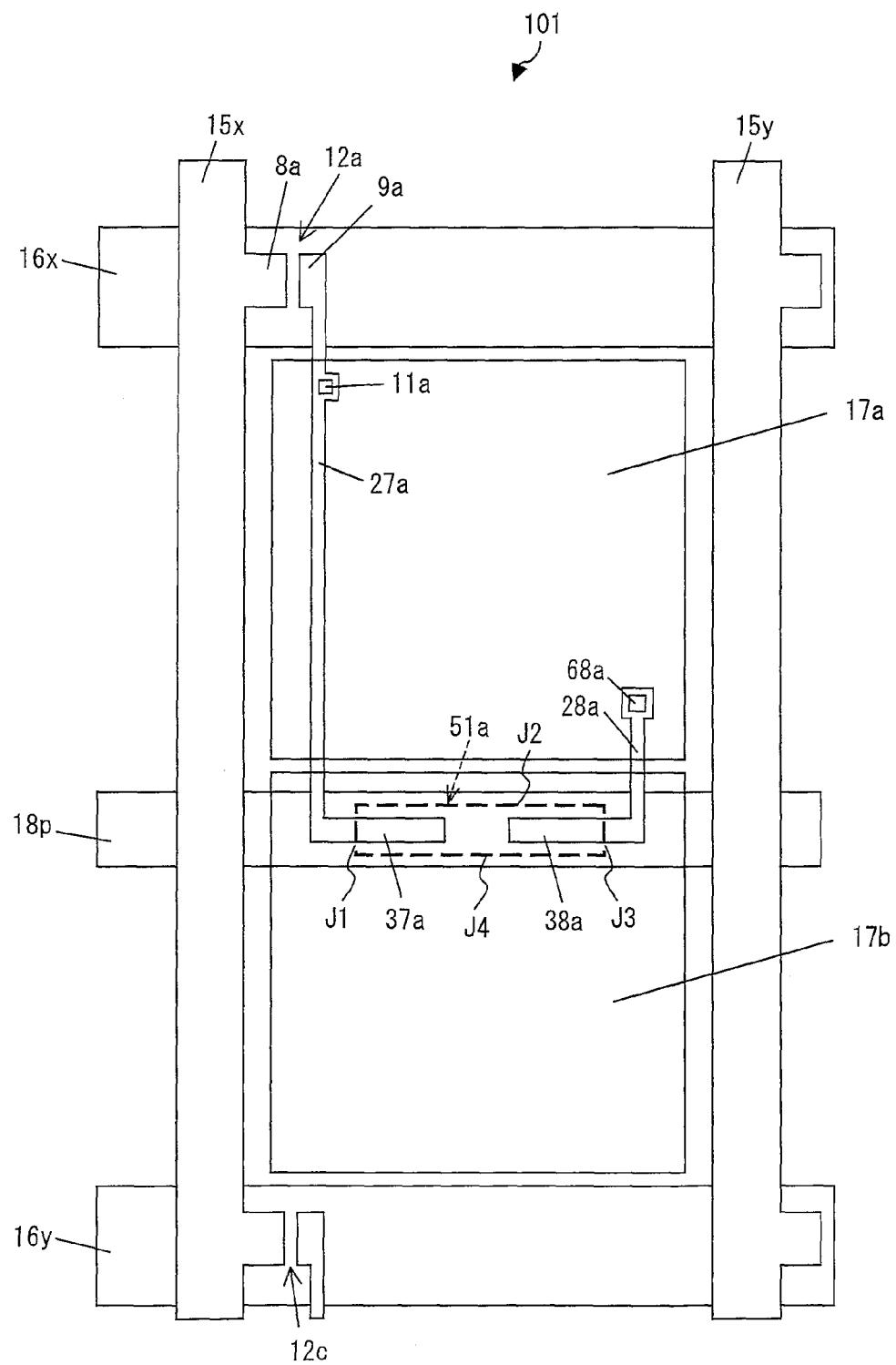
FIG. 45 is a plan view showing another specific example of the liquid crystal panel shown in FIG. 1.

Further, it is preferable that the bored part (thin-film pat 51a) of the organic interlayer insulating film 26 be such a region as indicated by a dotted frame in FIG. 45. Specifically, as shown in FIG. 45, the thin-film part 51a takes the shape of a rectangle having first to fourth sides (J1 to J4), with the capacitor electrode 37a straddling the first side (J1), and with the capacitor electrode 38a, which is disposed side by side with the capacitor electrode 37a along the row-wise direction, straddling the third side (J3), which is a side opposite to the first side (J1). Thus, even if the capacitor electrodes 37a and 38a are displaced along the row-wise direction, the area of overlap between the capacitor electrode 37a and the pixel electrode 17b and the area of overlap between the capacitor electrode 38a and the pixel electrode 17b compensate for each other. This gives such an effect that the total capacitance of the two capacitors (coupling capacitors) is unlikely to change. It should be noted, needless to say, that this configuration can be applied to those liquid crystal panels which will be described later in the present embodiment.

The inorganic interlayer insulating film 25, organic interlayer insulating film 26, and contact holes 11a and 11b of FIG. 4 can be formed as described below, for example. That is, after the formation of the transistors (TFTs) and the data signal lines, a mixed gas of $SiH_4$ gas and $NH_3$ gas is used so that an inorganic interlayer insulating film 25 (passivation film) composed of SiNx with a thickness of approximately 3,000 Å is formed by CVD in such a way as to cover the entire surface of the substrate. After that, an organic interlayer insulating film 26 composed of positive photosensitive acrylic resin with a thickness of approximately 3 μm is formed by spin coating or die coating. Then, photolithography is carried out to form a bored part of the organic interlayer insulating film 26 and various contact patterns. Furthermore, with the patterned organic interlayer insulating film 26 as a mask, a mixed gas of $CF_4$ gas and gas is used to dry-etch the inorganic interlayer insulating film 25. Specifically, for example, while the bored part of the organic interlayer insulating film is formed by subjecting a corresponding part of the organic interlayer insulating film to half exposure in a photolithographic step so that the part remains as a thin film on completion of development, the contact holes are formed by subjecting corresponding parts of the organic interlayer insulating film to full exposure in the photolithographic step so that the parts do not remain on completion of development. When, at this point, dry etching is carried out with a mixed gas of $CF_4$ gas and $O_2$ gas, the bored part of organic interlayer insulating film is formed by removing the remaining part (of the organic interlayer insulating film), and the contact holes are formed by removing corresponding parts of the inorganic interlayer insulating film under the organic interlayer insulating film. It should be noted that the organic gate insulating film 21 and the organic interlayer insulating film 26 may each be an insulating film composed of SOG (spin-on glass) material and, also, that the organic gate insulating film 21 and the organic interlayer insulating film 26 may each contain at least acrylic resin, epoxy resin, polyimide resin, polyurethane resin, novolac resin, and siloxane resin.

Figure 9:
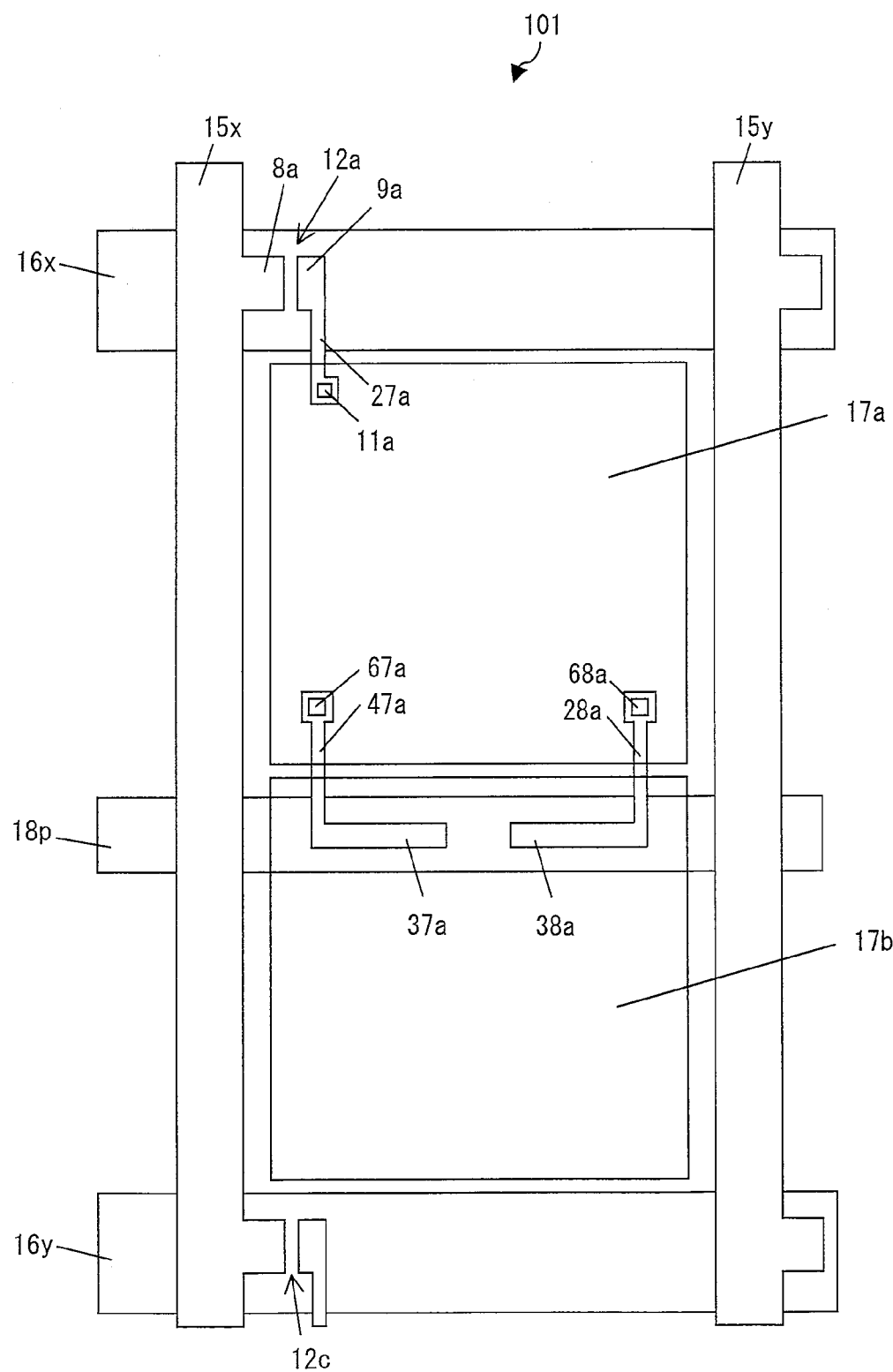
FIG. 9 is a plan view showing another specific example of the liquid crystal panel shown in FIG. 1.
Figure 10:
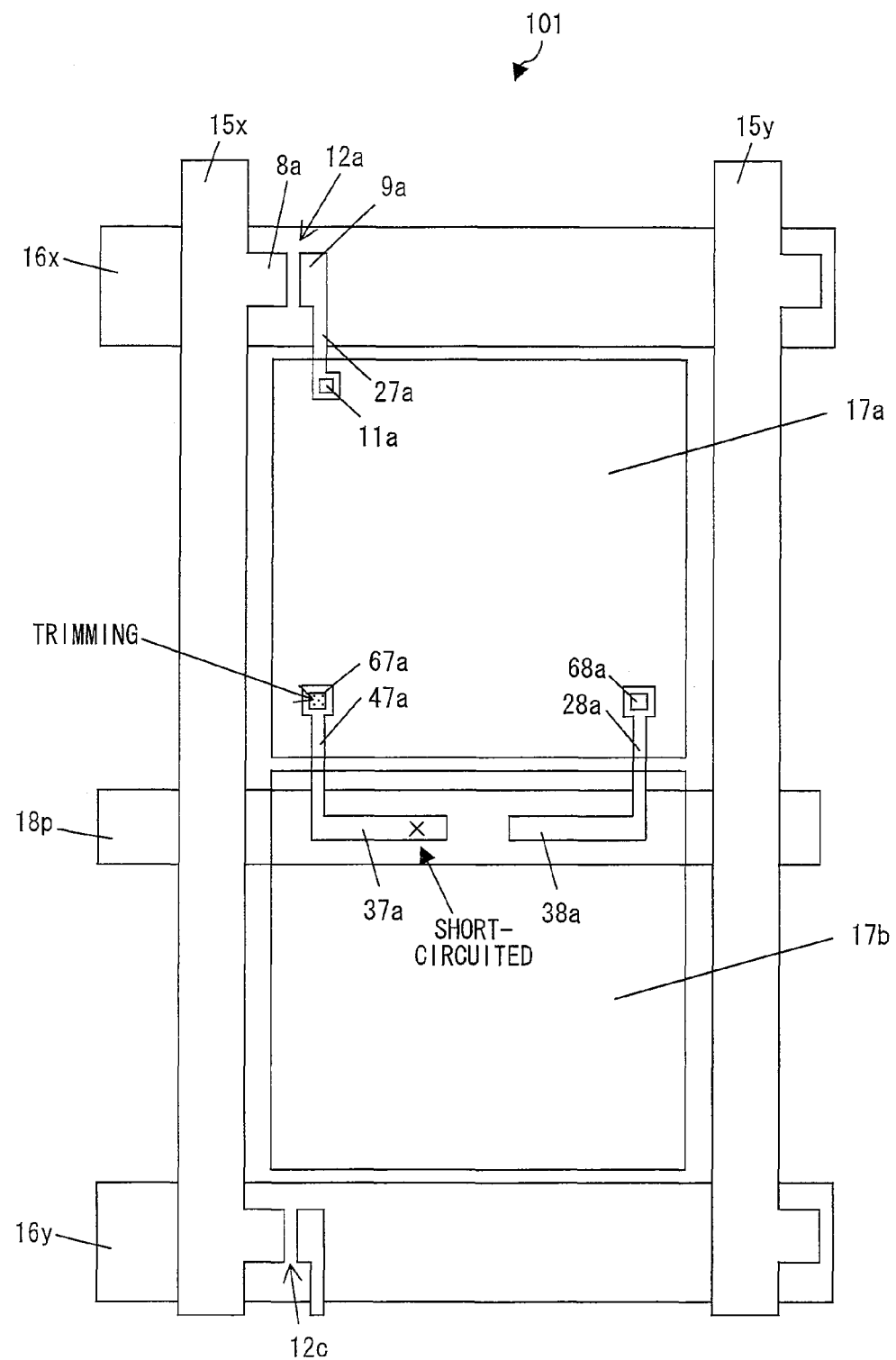
FIG. 10 is a plan view showing a method for correcting the liquid crystal panel of FIG. 9.

The pixel 101 of FIG. 2 may be modified as shown in FIG. 9. In the configuration of FIG. 9, the transistor 12a has its drain electrode 9a connected to the pixel electrode 17a via the contact hole 11a, with the pixel electrode 17a and the capacitor electrode 37a connected to each other via a contact hole 67a. This allows the drain electrode 9a and the capacitor electrode 37a to be connected to each other via a shorter drain drawing wire, thus bringing about an increase in aperture ratio. Further, in the liquid crystal panel of FIG. 9, the pixel electrodes 17a and 17b are connected (capacitively coupled) to each other via the two parallel coupling capacitors (Cab1 and Cab2). Therefore, even if the contact hole 67a is malformed (during the manufacturing process or the like), the pixel electrodes 17a and 17b can be kept capacitively coupled to each other. Alternatively, if the capacitor electrode 37a and the retention capacitor wire 18p or the pixel electrode 17b are short-circuited (during the manufacturing process or the like), the pixel electrodes 17a and 17b can be kept capacitively coupled to each other by removing (trimming) a part of the pixel electrode 17a inside of the contact hole 67a by laser or the like, as shown in FIG. 10, to electrically disconnect the pixel electrode 17a and the capacitor electrode 37a from each other.

Figure 11:
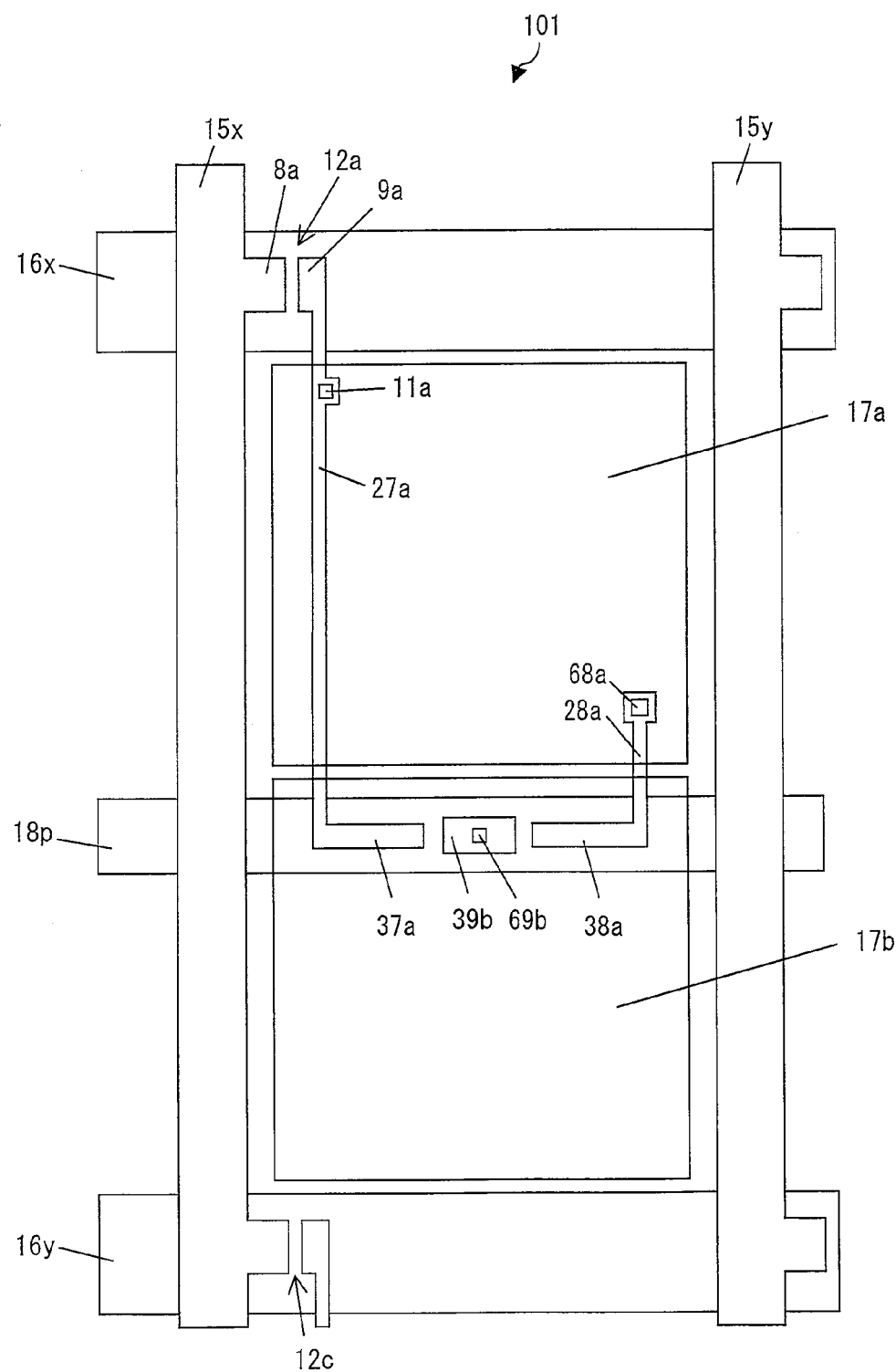
FIG. 11 is a plan view showing another specific example of the liquid crystal panel shown in FIG. 1.

It should be noted here that from a standpoint of reliability, it is preferable that the value of capacitance of the retention capacitor Chb be large. Accordingly, the retention capacitor Chb may be formed as configured in FIG. 11. That is, as shown in FIG. 11, a retention capacitor electrode 39b, formed in the same layer as the capacitor electrodes 37a and 38a, is connected to the pixel electrode 17b via a contact hole 69b, whereby the retention capacitor Chb is formed between the retention capacitor electrode 39b and the retention capacitor wire 18p. In the case of this configuration, as compared to the case of FIG. 2 where the retention capacitor Chb is formed between the pixel electrode 17b and the retention capacitor wire 18p, a smaller (thinner) insulating film can be sandwiched therebetween; therefore, the value of retention capacitance can be gained. Further, since the retention capacitor Chb can be formed by a thinner insulating film, the width of the retention capacitor wire 18p can be narrowed without changing the magnitude of value of retention capacitance. This brings about an increase in aperture ratio without erosion of reliability.

Figure 12:
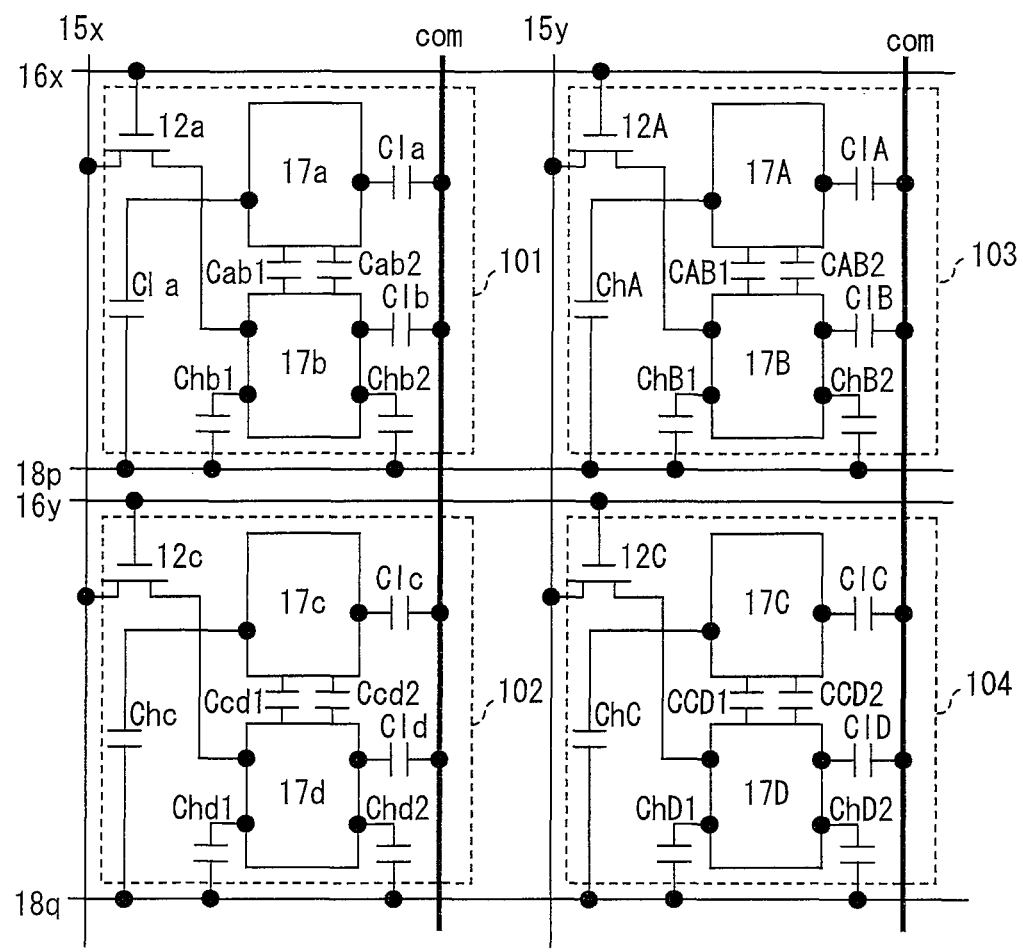
FIG. 12 is a circuit diagram showing the configuration of another liquid crystal panel according to Embodiment 1.
Figure 13:
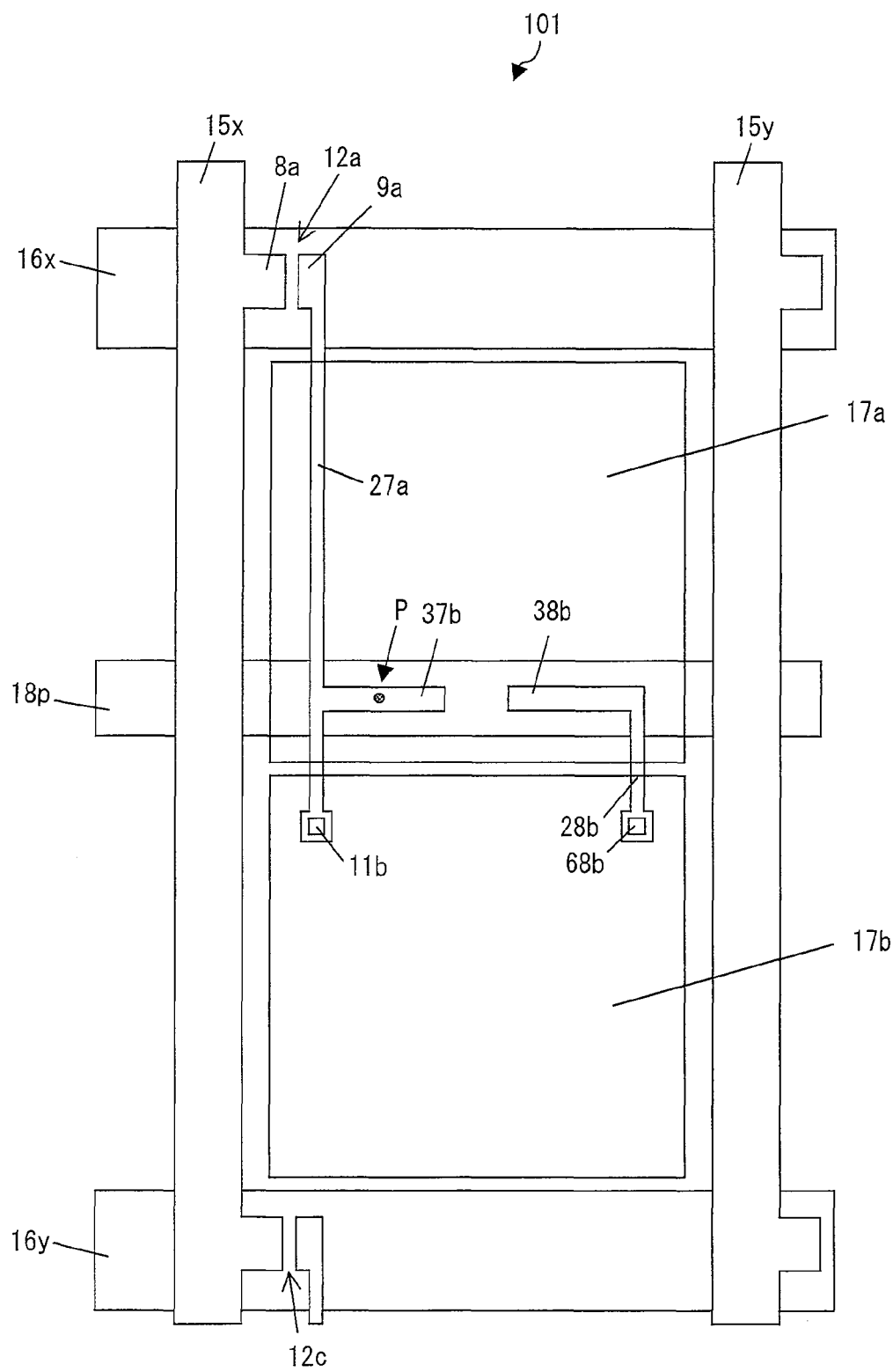
FIG. 13 is a plan view showing a specific example of the liquid crystal panel shown in FIG. 12.

It should be noted here that although, in the liquid crystal panel of FIG. 1, the one of the two pixel electrodes of each pixel which is closer to the transistor is connected to the transistor, this does not imply any limitation. As shown in FIG. 12, the one of the two pixel electrodes of each pixel which is farther from the transistor may be connected to the transistor. FIG. 13 shows a specific example of the pixel 101 of FIG. 12. In the liquid crystal panel of FIG. 13, the transistor 12a is disposed near an intersection between the data signal line 15x and the scanning signal line 16x. In a pixel region defined by the two signal lines (15x and 16x), the pixel electrodes 17a and 17b, both of which are rectangular, are arranged along the column-wise direction. The first pixel electrode has four outer peripheral sides, one of which is adjacent to one of the four outer peripheral sides of the second pixel electrodes. The retention capacitor wire 18p, which extends along the row-wise direction, is disposed in such a way as to overlap the pixel electrode 17a. Moreover, there are provided capacitor electrodes 37b and 38b in such a way as to overlap the retention capacitor wire 18p and the pixel electrode 17a.

More specifically, the capacitor electrode 37b extends along the same direction as the direction along which the retention capacitor wire 18p extends, and overlaps the retention capacitor wire 18p and the pixel electrode 17a. The capacitor electrode 38b, disposed side by side with the capacitor electrode 37b along the row-wise direction (which corresponds to the direction along which the retention capacitor wire 18p extends), extends along the same direction as the direction along which the retention capacitor wire 18p extends, and overlaps the retention capacitor wire 18p and the pixel electrode 17a.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a leads to the capacitor electrode 37b, which exists in the same layer, and is connected to the pixel electrode 17b via a contact hole 11b, and the capacitor electrode 37b overlaps the pixel electrode 17a via an interlayer insulating film, with the coupling capacitor Cab1 (see FIG. 12) between the pixel electrodes 17a and 17b formed in the overlap section between the capacitor electrode 37b and the pixel electrode 17a. Further, the capacitor electrode 38b is connected to the pixel electrode 17b via a contact hole 68b and overlaps the pixel electrode 17a via the interlayer insulting film, with the coupling capacitor Cab2 (see FIG. 12) between the pixel electrodes 17a and 17b formed in the overlap section between the capacitor electrode 38b and the pixel electrode 17a. Furthermore, the capacitor electrode 37b overlaps the retention capacitor wire 18p via a gate insulating film, with the retention capacitor Chb1 (see FIG. 12) formed in the overlap section between the capacitor electrode 37b and the retention capacitor wire 18p, and the capacitor electrode 38b overlaps the retention capacitor wire 18p via the gate insulating film, with the retention capacitor Chb2 (see FIG. 12) formed in the overlap section between the capacitor electrode 38b and the retention capacitor wire 18p. Further, the pixel electrode 17a and the retention capacitor wire 18p overlap each other via the interlayer insulating film and the gate insulating film, with the retention capacitor Cha (see FIG. 12) formed in the overlap section between the pixel electrode 17a and the retention capacitor wire 18p.

In the liquid crystal panel of FIG. 13, the subpixel including the pixel electrode 17a serves as "dark", and the subpixel including the pixel electrode 17b serves as "bright".

In the liquid crystal panel of FIG. 13, the pixel electrodes 17a and 17b are connected (capacitively coupled) to each other via the two parallel coupling capacitors (Cab1 and Cab2). Therefore, if the capacitor electrode 37b and the pixel electrode 17a are short-circuited at P in FIG. 13 (during the manufacturing process or the like), for example, the pixel electrodes 17a and 17b can be kept capacitively coupled to each other by carrying out a correcting step of cutting off the capacitor electrode 37b with a laser between the contact hole 11b and the short-circuited site. Alternatively, if the capacitor electrode 38b and the pixel electrode 17a are short-circuited, the capacitor electrode 38b needs only be cut off with a laser between the contact hole 68b and the short-circuited site.

Figure 14:
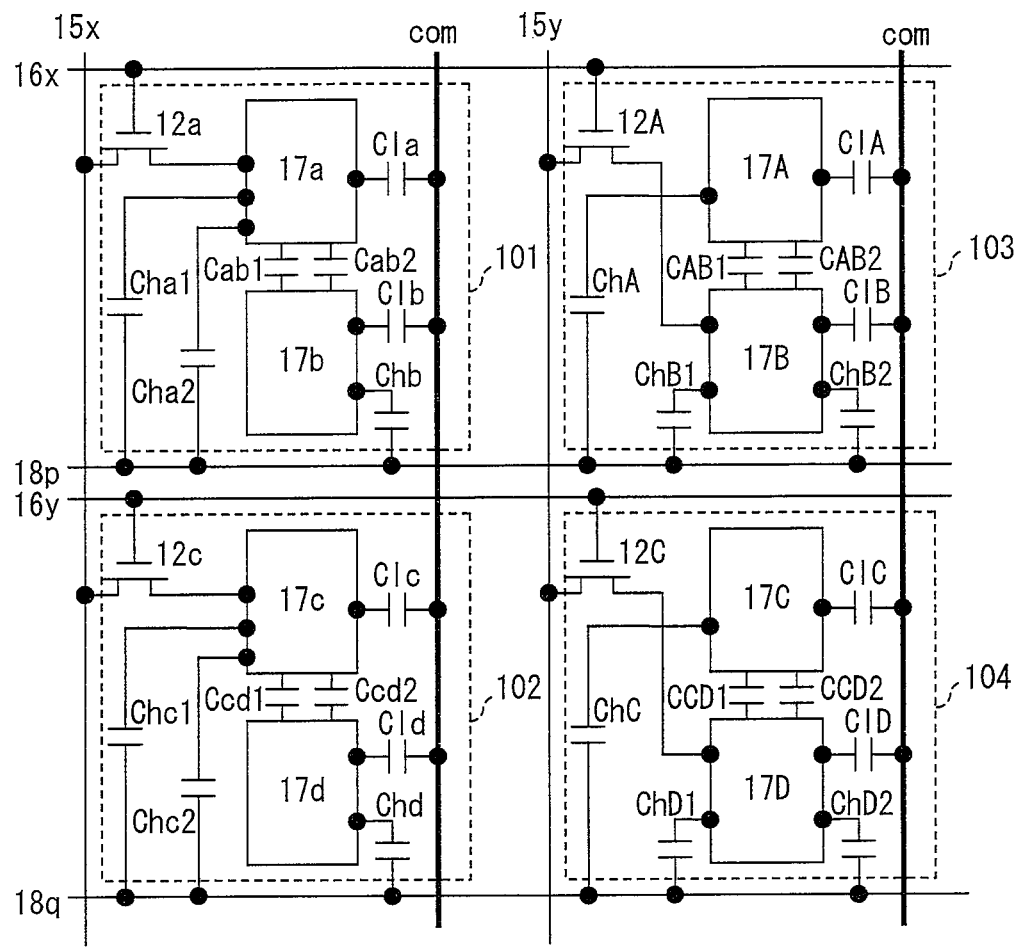
FIG. 14 is a circuit diagram showing the configuration of another liquid crystal panel according to Embodiment 1.

The liquid crystal panel of FIG. 1 may also be configured as shown in FIG. 14, where in one of two pixel adjacent to each other along the row-wise direction, the one of the pixel electrodes which is closer to the transistor is connected to the transistor and, in the other pixel, the one of the pixel electrodes which is farther from the transistor is connected to the transistor.

Figure 15:
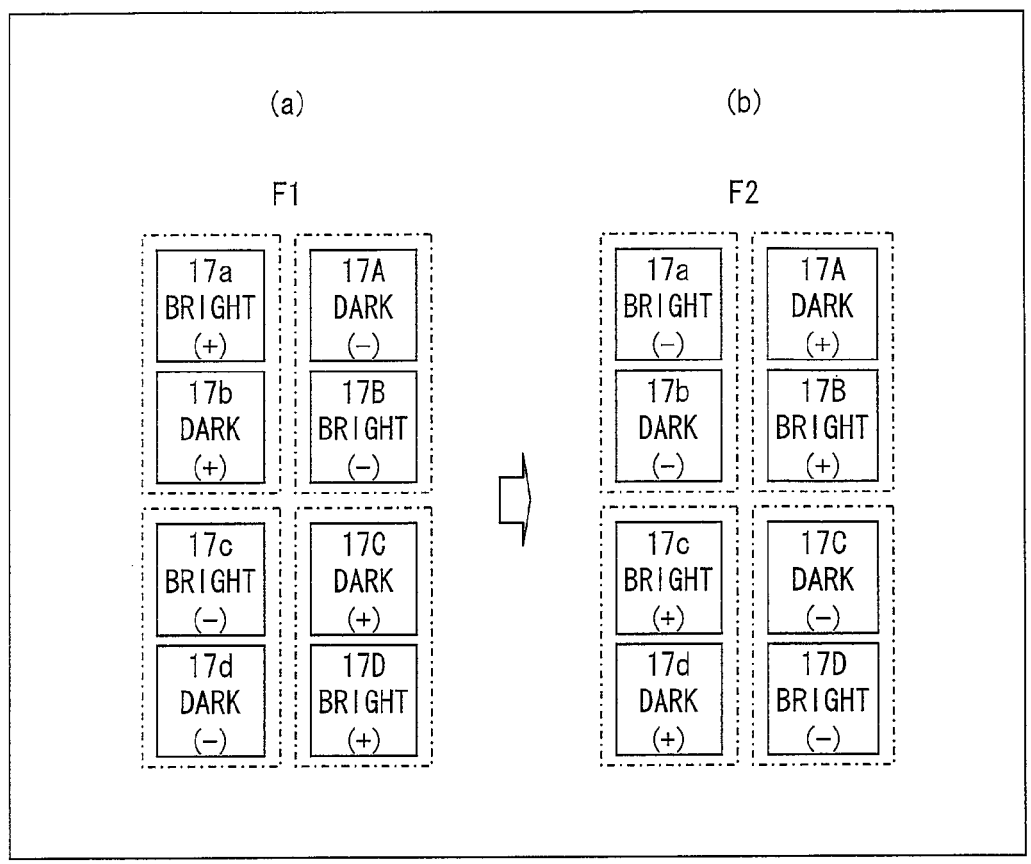
FIG. 15 is a schematic view showing the state of a display in each frame in the case of use of the driving method of FIG. 5 in a liquid crystal display device including the liquid crystal panel of FIG. 14.

Let it be assumed that the data signal lines 15x and 15y are driven as shown in FIG. 5 in a liquid crystal display device including the liquid crystal panel of FIG. 14. Then, in the frame F1, the subpixel including the pixel electrode 17a (positive polarity) serves as "bright"; the subpixel including the pixel electrode 17b (positive polarity) serves as "dark"; the subpixel including the pixel electrode 17c (negative polarity) serves as "bright"; the subpixel including the pixel electrode 17d (negative polarity) serves as "dark"; the subpixel including the pixel electrode 17A (negative polarity) serves as "dark"; and the subpixel including the pixel electrode 17B (negative polarity) serves as "bright". As a whole, the subpixels look as shown in (a) of FIG. 15. Further, in the frame F2, the subpixel including the pixel electrode 17a (negative polarity) serves as "bright"; the subpixel including the pixel electrode 17b (negative polarity) serves as "dark"; the subpixel including the pixel electrode 17c (positive polarity) serves as "bright"; the subpixel including the pixel electrode 17d (positive polarity) serves as "dark"; the subpixel including the pixel electrode 17A (positive polarity) serves as "dark"; and the subpixel including the pixel electrode 17B (positive polarity) serves as "bright". As a whole, the subpixels look as shown in (b) of FIG. 15.

The liquid crystal panel of FIG. 14 prevents bright subpixels from being arranged along the row-wise direction and dark subpixels from being arranged along the row-wise direction, thus achieving a reduction in streaks and unevenness that extend along the row-wise direction.

Figure 16:
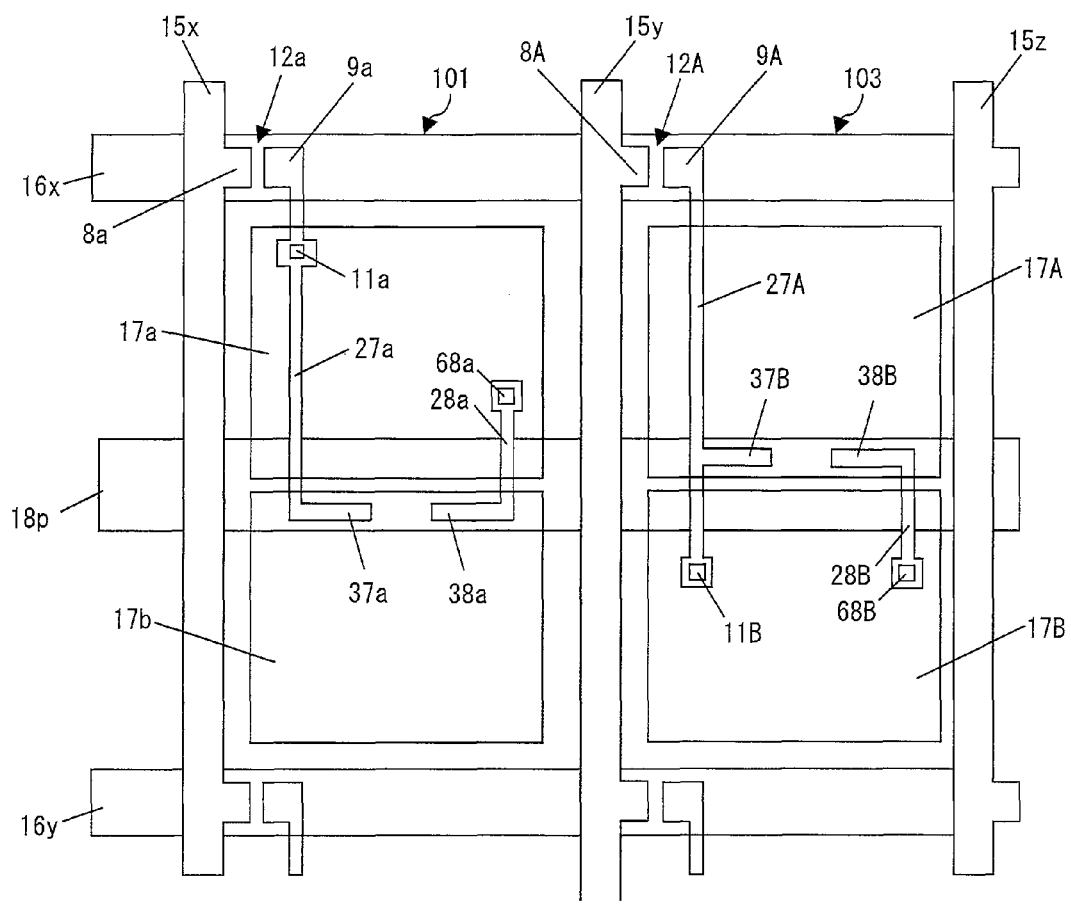
FIG. 16 is a plan view showing a specific example of the liquid crystal panel shown in FIG. 14.

FIG. 16 shows a specific example of the pixels 101 and 103 of FIG. 14. In the pixel 101, as shown in FIG. 16, the transistor 12a is disposed near an intersection between the data signal line 15x and the scanning signal line 16x. In a pixel region defined by the two signal lines (15x and 16x), the pixel electrodes 17a and 17b, both of which are rectangular, are arranged along the column-wise direction. The first pixel electrode has four outer peripheral sides, one of which is adjacent to one of the four outer peripheral sides of the second pixel electrodes. The retention capacitor wire 18p, which extends along the row-wise direction, is disposed in such a way as to overlap the whole of the space between the two adjacent sides (space between the pixel electrodes 17a and 17b). Moreover, there are provided capacitor electrodes 37a and 38a in such a way as to overlap the retention capacitor wire 18p and the pixel electrode 17b.

More specifically, the capacitor electrode 37a extends along the same direction as the direction along which the retention capacitor wire 18p extends, and overlaps the retention capacitor wire 18p and the pixel electrode 17b. The capacitor electrode 38a, disposed side by side with the capacitor electrode 37a along the row-wise direction (which corresponds to the direction along which the retention capacitor wire 18p extends), extends along the same direction as the direction along which the retention capacitor wire 18p extends, and overlaps the retention capacitor wire 18p and the pixel electrode 17b.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a leads to the capacitor electrode 37a, which exists in the same layer, and is connected to the pixel electrode 17a via a contact hole 11a, and the capacitor electrode 37a overlaps the pixel electrode 17b via an interlayer insulating film, with the coupling capacitor Cab1 (see FIG. 14) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b via the interlayer insulting film, with the coupling capacitor Cab2 (see FIG. 14) between the pixel electrodes 17a and 17b formed in the overlap section between the capacitor electrode 38a and the pixel electrode 17b. Furthermore, the capacitor electrode 37a overlaps the retention capacitor wire 18p via a gate insulating film, with most of the retention capacitor Cha1 (see FIG. 14) formed in the overlap section between the capacitor electrode 37a and the retention capacitor wire 18p, and the capacitor electrode 38a overlaps the retention capacitor wire 18p via the gate insulating film, with most of the retention capacitor Cha2 (see FIG. 14) formed in the overlap section between the capacitor electrode 38a and the retention capacitor wire 18p. Further, the pixel electrode 17b and the retention capacitor wire 18p overlap each other via the interlayer insulating film and the gate insulating film, with the retention capacitor Chb (see FIG. 14) formed in the overlap section between the pixel electrode 17b and the retention capacitor wire 18p.

Meanwhile, in the pixel 103, the transistor 12A is disposed near an intersection between the data signal line 15y and the scanning signal line 16x. In a pixel region defined by the two signal lines (15y and 16x), the pixel electrodes 17A and 17B, both of which are rectangular, are arranged along the column-wise direction. The first pixel electrode has four peripheral sides, one of which is adjacent to one of the four outer peripheral sides of the second pixel electrodes. The retention capacitor wire 18p, which extends along the row-wise direction, is disposed in such a way as to overlap the whole of the space between the two adjacent sides (space between the pixel electrodes 17A and 17B). Moreover, there are provided capacitor electrodes 37B and 38B in such a way as to overlap the retention capacitor wire 18p and the pixel electrode 17A.

More specifically, the capacitor electrode 37B extends along the same direction as the direction along which the retention capacitor wire 18p extends, and overlaps the retention capacitor wire 18p and the pixel electrode 17A. The capacitor electrode 38B, disposed side by side with the capacitor electrode 37B along the row-wise direction (which corresponds to the direction along which the retention capacitor wire 18p extends), extends along the same direction as the direction along which the retention capacitor wire 18p extends, and overlaps the retention capacitor wire 18p and the pixel electrode 17A.

The transistor 12A has its source and drain electrodes 8A and 9A formed on the scanning signal line 16x, with the source electrode 8A connected to the data signal line 15y. The drain electrode 9A is connected to a drain drawing wire 27A, and the drain drawing wire 27A leads to the capacitor electrode 37B, which exists in the same layer, and is connected to the pixel electrode 17B via a contact hole 11B, and the capacitor electrode 37B overlaps the pixel electrode 17A via an interlayer insulating film, with the coupling capacitor CAB1 (see FIG. 14) between the pixel electrodes 17A and 17B formed in the overlap section between the capacitor electrode 37B and the pixel electrode 17A. Further, the capacitor electrode 38B is connected to the pixel electrode 17B via a contact hole 68B and overlaps the pixel electrode 17A via the interlayer insulting film, with the coupling capacitor CAB2 (see FIG. 14) between the pixel electrodes 17A and 17B formed in the overlap section between the capacitor electrode 38B and the pixel electrode 17A. Furthermore, the capacitor electrode 37B overlaps the retention capacitor wire 18p via a gate insulating film, with most of the retention capacitor ChB1 (see FIG. 14) formed in the overlap section between the capacitor electrode 37B and the retention capacitor wire 18p, and the capacitor electrode 38B overlaps the retention capacitor wire 18p via the gate insulating film, with most of the retention capacitor ChB2 (see FIG. 14) formed in the overlap section between the capacitor electrode 38B and the retention capacitor wire 18p. Moreover, the pixel electrode 17A and the retention capacitor wire 18p overlap each other via the interlayer insulating film and the gate insulating film, with the retention capacitor ChA (see FIG. 14) formed in the overlap section between the pixel electrode 17A and the retention capacitor wire 18p.

Figure 17:
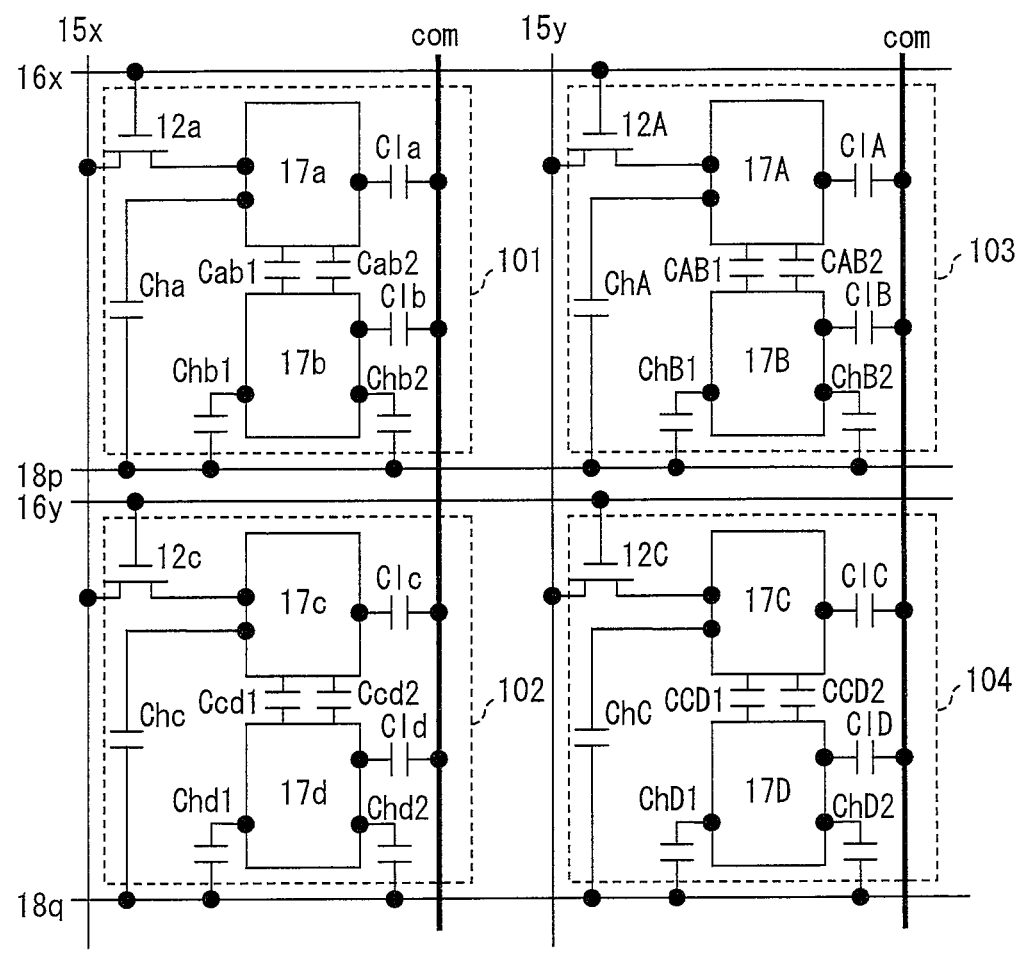
FIG. 17 is a circuit diagram showing the configuration of another liquid crystal panel according to Embodiment 1.
Figure 18:
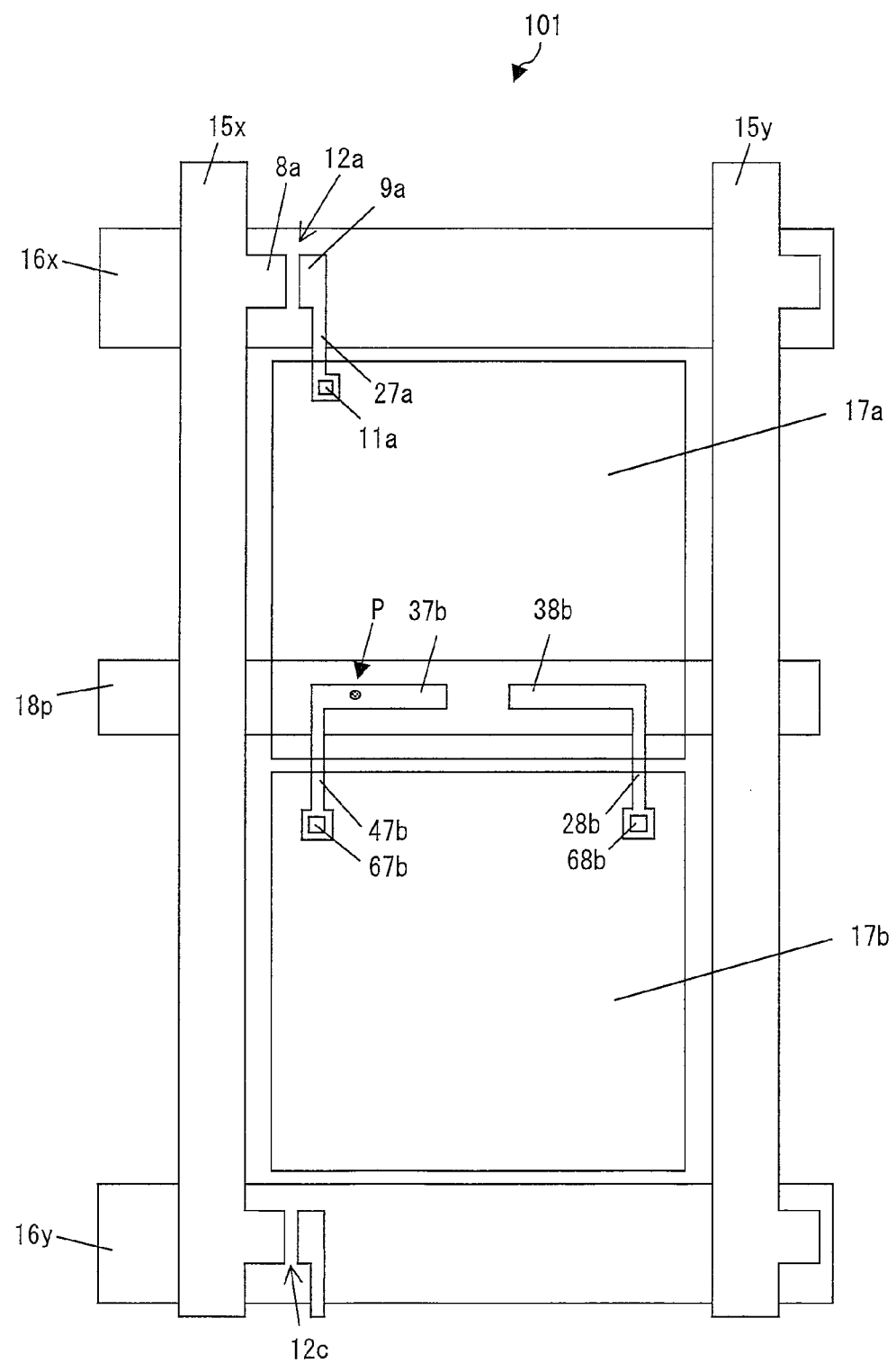
FIG. 18 is a plan view showing a specific example of the liquid crystal panel shown in FIG. 17.

It should be noted here that although each of those liquid crystal panels described above is configured such that a capacitor electrode is electrically connected to a pixel electrode corresponding to a subpixel that serves as a bright subpixel, this does not imply any limitation. The present liquid crystal panel may be configured such that as shown in FIG. 17, a capacitor electrode is electrically connected to a pixel electrode corresponding to a subpixel that serves as a dark subpixel. FIG. 18 shows a specific example of the pixel 101 of FIG. 17.

In the liquid crystal panel of FIG. 18, the transistor 12a is disposed near an intersection between the data signal line 15x and the scanning signal line 16x. In a pixel region defined by the two signal lines (15x and 16x), the pixel electrodes 17a and 17b, both of which are rectangular, are arranged along the column-wise direction. The first pixel electrode has four outer peripheral sides, one of which is adjacent to one of the four outer peripheral sides of the second pixel electrodes. The retention capacitor wire 18p, which extends along the row-wise direction, is disposed in such a way as to overlap the pixel electrodes 17a. Moreover, there are provided capacitor electrodes 37b and 38b in such a way as to overlap the retention capacitor wire 18p and the pixel electrode 17a.

More specifically, the capacitor electrode 37b extends along the same direction as the direction along which the retention capacitor wire 18p extends, and overlaps the retention capacitor wire 18p and the pixel electrode 17a. The capacitor electrode 38b, disposed side by side with the capacitor electrode 37b along the row-wise direction (which corresponds to the direction along which the retention capacitor wire 18p extends), extends along the same direction as the direction along which the retention capacitor wire 18p extends, and overlaps the retention capacitor wire 18p and the pixel electrode 17a.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. Further, the capacitor electrode 37b is connected to the pixel electrode 17b via a contact hole 67b and overlaps the pixel electrode 17a via an interlayer insulating film, with the coupling capacitor Cab1 (see FIG. 17) between the pixel electrodes 17a and 17b formed in the overlap section between the capacitor electrode 37b and the pixel electrode 17a. Further, the capacitor electrode 38b is connected to the pixel electrode 17b via a contact hole 68b and overlaps the pixel electrode 17a via the interlayer insulting film, with the coupling capacitor Cab2 (see FIG. 17) between the pixel electrodes 17a and 17b formed in the overlap section between the capacitor electrode 38b and the pixel electrode 17a. Further, the capacitor electrode 37b overlaps the retention capacitor wire 18p via a gate insulating film, with the retention capacitor Chb1 (see FIG. 17) formed in the overlap section between the capacitor electrode 37b and the retention capacitor wire 18p, and the capacitor electrode 38b overlaps the retention capacitor wire 18p via the gate insulating film, with the retention capacitor Chb2 (see FIG. 17) formed in the overlap section between the capacitor electrode 38b and the retention capacitor wire 18p. Further, the pixel electrode 17a and the retention capacitor wire 18p overlap each other via the interlayer insulating film and the gate insulating film, with the retention capacitor Cha (see FIG. 17) formed in the overlap section between the pixel electrode 17a and the retention capacitor wire 18p.

In the liquid crystal panel of FIG. 18, the subpixel including the pixel electrode 17a serves as "bright", and the subpixel including the pixel electrode 17b serves as "dark".

In the liquid crystal panel of FIG. 18, the pixel electrodes 17a and 17b are connected (capacitively coupled) to each other via the two parallel coupling capacitors (Cab1 and Cab2). Therefore, if the capacitor electrode 37b and the pixel electrode 17a are short-circuited at P in FIG. 18 (during the manufacturing process or the like), for example, the pixel electrodes 17a and 17b can be kept capacitively coupled to each other by carrying out a correcting step of cutting off the capacitor electrode 37b with a laser between the contact hole 67b and the short-circuited site. Alternatively, if the capacitor electrode 38b and the pixel electrode 17a are short-circuited, the capacitor electrode 38b needs only be cut off with a laser between the contact hole 68b and the short-circuited site.

It should be noted, needless to say, that such a configuration as shown in FIG. 17 that a capacitor electrode is electrically connected to a pixel electrode corresponding to a subpixel that serves as a dark subpixel can be applied to those liquid crystal panels described above.

Embodiment 2

Figure 19:
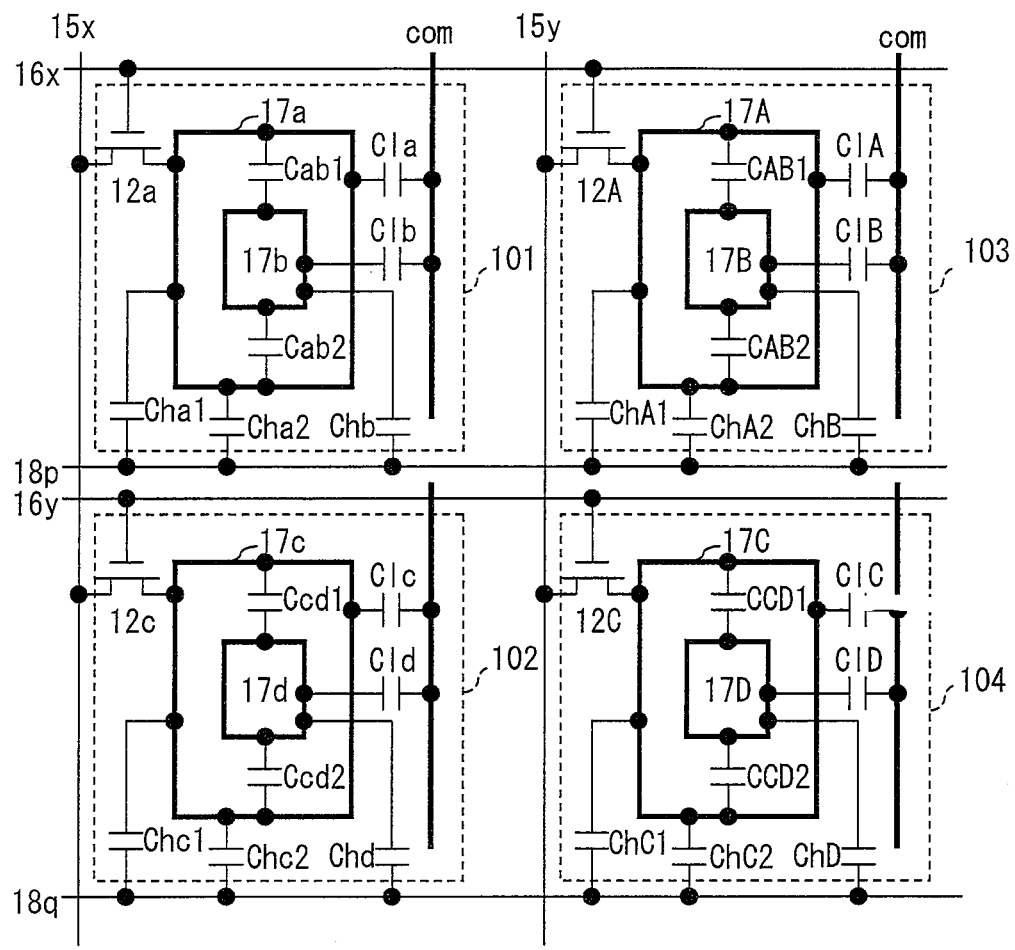
FIG. 19 is a circuit diagram showing the configuration of a liquid crystal panel according to Embodiment 2.

FIG. 19 is an equivalent circuit diagram showing part of a liquid crystal panel according to Embodiment 2. As shown in FIG. 19, the present liquid crystal panel includes: data signal lines (15x and 15y) extending along a column-wise direction (which corresponds to the vertical direction in the drawing); scanning signal lines (16x and 16y) extending along a row-wise direction (which corresponds to the horizontal direction in the drawing); pixels (101 to 104) arranged along the row-wise and column-wise directions; retention capacitor wires (18p and 18q); and a common electrode (counter electrode) com, with the pixels being identical in structure to one another. It should be noted that a column of pixels including the pixels 101 and 102 and a column of pixels including the pixels 103 and 104 are adjacent to each other, and a row of pixels including the pixels 101 and 103 and a row of pixels including the pixels 102 and 104 are adjacent to each other.

In the present liquid crystal panel, there are provided one data signal line and one scanning signal line in correspondence with each pixel. Further, each pixel has two pixel electrodes provided therein, with one of them surrounding the other. Specifically, the pixel 101 has two pixel electrodes 17a and 17b provided therein, with the pixel electrode 17a surrounding the pixel electrode 17b. The pixel 102 has two pixel electrodes 17c and 17d provided therein, with the pixel electrode 17c surrounding the pixel electrode 17d. The pixel 103 has two pixel electrodes 17A and 17B provided therein, with the pixel electrode 17A surrounding the pixel electrode 17B. The pixel 104 has two pixel electrodes 17C and 17D provided therein, with the pixel electrode 17C surrounding the pixel electrode 17D.

Figure 20:
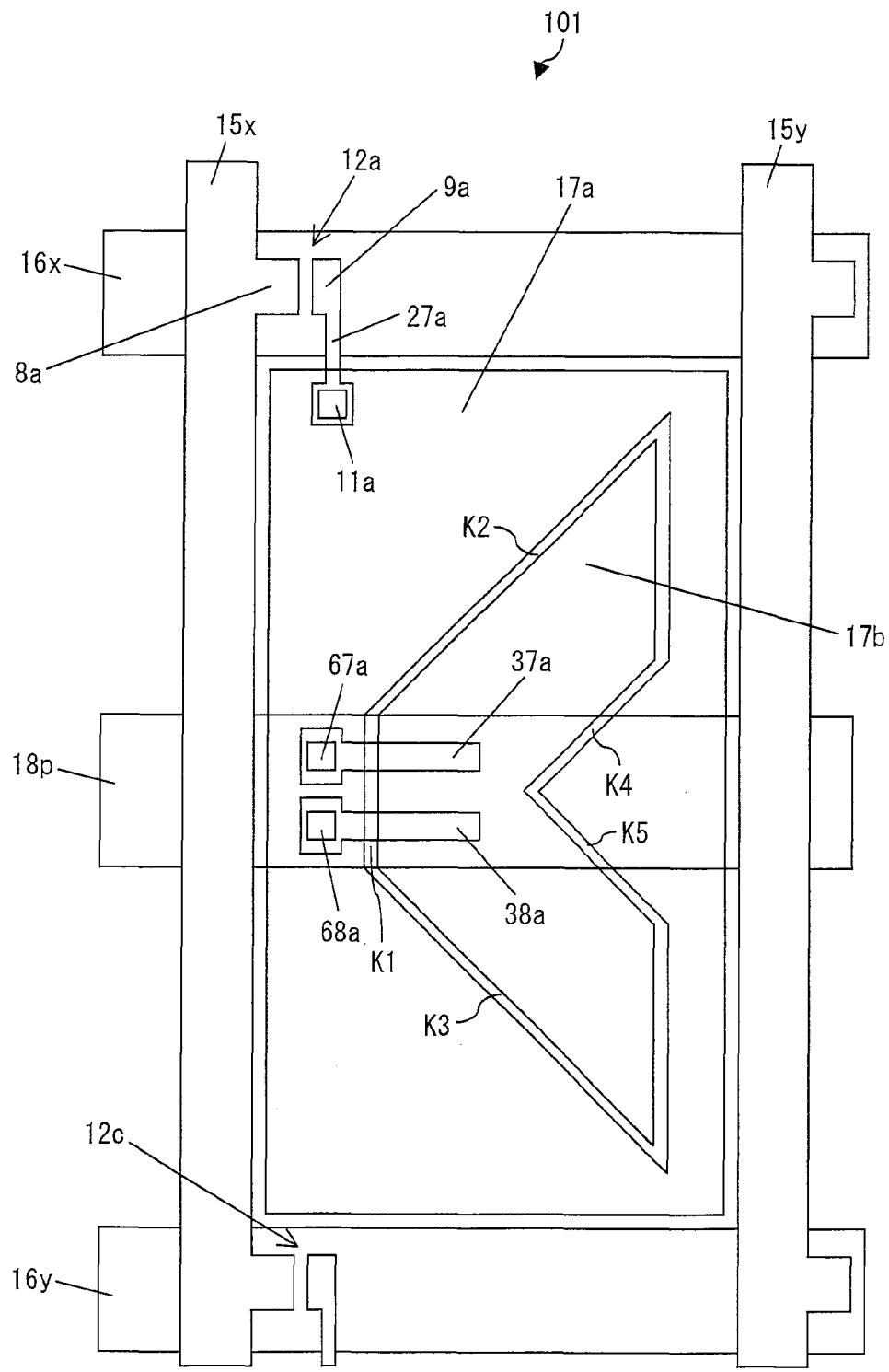
FIG. 20 is a plan view showing a specific example of the liquid crystal panel shown in FIG. 19.

FIG. 20 shows a specific example of the pixel 101 of FIG. 19. As shown in FIG. 20, the transistor 12a is disposed near an intersection between the data signal line 15x and the scanning signal line 16x. In a pixel region defined by the two signal lines (15x and 16x), the pixel electrode 17b, which takes the shape of the letter V as seen right side up in the drawing, and the pixel electrode 17a, which surrounds the pixel electrode 17b, are disposed, and the retention capacitor wire 18p extends along the row-wise direction in such a way as to pass transversely across the center of the pixel. Specifically, the pixel electrode 17b has: a first side, located on the retention capacitor wire 18p, which is at an angle of substantially 90 degrees to the row-wise direction; a second side, which extends from one end of the first side at an angle of substantially 45 degrees to the row-wise direction; a third side, which extends from the other end of the first side at an angle of substantially 315 degrees to the row-wise direction; a fourth side, having one end located on the retention capacitor wire 18p, which is parallel to and shorter than the second side; a fifth side, connected to the one end of the fourth side, which is parallel to and shorter than the third side; a sixth side, which connects the second and fourth sides; and a seventh side, which connects the third and fifth sides. The inner periphery of the pixel electrode 17a consists of seven sides facing the first to seventh sides.

It should be noted that the space between the first side of the pixel electrode 17b and one side of the inner periphery of the pixel electrode 17a which faces the first side serves as a first space K1, that the space between the second side of the pixel electrode 17b and one side of the inner periphery of the pixel electrode 17a which faces the second side serves as a second space K2, that the space between the third side of the pixel electrode 17b and one side of the inner periphery of the pixel electrode 17a which faces the third side serves as a third space K3, that the space between the fourth side of the pixel electrode 17b and one side of the inner periphery of the pixel electrode 17a which faces the fourth side serves as a fourth space K4, and that the space between the fifth side of the pixel electrode 17b and one side of the inner periphery of the pixel electrode 17a which faces the fifth side serves as a fifth space K5. Moreover, each of the capacitor electrodes 37a and 38a is disposed in such a way as to overlap the first space K1 and the pixel electrodes 17a and 17b. More specifically, the capacitor electrodes 37a and 38a are both shaped to extend along the row-wise direction in such a way as to intersect with the first space K1, each arranged along the row-wise direction in such a way as to overlap the retention capacitor wire 18p.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. Further, the capacitor electrode 37a is connected to the pixel electrode 17a via a contact hole 67a and overlaps the pixel electrode 17b via an interlayer insulating film, with the coupling capacitor Cab1 (see FIG. 19) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b via the interlayer insulting film, with the coupling capacitor Cab2 (see FIG. 19) between the pixel electrodes 17a and 17b formed in the overlap section between the capacitor electrode 38a and the pixel electrode 17b. Furthermore, the capacitor electrode 37a overlaps the retention capacitor wire 18p via a gate insulating film, with most of the retention capacitor Cha1 (see FIG. 19) formed in the overlap section between the capacitor electrode 37a and the retention capacitor wire 18p, and the capacitor electrode 38a overlaps the retention capacitor wire 18p via the gate insulating film, with most of the retention capacitor Cha2 (see FIG. 19) formed in the overlap section between the capacitor electrode 38a and the retention capacitor wire 18p. Moreover, the pixel electrode 17b and the retention capacitor wire 18p overlap each other via the interlayer insulating film and the gate insulating film, with the retention capacitor Chb (see FIG. 19) formed in the overlap section between the pixel electrode 17b and the retention capacitor wire 18p.

In the liquid crystal panel of FIG. 20, the pixel electrodes 17a and 17b are connected (capacitively coupled) to each other via the two parallel coupling capacitors (Cab1 and Cab2). Therefore, if the capacitor electrode 37a and the retention capacitor wire 18p or the pixel electrode 17b are short-circuited (during the manufacturing process or the like), for example, the pixel electrodes 17a and 17b can be kept capacitively coupled to each other by carrying out a correcting step of cutting off the capacitor electrode 37a with a laser between the contact hole 67a and the short-circuited site. Furthermore, even if the contact hole 67a is malformed during the manufacturing process or the like, the pixel electrodes 17a and 17b can be kept capacitively coupled to each other. It should be noted that if the capacitor electrode 38a and the retention capacitor wire 18p or the pixel electrode 17b are short-circuited, the capacitor electrode 38a needs only be cut off with a laser between the contact hole 68a and the short-circuited site.

The correcting step is carried out by irradiating the capacitor electrode 37a with a laser through a space between the pixel electrodes 17a and 17b on the front surface (side opposite to the glass substrate) of the active matrix substrate and thereby cutting off the capacitor electrode 37a. This, however, may pose a risk of causing the capacitor electrode 37a and the retention capacitor wire 18p to be short-circuited. This risk can be avoided by providing the retention capacitor wire 18p with an opening that overlaps the first space K1.

It should be noted that if the capacitor electrode 37a and the retention capacitor wire 18p or the pixel electrode 17b are short-circuited, the pixel electrodes 17a and 17b can also be kept capacitively coupled to each other by removing (trimming) a part of the pixel electrode 17a inside of the contact hole 67a by laser or the like to electrically disconnect the pixel electrode 17a and the capacitor electrode 37a from each other.

For the reasons stated above, the present embodiment can increase yields of manufacture of liquid crystal panels and active matrix substrates for use therein.

Further, in the liquid crystal panel of FIG. 20, each of the capacitor electrodes 37a and 38a overlaps the pixel electrode 17b and the retention capacitor wire 18p. By thus making the capacitor electrodes 37a and 38a, which are provided to form coupling capacitors, function also as electrodes to form retention capacitors, an increase in aperture ratio can be brought about.

Further, in the liquid crystal panel of FIG. 20, the pixel electrode 17a surrounds the pixel electrode 17b, which is electrically floating. Therefore, the pixel electrode 17a functions as a shield electrode, e.g., to prevent electric charge from flying into the pixel electrode 17b, thereby preventing the subpixel (dark subpixel) including the pixel electrode 17b from suffering from image sticking.

Figure 21:
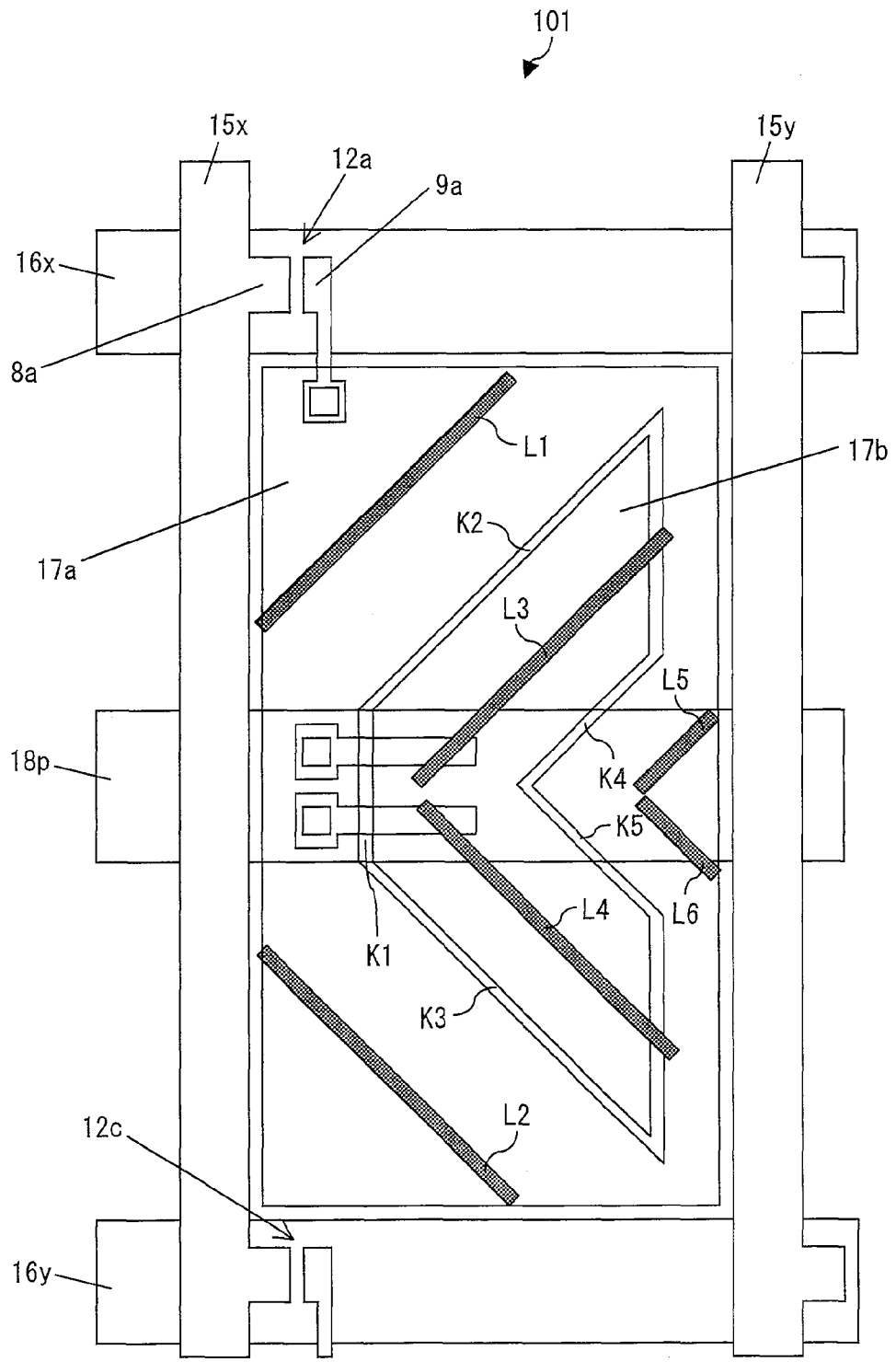
FIG. 21 is a plan view showing another specific example of the liquid crystal panel shown in FIG. 19.

It should be noted that FIG. 20 omits to show an alignment controlling structure. However, in a liquid crystal panel of an MVA (multidomain vertical alignment) type, for example, the spaces K2 to K5 between the pixel electrodes 17a and 17b function as an alignment controlling structure, with ribs L3 and L4 provided in that part of the color filter substrate which corresponds to the pixel electrode 17b, and with ribs L1 and L5 and ribs L2 and L6 provided in that part of the color filter substrate which corresponds to the pixel electrode 17a, as shown in FIG. 21, for example. The ribs L3 is parallel to the spaces K2 and K4, and the rib L4 is parallel to the spaces K3 and K5. The ribs L1 and L5 are parallel to the spaces K2 and K4, and the ribs L2 and L6 are parallel to the spaces K3 and K5. Instead of such alignment controlling ribs being provided, alignment controlling slits may be provided in the common electrode of the color filter substrate.

Figure 22:
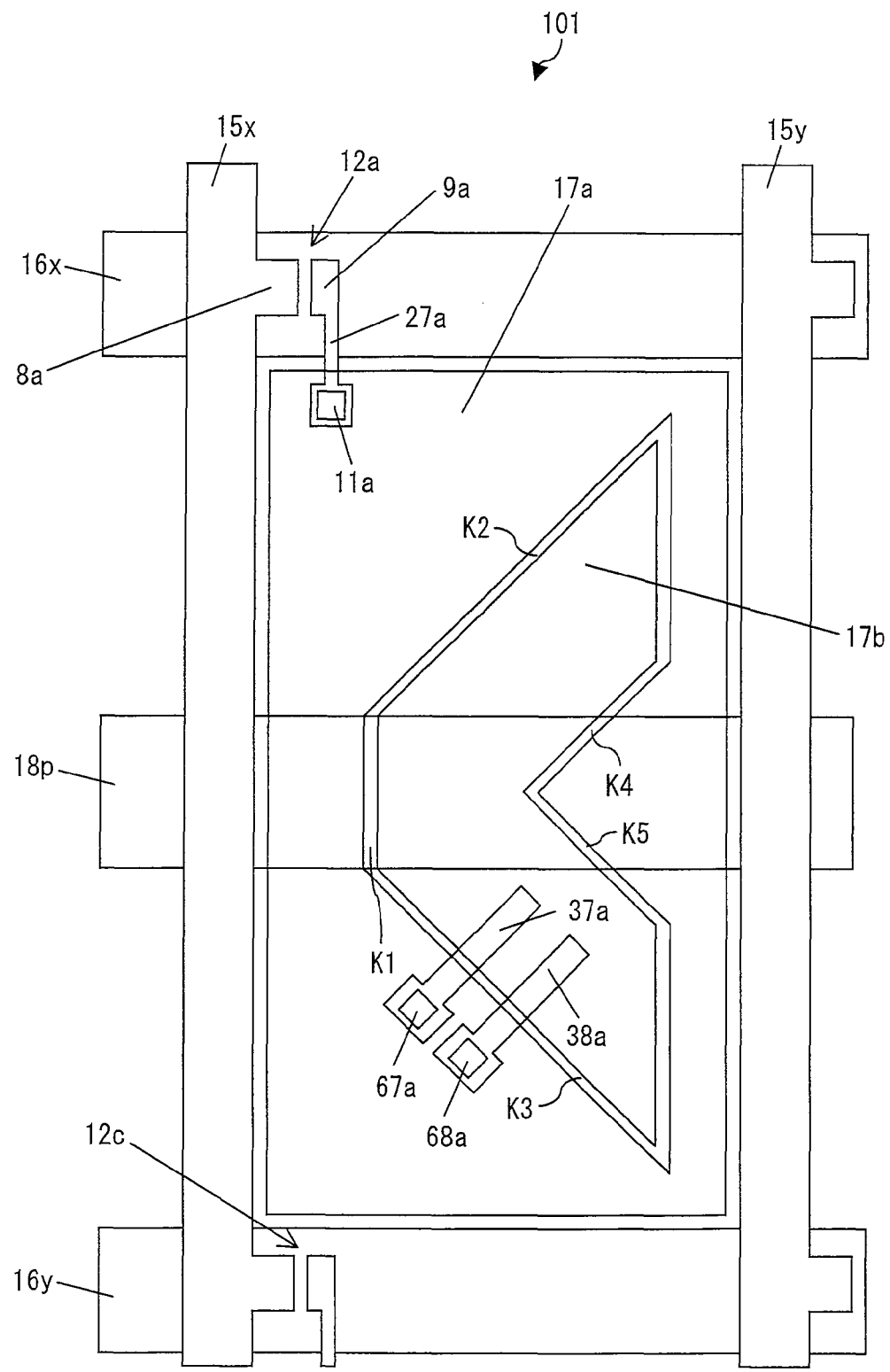
FIG. 22 is a plan view showing another specific example of the liquid crystal panel shown in FIG. 19.

The pixel 101 of FIG. 20 may be modified as shown in FIG. 22. In the configuration of FIG. 22, the capacitor electrodes 37a and 38a are shaped to extend at an angle of 315 degrees to the row-wise direction in such a way as to intersect with the third space K3, and neither the capacitor electrode 37a nor 38a overlaps the retention capacitor wire 18p.

The transistor 12a has its drain electrode 9a connected to a drain drawing wire 27a, and the drain drawing wire 27a is connected to the pixel electrode 17a via a contact hole 11a. Further, the capacitor electrode 37a is connected to the pixel electrode 17a via a contact hole 67a and overlaps the pixel electrode 17b via an interlayer insulating film, with the coupling capacitor Cab1 (see FIG. 19) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b via the interlayer insulting film, with the coupling capacitor Cab2 (see FIG. 19) between the pixel electrodes 17a and 17b formed in the overlap section between the capacitor electrode 38a and the pixel electrode 17b. Further, part of the capacitor electrode 37a overlaps the retention capacitor wire 18p via a gate insulating film and the interlayer insulating film, with the retention capacitors Cha (which correspond to Cha1 and Cha2 of FIG. 19) formed in the overlap section between the capacitor electrode 37a and the retention capacitor wire 18p. Further, part of the pixel electrode 17b overlaps the retention capacitor wire 18p via the interlayer insulating film and the gate insulating film, with the retention capacitor Chb (see FIG. 19) formed in the overlap section between the pixel electrode 17b and the retention capacitor wire 18p.

If, in the liquid crystal panel of FIG. 22, the capacitor electrode 37a and the pixel electrode 17b are short-circuited (during the manufacturing process or the like), the capacitor electrode 37a can be cut off by irradiating it with a laser through the third space K3 on the front surface (side opposite to the glass substrate) of the active matrix substrate. It should be noted that the pixel electrode 17a and the capacitor electrode 37a may be electrically disconnected from each other by removing (trimming) a part of the pixel electrode 17a inside of the contact hole 67a by laser or the like.

Figure 23:
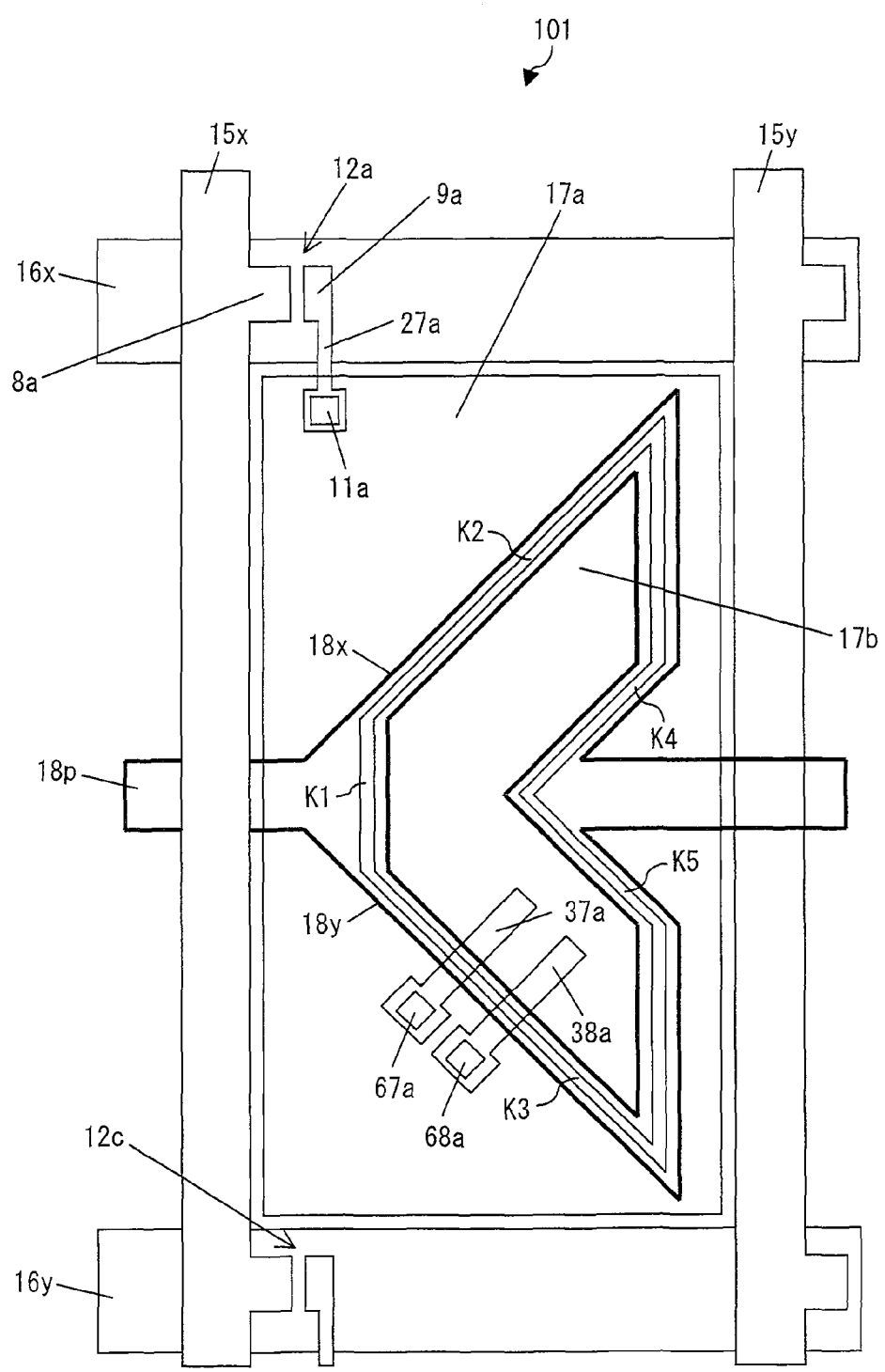
FIG. 23 is a plan view showing another specific example of the liquid crystal panel shown in FIG. 19.

The pixel 101 of FIG. 22 may be modified as shown in FIG. 23. In the configuration of FIG. 23, there are provided a retention capacitor wire extension part 18x extending from the retention capacitor wire 18p in such a way as to overlap the first, second, sixth, and fourth sides of the pixel electrode 17b and converging again with the retention capacitor wire 18p and a retention capacitor wire extension part 18y extending from the retention capacitor wire 18p in such a way as to overlap the first, third, seventh, and fifth sides of the pixel electrode 17b and converging again with the retention capacitor wire 18p.

In the liquid crystal panel of FIG. 23, the retention capacitor wire extension parts 18x and 18y surrounding the pixel electrode 17b, which is electrically floating, function as a shield electrode for the pixel electrode 17b, e.g., to prevent electric charge from flying into the pixel electrode 17b, thereby preventing the subpixel (dark subpixel) including the pixel electrode 17b from suffering from image sticking.

Figure 24:
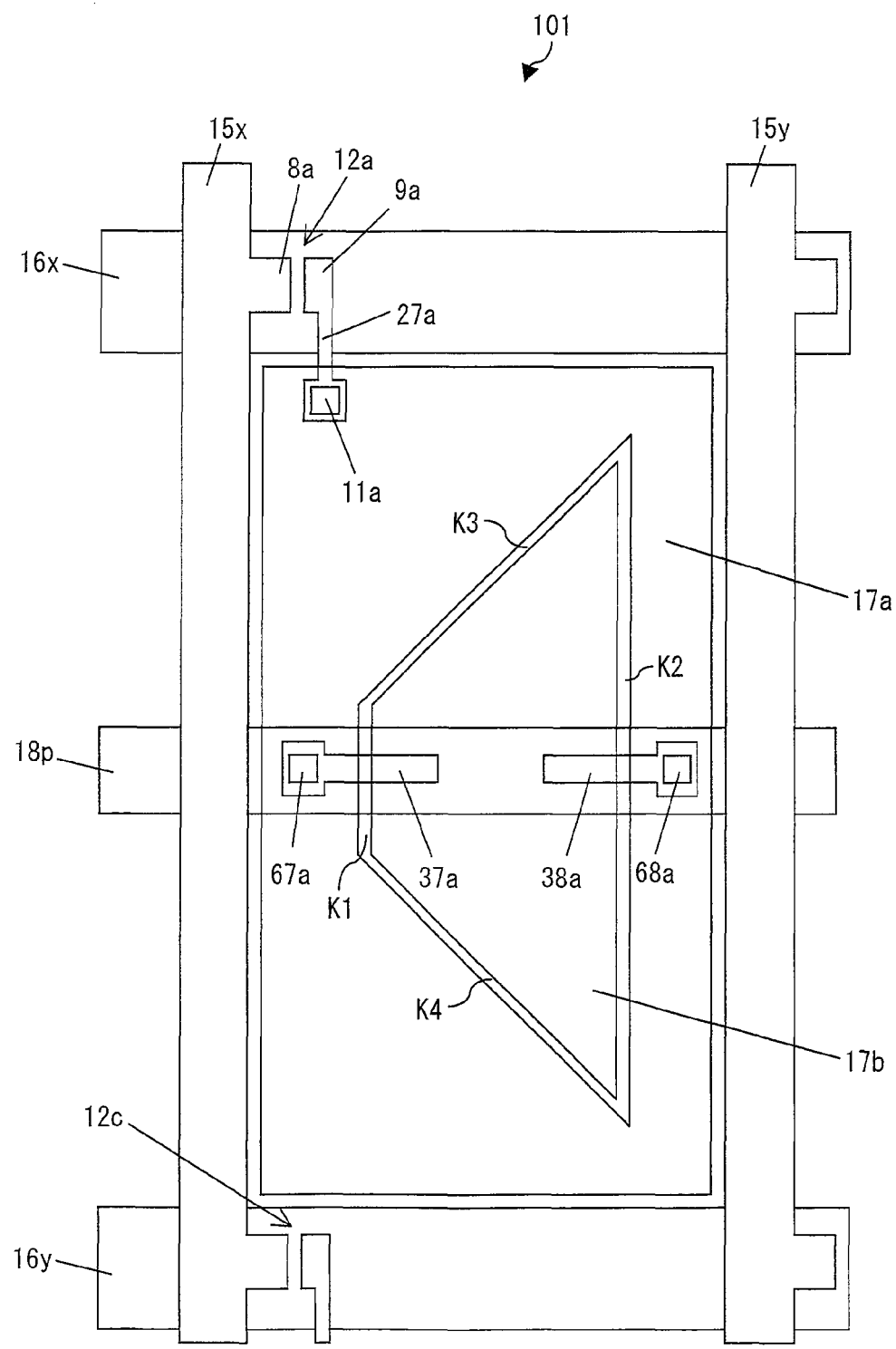
FIG. 24 is a plan view showing another specific example of the liquid crystal panel shown in FIG. 19.

FIG. 24 shows another specific example of the pixel 101 of FIG. 19. As shown in FIG. 24, the transistor 12a is disposed near an intersection between the data signal line 15x and the scanning signal line 16x. In a pixel region defined by the two signal lines (15x and 16x), the pixel electrode 17b, which takes the shape of a trapezoid as seen left side up in the drawing, and the pixel electrode 17a, which surrounds the pixel electrode 17b, are disposed, and the retention capacitor wire 18p extends along the row-wise direction in such a way as to pass transversely across the center of the pixel. Specifically, the pixel electrode 17b has: a first side, which intersects with the retention capacitor wire 18p and which is at an angle of substantially 90 degrees to the row-wise direction; a second side, which is parallel to the first side and which intersects with the retention capacitor wire 18p; a third side, which extends from one end of the first side at an angle of substantially 45 degrees to the row-wise direction; and a fourth side, which extends from the other end of the first side at an angle of substantially 315 degrees to the row-wise direction. The inner periphery of the pixel electrode 17a consists of four sides facing the first to fourth sides, and the outer periphery of the pixel electrode 17a is rectangular.

It should be noted that the space between the first side of the pixel electrode 17b and one side of the inner periphery of the pixel electrode 17a which faces the first side serves as a first space K1, that the space between the second side of the pixel electrode 17b and one side of the inner periphery of the pixel electrode 17a which faces the second side serves as a second space K2, that the capacitor electrode 37a is disposed in such a way as to overlap the pixel electrode 17a, the first space K1, and the pixel electrode 17b, and that the capacitor electrode 38a is disposed in such a way as to overlap the pixel electrode 17a, the first space K2, and the pixel electrode 17b.

More specifically, the capacitor electrode 37a is shaped to extend along the row-wise direction in such a way as to intersect with the first space K1, and the capacitor electrode 38a is shaped to extend along the row-wise direction in such a way as to intersect with the first space K2, each arranged along the row-wise direction in such a way as to overlap the retention capacitor wire 18p. Further, the capacitor electrodes 37a and 38a are disposed in such a way that the capacitor electrode 37a would coincide substantially with the capacitor electrode 37b if the capacitor electrode 37a were rotated 180 degrees around a central point on the retention capacitor wire 18p in the pixel 101. That is, the capacitor electrodes 37a and 38a are line-symmetrical with each other about an axis represented by a line which is parallel to the first and second spaces K1 and K2 and which passes centrally in between the two spaces.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. Further, the capacitor electrode 37a is connected to the pixel electrode 17a via a contact hole 67a and overlaps the pixel electrode 17b via an interlayer insulating film, with the coupling capacitor Cab1 (see FIG. 19) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b via the interlayer insulting film, with the coupling capacitor Cab2 (see FIG. 19) between the pixel electrodes 17a and 17b formed in the overlap section between the capacitor electrode 38a and the pixel electrode 17b. Furthermore, the capacitor electrode 37a overlaps the retention capacitor wire 18p via a gate insulating film, with most of the retention capacitor Cha1 (see FIG. 19) formed in the overlap section between the capacitor electrode 37a and the retention capacitor wire 18p, and the capacitor electrode 38a overlaps the retention capacitor wire 18p via the gate insulating film, with most of the retention capacitor Cha2 (see FIG. 19) formed in the overlap section between the capacitor electrode 38a and the retention capacitor wire 18p. Moreover, the pixel electrode 17b and the retention capacitor wire 18p overlap each other via the interlayer insulating film and the gate insulating film, with the retention capacitor Chb (see FIG. 19) formed in the overlap section between the pixel electrode 17b and the retention capacitor wire 18p.

In the liquid crystal panel of FIG. 24, the pixel electrodes 17a and 17b are connected (capacitively coupled) to each other via the two parallel coupling capacitors (Cab1 and Cab2). Therefore, even if the capacitor electrode 37a and the retention capacitor wire 18p or the pixel electrode 17b are short-circuited (during the manufacturing process or the like), the pixel electrodes 17a and 17b can be kept capacitively coupled to each other by carrying out a correcting step of cutting off the capacitor electrode 37a with a laser between the contact hole 67a and the short-circuited site. Alternatively, if the capacitor electrode 38a and the retention capacitor wire 18p or the pixel electrode 17b are short-circuited, the capacitor electrode 38a needs only be cut off with a laser between the contact hole 68a and the short-circuited site.

The correcting step is carried out by irradiating the capacitor electrode 37a with a laser through the first space K1 on the front surface (side opposite to the glass substrate) of the active matrix substrate and thereby cutting off the capacitor electrode 37a. This, however, may pose a risk of causing the capacitor electrode 37a and the retention capacitor wire 18p to be short-circuited. This risk can be avoided by providing the retention capacitor wire 18p with an opening that overlaps the first space K1.

It should be noted that if the capacitor electrode 37a and the retention capacitor wire 18p or the pixel electrode 17b are short-circuited, the pixel electrodes 17a and 17b can also be kept capacitively coupled to each other by removing (trimming) a part of the pixel electrode 17a inside of the contact hole 67a by laser or the like to electrically disconnect the pixel electrode 17a and the capacitor electrode 37a from each other.

For the reasons stated above, the present embodiment can increase yields of manufacture of liquid crystal panels and active matrix substrates for use therein.

Further, in the liquid crystal panel of FIG. 24, the capacitor electrodes 37a and 38a are disposed side by side along the direction along which the retention capacitor wire 18p extends (which corresponds to the row-wise direction), in such a way as to overlap the retention capacitor wire 18p. Further, the capacitor electrodes 37a and 38a are line-symmetrical with each other about an axis represented by a line which is parallel to the first and second spaces K1 and K2 and which passes centrally in between the two spaces. For this reason, even if the alignment of the pixel electrodes 17a and 17b is displaced along the row-wise direction with respect to the capacitor electrodes 37a and 38a, the area of overlap between the capacitor electrode 37a and the pixel electrode 17b and the area of overlap between the capacitor electrode 38a and the pixel electrode 17b compensate for each other. This gives such a merit that the total capacitance of the two coupling capacitors (Cab 1 and Cab2) is unlikely to change.

Further, in the liquid crystal panel of FIG. 24, each of the capacitor electrodes 37a and 38a overlaps the pixel electrode 17b and the retention capacitor wire 18p. By thus making the capacitor electrodes 37a and 38a, which are provided to form coupling capacitors, function also as electrodes to form retention capacitors, an increase in aperture ratio can be brought about.

Furthermore, since the capacitor electrodes 37a and 38a are shaped to extend along the row-wise direction and arranged along the row-wise direction in such a way as to overlap the retention capacitor wire 18p, the width of the retention capacitor wire 18p can be narrowed. This brings about a further increase in aperture ratio.

Figure 25:
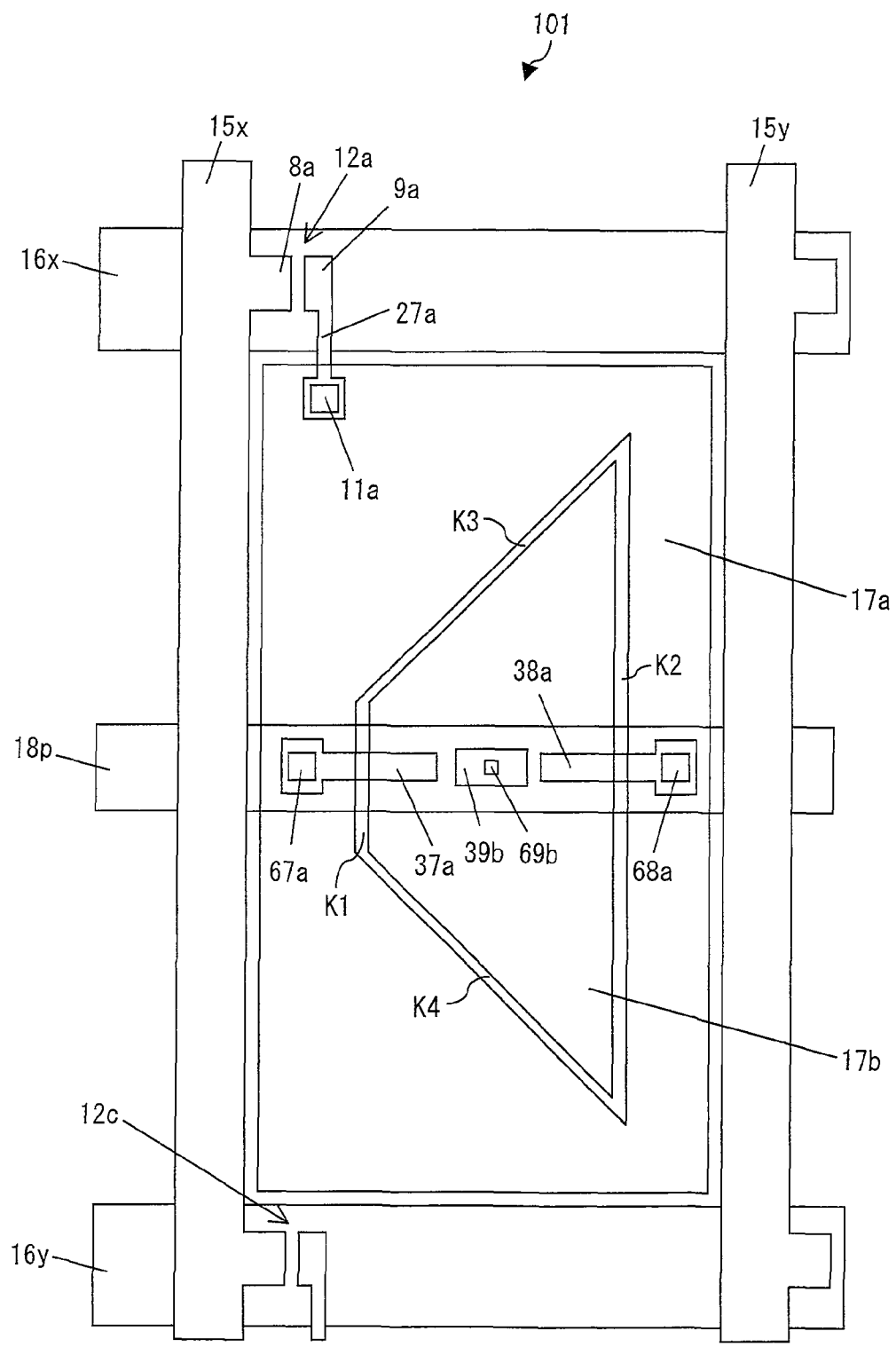
FIG. 25 is a plan view showing another specific example of the liquid crystal panel shown in FIG. 19.

It should be noted that from a standpoint of reliability, it is preferable that the value of capacitance of the retention capacitor Chb be large. Accordingly, the retention capacitor Chb may be formed as configured in FIG. 25. That is, as shown in FIG. 25, a retention capacitor electrode 39b, formed in the same layer as the capacitor electrodes 37a and 38a, is connected to the pixel electrode 17b via a contact hole 69b, whereby the retention capacitor Chb is formed between the retention capacitor electrode 39b and the retention capacitor wire 18p. In the case of this configuration, as compared to the case of FIG. 24 where the retention capacitor Chb is formed between the pixel electrode 17b and the retention capacitor wire 18p, a smaller (thinner) insulating film can be sandwiched therebetween; therefore, the value of retention capacitance can be gained. Further, since the retention capacitor Chb can be formed by a thinner insulating film, the width of the retention capacitor wire 18p can be narrowed without changing the magnitude of value of retention capacitance. This brings about an increase in aperture ratio without erosion of reliability.

Figure 26:
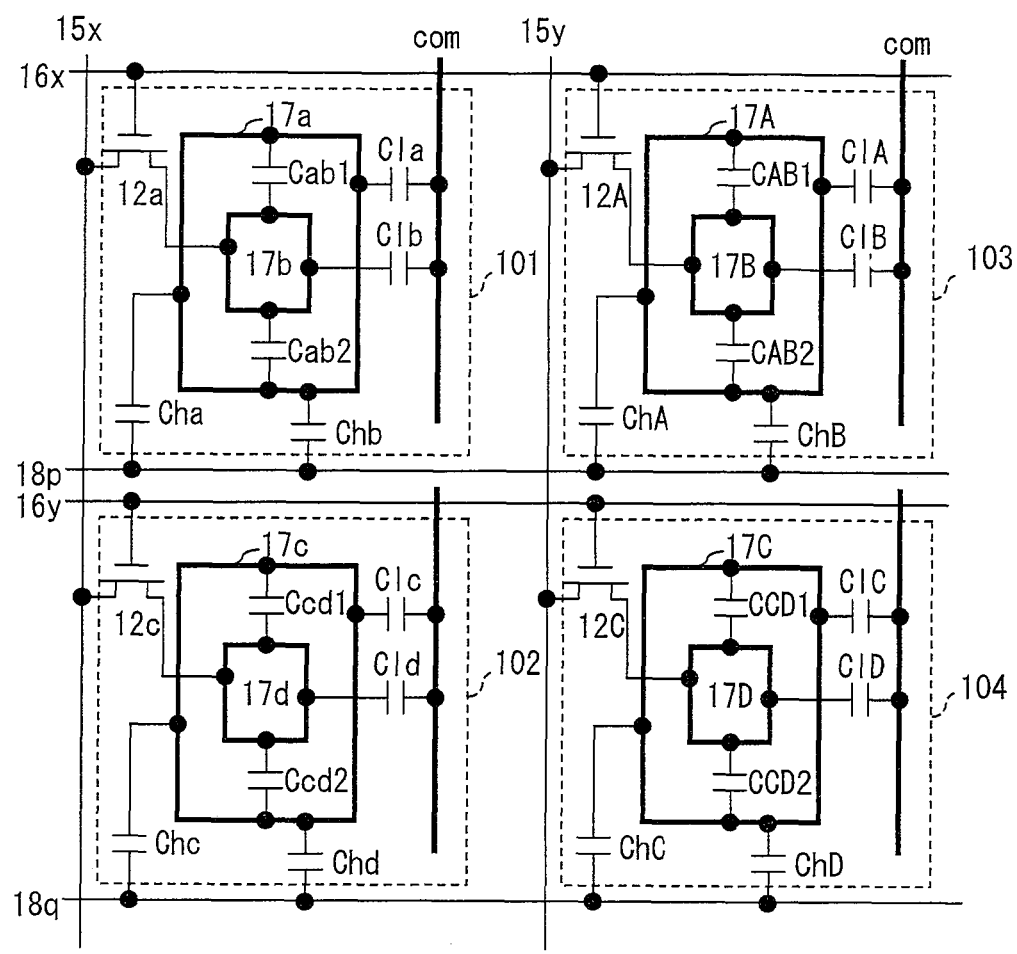
FIG. 26 is a circuit diagram showing the configuration of another liquid crystal panel according to Embodiment 2.

It should be noted here that although, in FIG. 19, one of the two pixel electrodes of each pixel surrounds the other, and this surrounding one is connected to the transistor, this does not imply any limitation. As shown in FIG. 26, one of the two pixel electrodes of each pixel surrounds the other, and this surrounded one may be connected to the transistor.

Figure 27:
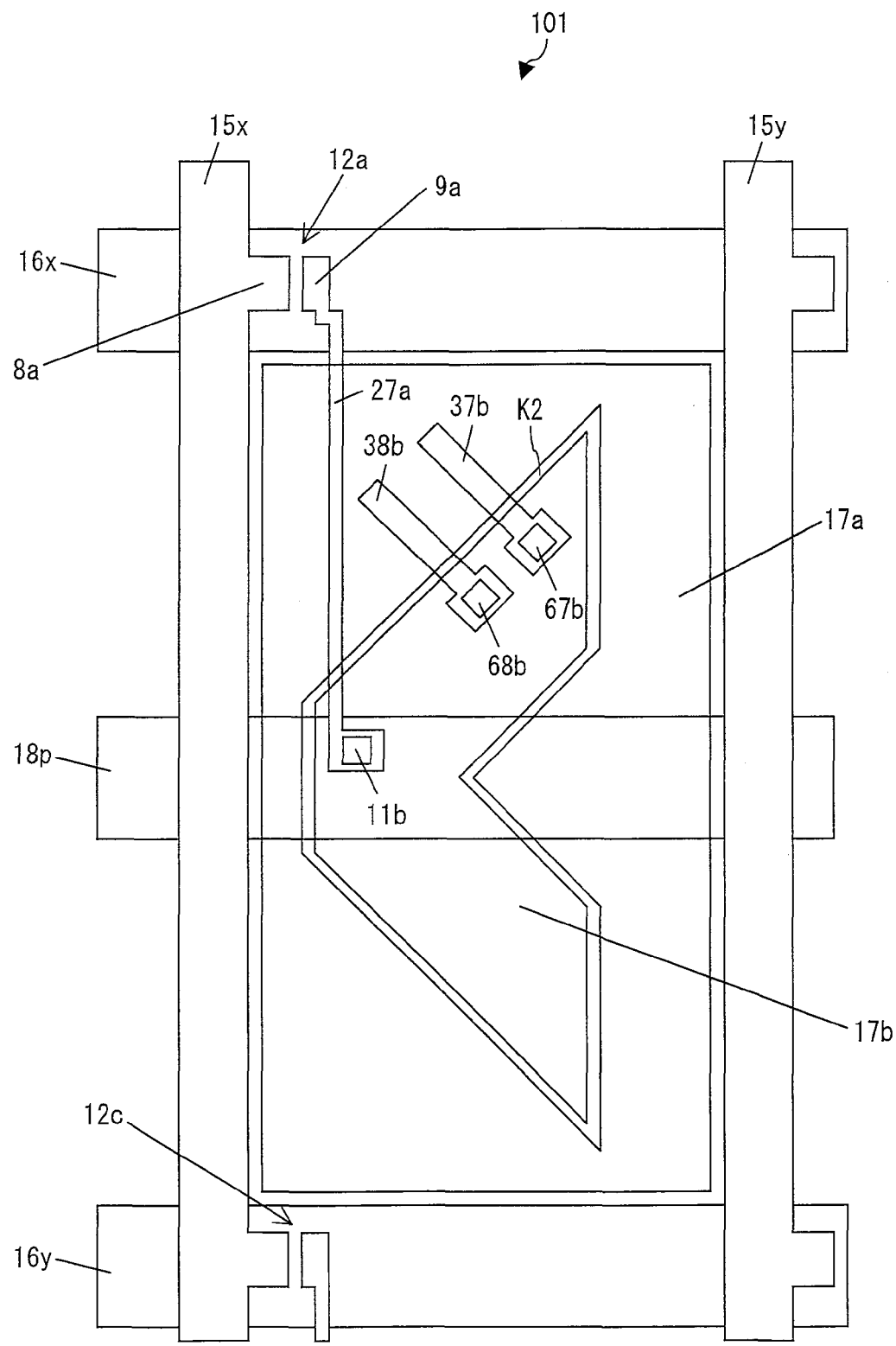
FIG. 27 is a plan view showing a specific example of the liquid crystal panel shown in FIG. 26.

FIG. 27 shows a specific example of the pixel 101 of FIG. 26. As shown in FIG. 26, the pixel electrodes 17a and 17b and the retention capacitor wire 18p are identical in shape and disposition to those of FIG. 20. Each of the capacitor electrodes 37b and 38b is disposed in such a way as to overlap the second space K2 and the pixel electrodes 17a and 17b.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17b via a contact hole 11b. The capacitor electrode 37b is connected to the pixel electrode 17b via a contact hole 67b, and part of the capacitor electrode 37b overlaps the pixel electrode 17a via an interlayer insulating film, with the coupling capacitor Cab1 (see FIG. 26) formed in the overlap section between the capacitor electrode 37b and the pixel electrode 17a. Further, the capacitor electrode 38b is connected to the pixel electrode 17b via a contact hole 68b, and part of the capacitor electrode 38b overlaps the pixel electrode 17a via the interlayer insulting film, with the coupling capacitor Cab2 (see FIG. 26) formed in the overlap section between the capacitor electrode 38b and the pixel electrode 17a. Further, part of the pixel electrode 17a overlaps the retention capacitor wire 18p via a gate insulating film and the interlayer insulating film, with the retention capacitor Cha (see FIG. 26) formed in the overlap section between the pixel electrode 17a and the retention capacitor wire 18p, and part of the pixel electrode 17b overlaps the retention capacitor wire 18p via the gate insulating film and the interlayer insulating film, with the retention capacitor Chb (see FIG. 26) formed in the overlap section between the pixel electrode 17b and the retention capacitor wire 18p.

In the liquid crystal panel of FIG. 27, the subpixel including the pixel electrode 17a serves as "dark", and the subpixel including the pixel electrode 17b serves as "bright".

In the liquid crystal panel of FIG. 27, the pixel electrodes 17a and 17b are connected (capacitively coupled) to each other via the two parallel coupling capacitors (Cab1 and Cab2). Therefore, if the capacitor electrode 37b and the pixel electrode 17a are short-circuited (during the manufacturing process or the like), for example, the pixel electrodes 17a and 17b can be kept capacitively coupled to each other by carrying out a correcting step of cutting off the capacitor electrode 37b with a laser between the contact hole 67b and the short-circuited site. Furthermore, even if the contact hole 67b is malformed during the manufacturing process or the like, the pixel electrodes 17a and 17b can be kept capacitively coupled to each other. It should be noted that if the capacitor electrode 38b and the pixel electrode 17a are short-circuited, the capacitor electrode 38b needs only be cut off with a laser between the contact hole 68b and the short-circuited site.

The correcting step is carried out by irradiating the capacitor electrode 37b with a laser through the second space K2 on the front surface (side opposite to the glass substrate) of the active matrix substrate and thereby cutting off the capacitor electrode 37b. For the reasons stated above, the present embodiment can increase yields of manufacture of liquid crystal panels and active matrix substrates for use therein.

Further, the liquid crystal panel of FIG. 27 is configured such that the pixel electrode 17a, which corresponds to a dark subpixel, surrounds the pixel electrode 17b, which corresponds to a bright subpixel. This configuration brings about an effect of clearly displaying an image of high spatial frequency.

Figure 28:
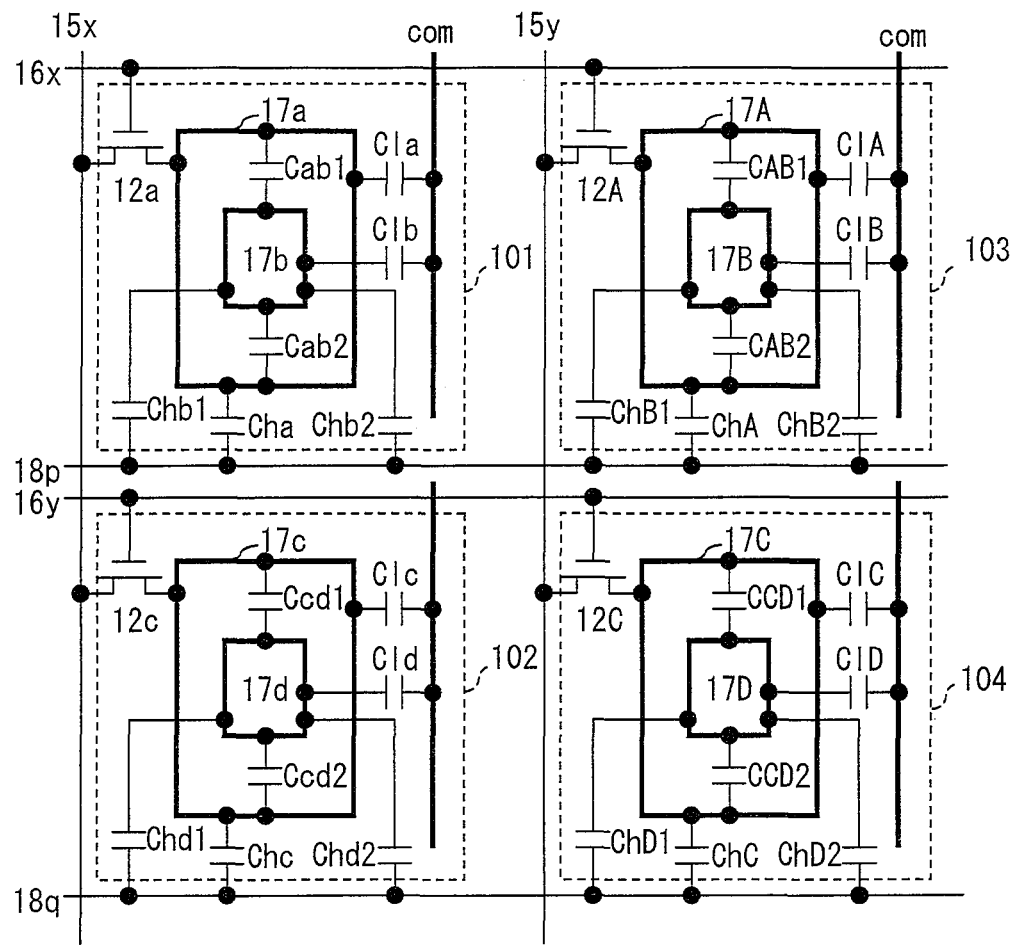
FIG. 28 is a circuit diagram showing the configuration of another liquid crystal panel according to Embodiment 2.
Figure 29:
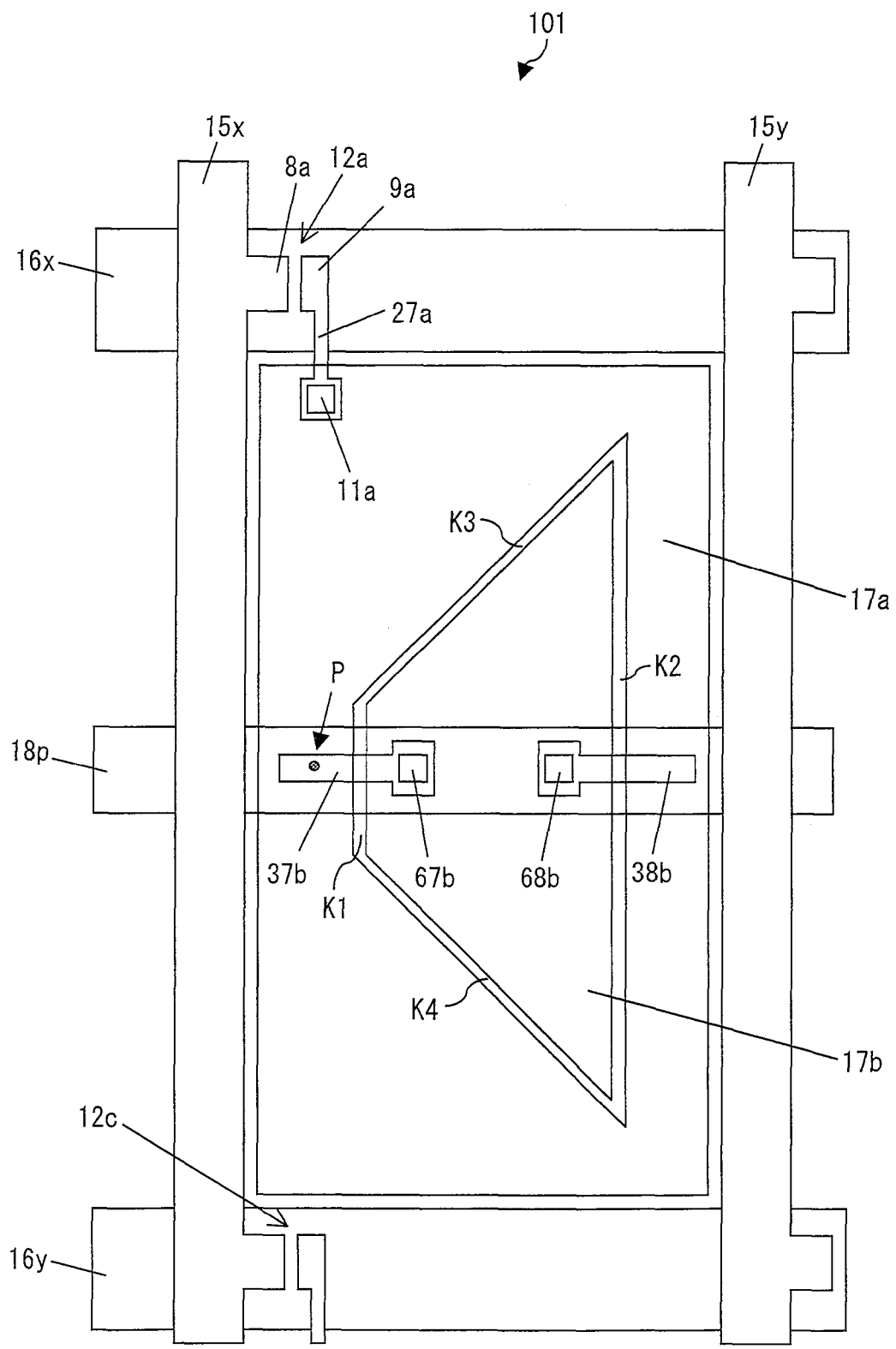
FIG. 29 is a plan view showing a specific example of the liquid crystal panel shown in FIG. 28.

It should be noted here that although each of those liquid crystal panels described above is configured such that a capacitor electrode is electrically connected to a pixel electrode corresponding to a subpixel that serves as a bright subpixel, this does not imply any limitation. The present liquid crystal panel may be configured such that as shown in FIG. 28, a capacitor electrode is electrically connected to a pixel electrode corresponding to a subpixel that serves as a dark subpixel. FIG. 29 shows a specific example of the pixel 101 of FIG. 28.

In the liquid crystal panel of FIG. 29, as in the liquid crystal panel of FIG. 24, the transistor 12a is disposed near an intersection between the data signal line 15x and the scanning signal line 16x. In a pixel region defined by the two signal lines (15x and 16x), the pixel electrode 17b, which takes the shape of a trapezoid as seen left side up in the drawing, and the pixel electrode 17a, which surrounds the pixel electrode 17b, are disposed, and the retention capacitor wire 18p extends along the row-wise direction in such a way as to pass transversely across the center of the pixel.

More specifically, the capacitor electrode 37b is shaped to extend along the row-wise direction in such a way as to intersect with the first space K1, and the capacitor electrode 38b is shaped to extend along the row-wise direction in such a way as to intersect with the first space K2, each arranged along the row-wise direction in such a way as to overlap the retention capacitor wire 18p. Further, the capacitor electrodes 37b and 38b are disposed in such a way that the capacitor electrode 37b would coincide substantially with the capacitor electrode 38b if the capacitor electrode 37b were rotated 180 degrees around a central point on the retention capacitor wire 18p in the pixel 101. That is, the capacitor electrodes 37b and 38b are line-symmetrical with each other about an axis represented by a line which is parallel to the first and second spaces K1 and K2 and which passes centrally in between the two spaces.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. Further, the capacitor electrode 37b is connected to the pixel electrode 17b via a contact hole 67b and overlaps the pixel electrode 17a via an interlayer insulating film, with the coupling capacitor Cab1 (see FIG. 28) between the pixel electrodes 17a and 17b formed in the overlap section between the capacitor electrode 37b and the pixel electrode 17a. Further, the capacitor electrode 38b is connected to the pixel electrode 17b via a contact hole 68b and overlaps the pixel electrode 17a via the interlayer insulting film, with the coupling capacitor Cab2 (see FIG. 28) between the pixel electrodes 17a and 17b formed in the overlap section between the capacitor electrode 38b and the pixel electrode 17a. Furthermore, the capacitor electrode 37b overlaps the retention capacitor wire 18p via a gate insulating film, with most of the retention capacitor Chb1 (see FIG. 28) formed in the overlap section between the capacitor electrode 37b and the retention capacitor wire 18p, and the capacitor electrode 38b overlaps the retention capacitor wire 18p via the gate insulating film, with most of the retention capacitor Chb2 (see FIG. 28) formed in the overlap section between the capacitor electrode 38b and the retention capacitor wire 18p. Further, the pixel electrode 17a and the retention capacitor wire 18p overlap each other via the interlayer insulating film and the gate insulating film, with the retention capacitor Cha (see FIG. 28) formed in the overlap section between the pixel electrode 17a and the retention capacitor wire 18p.

Thus, the subpixel including the pixel electrode 17a serves as "bright", and the subpixel including the pixel electrode 17b serves as "dark".

In the liquid crystal panel of FIG. 29, the pixel electrodes 17a and 17b are connected (capacitively coupled) to each other via the two parallel coupling capacitors (Cab1 and Cab2). Therefore, if the capacitor electrode 37b and the pixel electrode 17a are short-circuited at P in FIG. 29 (during the manufacturing process or the like), for example, the pixel electrodes 17a and 17b can be kept capacitively coupled to each other by carrying out a correcting step of cutting off the capacitor electrode 37b with a laser between the contact hole 67b and the short-circuited site. Alternatively, if the capacitor electrode 38b and the pixel electrode 17a are short-circuited, the capacitor electrode 38b needs only be cut off with a laser between the contact hole 68b and the short-circuited site.

Further, in the liquid crystal panel of FIG. 29, as in the liquid crystal panel of FIG. 24, the capacitor electrodes 37b and 38b are disposed side by side along the direction along which the retention capacitor wire 18p extends (which corresponds to the row-wise direction), in such a way as to overlap the retention capacitor wire 18p, and the capacitor electrodes 37a and 38a are line-symmetrical with each other about an axis represented by a line which is parallel to the first and second spaces K1 and K2 and which passes centrally in between the two spaces. For this reason, even if the alignment of the pixel electrodes 17a and 17b is displaced along the row-wise direction with respect to the capacitor electrodes 37b and 38b, the area of overlap between the capacitor electrode 37b and the pixel electrode 17a and the area of overlap between the capacitor electrode 38b and the pixel electrode 17a compensate for each other. This gives such a merit that the total capacitance of the two coupling capacitors (Cab 1 and Cab2) is unlikely to change.

It should be noted, needless to say, that such a configuration as shown in FIG. 29 that a capacitor electrode is electrically connected to a pixel electrode corresponding to a subpixel that serves as a dark subpixel can be applied to those liquid crystal panels described above.

Meanwhile, in the liquid crystal panel according to Embodiment 2 of the present invention, as in the liquid crystal panel according to Embodiment 1 (see FIG. 4), a thick organic gate insulating film 21 and a thin inorganic gate insulting film 22 may be formed on the glass substrate 31, and a thin inorganic interlayer insulating film 25 and a thick organic interlayer insulting film 26 may be formed under the pixel electrodes. This brings about effects of reducing various parasitic capacitances, preventing wires from being short-circuited with each other, and reducing cracking or the like in a pixel electrode due to planarization. In this case, it is preferable that in a region indicated by a dotted frame in FIG. 30, as was shown in FIG. 4, that part of the organic gate insulating film 21 which is located under the capacitor electrodes 37a and 38a be bored through and that part of the organic interlayer insulating film 26 which is located above the capacitor electrodes 37a and 38a be bored through. This makes it possible to achieve the above effects while securing sufficient values of capacitance for the coupling capacitors (Cab 1 and Cab2) and the retention capacitors (Cha1, Cha2, and Chb).

Figure 30:
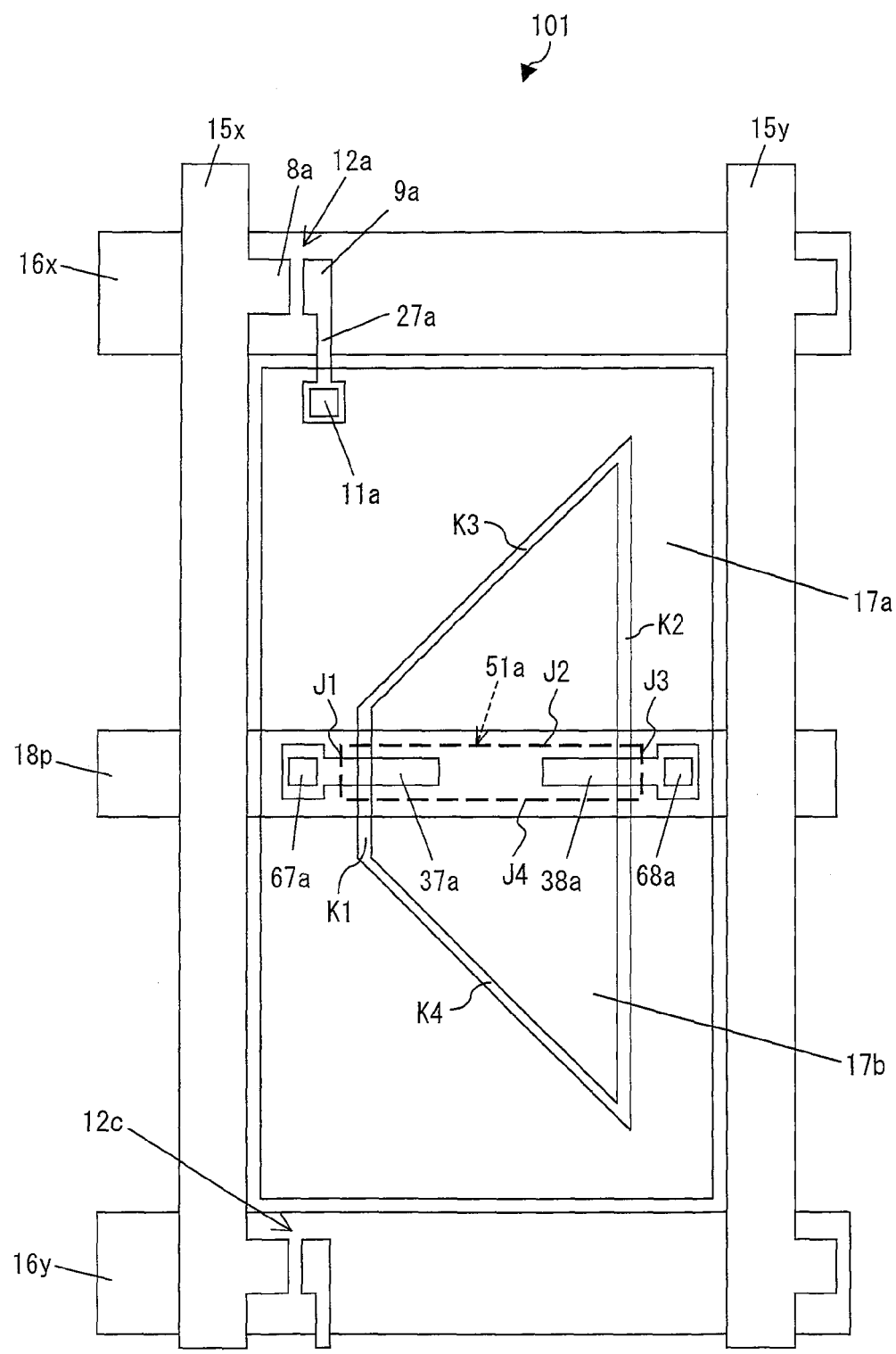
FIG. 30 is a plan view showing another specific example of the liquid crystal panel shown in FIG. 28.

Further, as was shown in FIG. 45, the bored part (thin-film pat 51a) of the organic interlayer insulating film 26 of FIG. 30 takes the shape of a rectangle having first to fourth sides (J1 to J4), with the capacitor electrode 37a straddling the first side (J1), and with the capacitor electrode 38a, which is disposed side by side with the capacitor electrode 37a along the row-wise direction, straddling the third side (J3), which is a side opposite to the first side (J1). Thus, even if the capacitor electrodes 37a and 38a are displaced along the row-wise direction, the area of overlap between the capacitor electrode 37a and the pixel electrode 17b and the area of overlap between the capacitor electrode 38a and the pixel electrode 17b compensate for each other. This gives such an effect that the total capacitance of the two capacitors (coupling capacitors) is unlikely to change.

Figure 46:
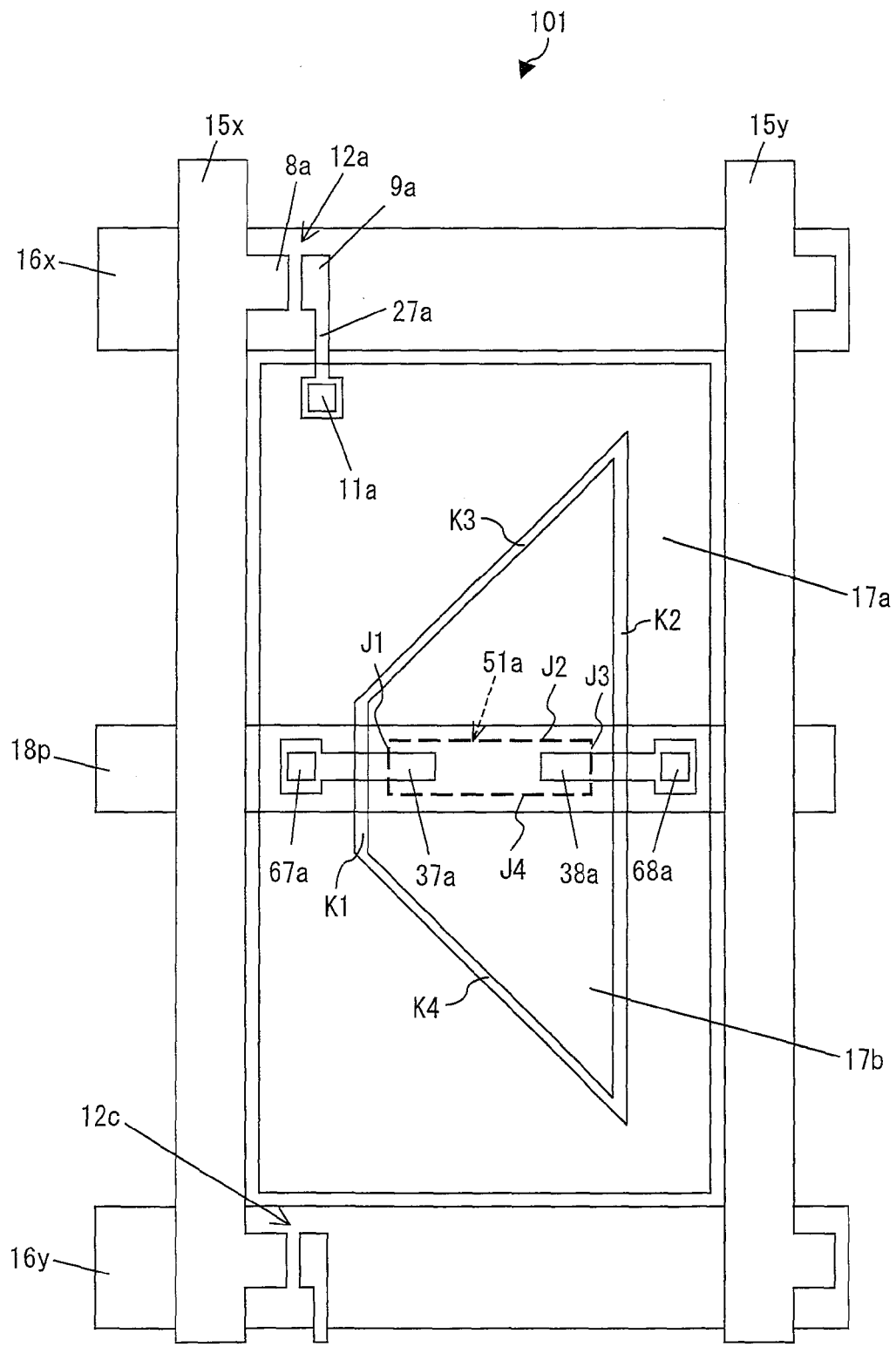
FIG. 46 is a plan view showing another specific example of the liquid crystal panel shown in FIG. 28.

Further, as shown in FIG. 46, the thin-film pat 51a of FIG. 30 may be formed within a region corresponding to the pixel electrode 17b in such a way as to overlap only the pixel electrode 17b. That is, the thin-film pat 51a is configured such that the first to fourth sides (J1 to J4) of the rectangle are located within the region corresponding to the pixel electrode 17b. This brings about an effect of decreasing the area of overlap between the capacitor electrodes 37a and 38a and the pixel electrode 17b, thus reducing the likelihood of the capacitor electrodes 37a and 38a and the pixel electrode 17b being short-circuited, in addition to the effect obtained through the above configuration of FIG. 30 (the total capacitance of the two capacitors is unlikely to change).

Embodiment 3

Figure 31:
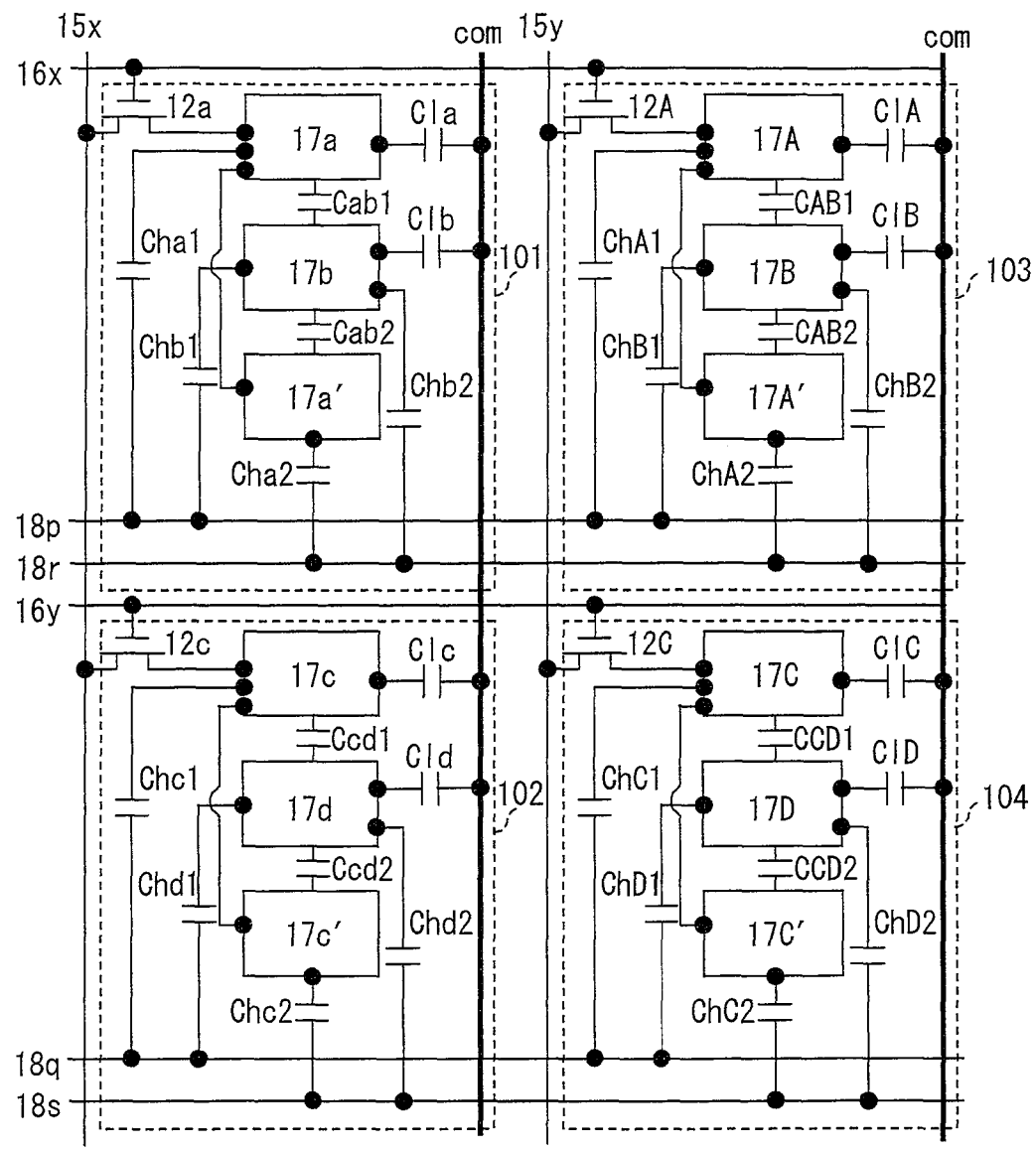
FIG. 31 is a circuit diagram showing the configuration of a liquid crystal panel according to Embodiment 3.

FIG. 31 is an equivalent circuit diagram showing part of a liquid crystal panel according to Embodiment 3. As shown in FIG. 31, the present liquid crystal panel includes: data signal lines (15x and 15y) extending along a column-wise direction (which corresponds to the vertical direction in the drawing); scanning signal lines (16x and 16x) extending along a row-wise direction (which corresponds to the horizontal direction in the drawing); pixels (101 to 104) arranged along the row-wise and column-wise directions; retention capacitor wires (18p to 18s); and a common electrode (counter electrode) com, with the pixels being identical in structure to one another. It should be noted that a column of pixels including the pixels 101 and 102 and a column of pixels including the pixels 103 and 104 are adjacent to each other, and a row of pixels including the pixels 101 and 103 and a row of pixels including the pixels 102 and 104 are adjacent to each other.

In the present liquid crystal panel, there are provided one data signal line, one scanning signal line, and two retention capacitor wires in correspondence with each pixel. Further, each pixel has three pixel electrodes provided therein. Specifically, the pixel 101 has three pixel electrodes 17a, 17b, and 17a' provided therein. The pixel 102 has three pixel electrodes 17c, 17d, and 17c' provided therein. The pixel 103 has three pixel electrodes 17A, 17B, and 17A' provided therein. The pixel 104 has two pixel electrodes 17C, 17D, and 17C' provided therein.

Figure 32:
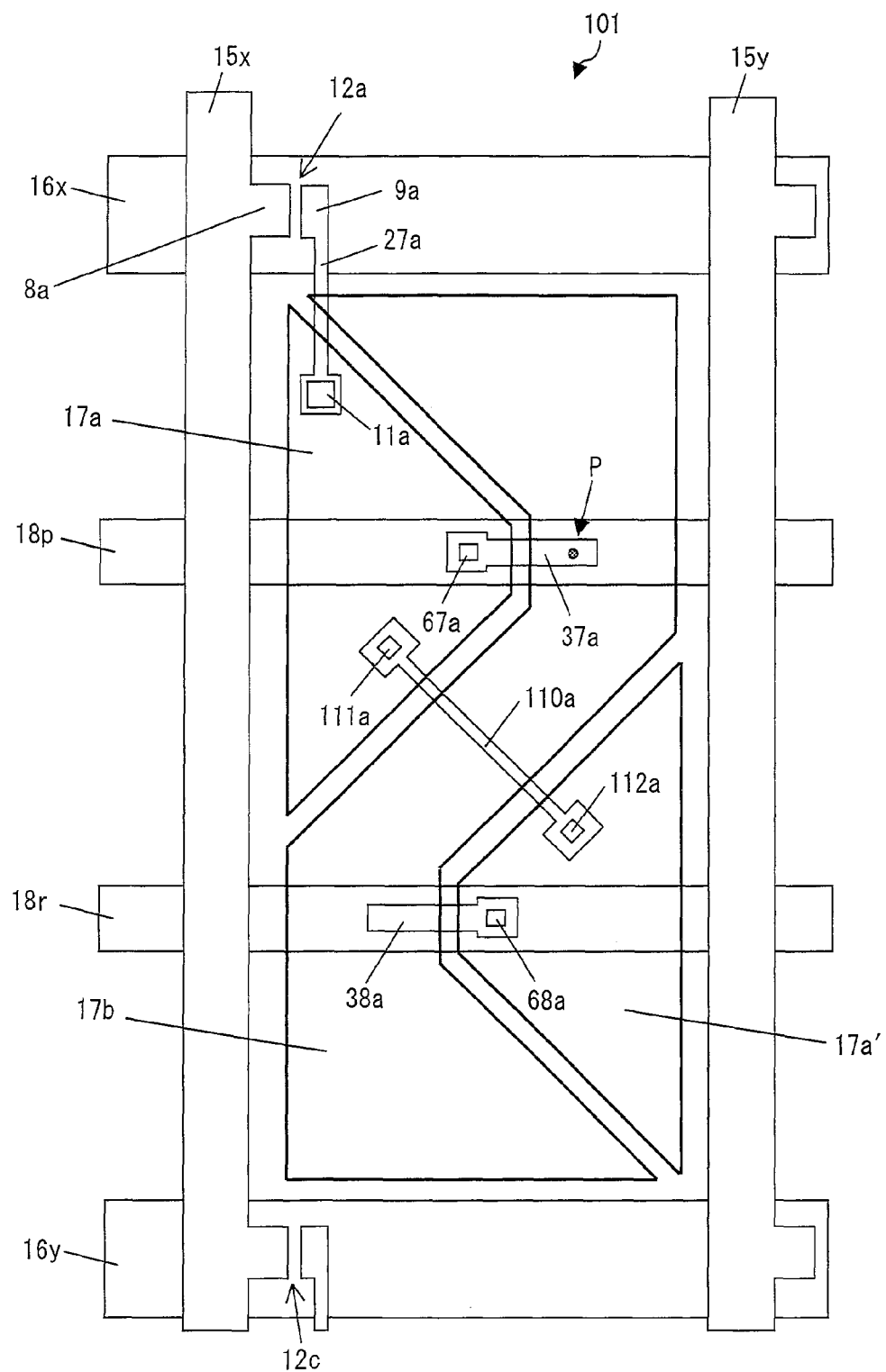
FIG. 32 is a plan view showing a specific example of the liquid crystal panel shown in FIG. 31.

FIG. 32 shows a specific example of the pixel 101 of FIG. 31. As shown in FIG. 32, the transistor 12a is disposed near an intersection between the data signal line 15x and the scanning signal line 16x. Provided in a pixel region defined by the two signal lines (15x and 16x) are: the pixel electrode 17a, which takes the shape of a trapezoid; the pixel electrode 17b, located at an angle of substantially 315 degrees to the row-wise direction of the retention capacitor wire 18p, which takes the shape of a trapezoid that coincides substantially with a shape that is obtained by rotating the pixel electrode 17a 180 degrees; and the pixel electrode 17b, which is disposed in a region excluding the pixel electrodes 17a and 17a' in such a way as to fit (engage) with the shapes of the pixel electrodes 17a and 17a'. Further, the retention capacitor wires 18p and 18r are disposed in parallel with each other. The retention capacitor wire 18p extends along the row-wise direction in such a way as to pass transversely across the pixel electrodes 17a and 17b, and the retention capacitor wire 18r extends along the row-wise direction in such a way as to pass transversely across the pixel electrodes 17b and 17a'.

Such a configuration allows the pixel electrodes 17a, 17b, and 17a' to be disposed in such a way that part of the pixel electrode 17a is close to the scanning signal wire 16x, that part of the pixel electrode 17a' is close to the scanning signal wire 16y, that one end of the pixel electrode 17b is close to the scanning signal line 16, and that the other end of the pixel electrode 17b is close to the scanning signal line 16y. In other words, at least part of the pixel electrode 17a and at least part of the pixel electrode 17a' are close to the scanning signal lines 16x and 16y, respectively, and the pixel electrode 17b extends along the column-wise direction in such a way as to connect the scanning signal wires 16x and 16y to each other. The capacitor electrode 37a is disposed in such a way as to overlap the retention capacitor wire 18p and the pixel electrodes 17a and 17b, and the capacitor electrode 38a is disposed in such a way as to overlap the retention capacitor wire 18r and the pixel electrodes 17b and 17a'.

More specifically, the capacitor electrode 37a extends along the same direction as the direction along which the retention capacitor wire 18p extends, and overlaps the retention capacitor wire 18p and the pixel electrodes 17a and 17b. The capacitor electrode 38a, disposed in parallel with the capacitor electrode 37a to take a shape that coincides substantially with a shape that is obtained by rotating the capacitor electrode 37a 180 degrees, extends along the same direction as the direction along which the retention capacitor wire 18r extends, and overlaps the retention capacitor wire 18r and the pixel electrodes 17b and 17a'.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. The pixel electrode 17a is connected to a relay wire 110a via a contact hole 111a, and the relay wire 110a is connected to the pixel electrode 17a' via a contact hole 112a. Further, the capacitor electrode 37a is connected to the pixel electrode 17a via a contact hole 67a and overlaps the pixel electrode 17b via an interlayer insulating film, with the coupling capacitor Cab1 (see FIG. 31) between the pixel electrodes 17a and 17b formed in the overlap section between the capacitor electrode 37a and the pixel electrode 17b. Further, the capacitor electrode 38a is connected to the pixel electrode 17a' via a contact hole 68a and overlaps the pixel electrode 17b via the interlayer insulting film, with the coupling capacitor Cab2 (see FIG. 31) between the pixel electrodes 17a' and 17b formed in the overlap section between the capacitor electrode 38a and the pixel electrode 17b. Further, the capacitor electrode 37a overlaps the retention capacitor wire 18p via a gate insulating film, with most of the retention capacitor Cha1 (see FIG. 31) formed in the overlap section between the capacitor electrode 37a and the retention capacitor wire 18p, and the capacitor electrode 38a overlaps the retention capacitor wire 18r via the gate insulating film, with most of the retention capacitor Cha2 (see FIG. 31) formed in the overlap section between the capacitor electrode 38a and the retention capacitor wire 18r. Further, the pixel electrode 17b and the retention capacitor wire 18p overlap each other via the interlayer insulating film and the gate insulating film, with the retention capacitor Chb1 (see FIG. 31) formed in the overlap section between the pixel electrode 17b and the retention capacitor wire 18p, and the pixel electrode 17b and the retention capacitor wire 18r overlap each other via the interlayer insulating film and the gate insulating film, with the retention capacitor Chb2 (see FIG. 31) formed in the overlap section between the pixel electrode 17b and the retention capacitor wire 18r.

In the liquid crystal panel of FIG. 32, the subpixels including the pixel electrodes 17a and 17a' serve as "bright", and the subpixel including the pixel electrode 17b serves as "dark".

In the liquid crystal panel of FIG. 32, the pixel electrodes 17a and 17a' and the pixel electrode 17b are connected (capacitively coupled) to each other via the two parallel coupling capacitors (Cab1 and Cab2). Therefore, if the capacitor electrode 37a and the pixel electrode 17b are short-circuited at P in FIG. 32 (during the manufacturing process or the like), for example, the pixel electrodes 17a, 17b, and 17a' can be kept capacitively coupled to each other by carrying out a correcting step of cutting off the capacitor electrode 37a with a laser between the contact hole 67a and the short-circuited site. Furthermore, even if the contact hole 67a is malformed during the manufacturing process or the like, the pixel electrodes 17a, 17b, and 17a' can be kept capacitively coupled to each other. It should be noted that if the capacitor electrode 38a and the pixel electrode 17b are short-circuited, the capacitor electrode 38a needs only be cut off with a laser between the contact hole 68a and the short-circuited site.

It should be noted that if the capacitor electrode 37a and the retention capacitor wire 18p or the pixel electrode 17b are short-circuited, the pixel electrodes 17a, 17b, and 17a' can also be kept capacitively coupled to each other by removing (trimming) a part of the pixel electrode 17a inside of the contact hole 67a by laser or the like to electrically disconnect the pixel electrode 17a and the capacitor electrode 37a from each other.

For the reasons stated above, the present embodiment can increase yields of manufacture of liquid crystal panels and active matrix substrates for use therein.

Further, in the liquid crystal panel of FIG. 32, the capacitor electrode 37a extends along the same direction as the direction along which the retention capacitor wire 18p extends, and overlaps the retention capacitor wire 18p and the pixel electrodes 17a and 17b. The capacitor electrode 38a, taking a shape that coincides substantially with a shape that is obtained by rotating the capacitor electrode 37a 180 degrees, extends along the same direction as the direction along which the retention capacitor wire 18r extends, and overlaps the retention capacitor wire 18r and the pixel electrodes 17b and 17a'. For this reason, even if the alignment of the pixel electrodes 17a, 17b, and 17a' is displaced along the row-wise direction with respect to the capacitor electrodes 37a and 38a, the area of overlap between the capacitor electrode 37a and the pixel electrode 17b and the area of overlap between the capacitor electrode 38a and the pixel electrode 17b compensate for each other. This gives such a merit that the total capacitance of the two coupling capacitors (Cab 1 and Cab2) is unlikely to change.

Further, in the liquid crystal panel of FIG. 32, the capacitor electrodes 37a overlaps the pixel electrode 17b and the retention capacitor wire 18p, and the capacitor electrodes 38a overlaps the pixel electrode 17b' and the retention capacitor wire 18r. By thus making the capacitor electrodes 37a and 38a, which are provided to form coupling capacitors, function also as electrodes to form retention capacitors, an increase in aperture ratio can be brought about.

Furthermore, since the capacitor electrodes 37a and 38a are shaped to extend along the row-wise direction and disposed in such a way as to overlap the retention capacitor wires 18p and 18r, the widths of the retention capacitor wires 18p and 18r can be narrowed. This brings about a further increase in aperture ratio.

Figure 33:
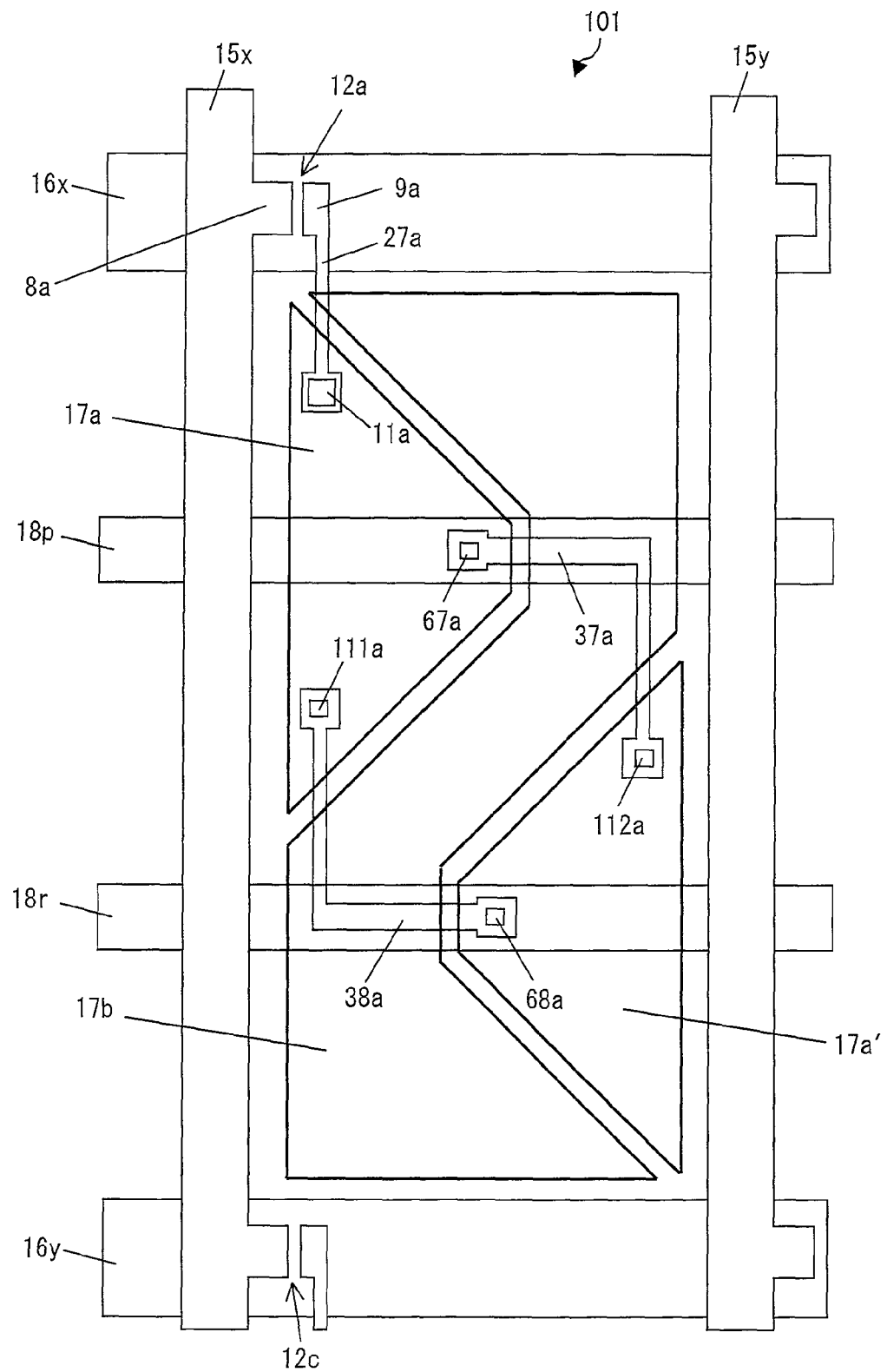
FIG. 33 is a plan view showing another specific example of the liquid crystal panel shown in FIG. 31.

The pixel 101 of FIG. 32 may be modified as shown in FIG. 33. In the configuration of FIG. 33, the transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. The pixel electrode 17a has one end connected to the pixel electrode 17a via a contact hole 67a, with the other end connected the pixel electrode 17a' via a contact hole 112a. Further, the capacitor electrode 37a overlaps the pixel electrode 17b via an interlayer insulating film, with the coupling capacitors Cab1 and Cab2 (see FIG. 31) between the pixel electrodes 17a and 17a' and the pixel electrode 17b formed in the overlap section between the capacitor electrode 37a and the pixel electrode 17b. The capacitor electrode 38a has one end connected to the pixel electrode 17a via a contact hole 111a, with the other end connected to the pixel electrode 17a' via a contact hole 68a. Further, the capacitor electrode 38a overlaps the pixel electrode 17b via the interlayer insulting film, with the coupling capacitors Cab1 and Cab2 (see FIG. 31) between the pixel electrodes 17a and 17a' and the pixel electrode 17b formed in the overlap section between the capacitor electrode 38a and the pixel electrode 17b. Furthermore, the capacitor electrode 37a overlaps the retention capacitor wire 18p via a gate insulating film, with most of the retention capacitor Cha1 (see FIG. 31) formed in the overlap section between the capacitor electrode 37a and the retention capacitor wire 18p, and the capacitor electrode 38a overlaps the retention capacitor wire 18r via the gate insulating film, with most of the retention capacitor Cha2 (see FIG. 31) formed in the overlap section between the capacitor electrode 38a and the retention capacitor wire 18r. Further, the pixel electrode 17b and the retention capacitor wire 18p overlap each other via the interlayer insulating film and the gate insulating film, with the retention capacitor Chb1 (see FIG. 31) formed in the overlap section between the pixel electrode 17b and the retention capacitor wire 18p, and the pixel electrode 17b and the retention capacitor wire 18r overlap each other via the interlayer insulating film and the gate insulating film, with the retention capacitor Chb2 (see FIG. 31) formed in the overlap section between the pixel electrode 17b and the retention capacitor wire 18r.

Figure 34:
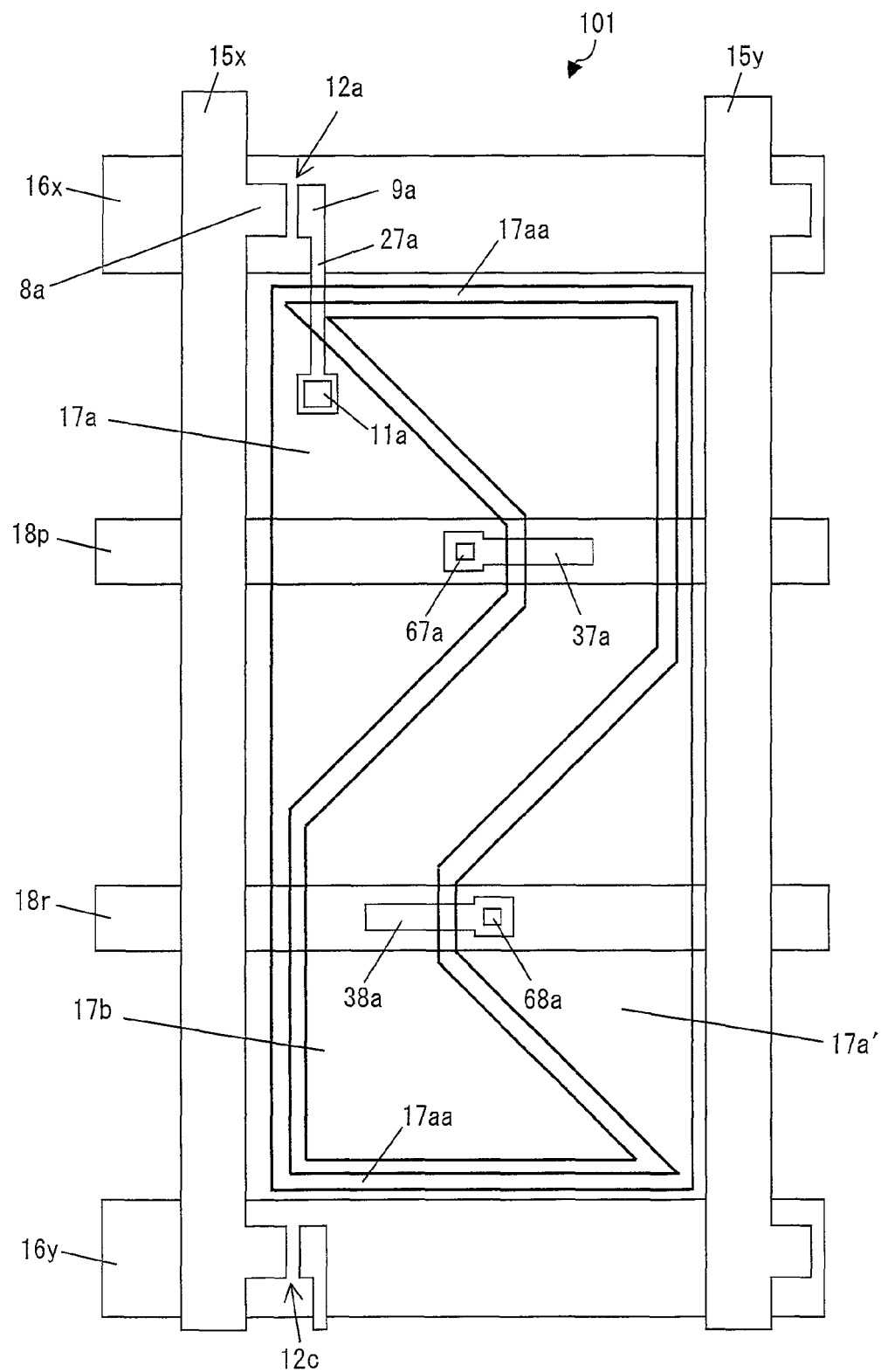
FIG. 34 is a plan view showing another specific example of the liquid crystal panel shown in FIG. 31.

The pixel 101 of FIG. 32 may be modified as shown in FIG. 34. In the configuration of FIG. 34, the pixel electrodes 17a and 17a' are connected to each other via connecting parts 17aa composed of ITO or the like in a region surrounding the pixel electrode 17b. That is, a pixel electrode formed integrally by the pixel electrodes 17a and 17a' is provided in such a way as to surround the pixel electrode 17b. This eliminates the need for the contact holes 111a and 112a and the relay wire 110a via which the pixel electrodes 17a and 17a' are connected to each other, thereby bringing about an increase in aperture ratio.

Further, the pixel electrodes 17a and 17a' surround the pixel electrode 17b, which is electrically floating. Therefore, the pixel electrodes 17a and 17a' function as shield electrodes, e.g., to prevent electric charge from flying into the pixel electrode 17b, thereby preventing the subpixel (dark subpixel) including the pixel electrode 17b from suffering from image sticking.

Figure 35:
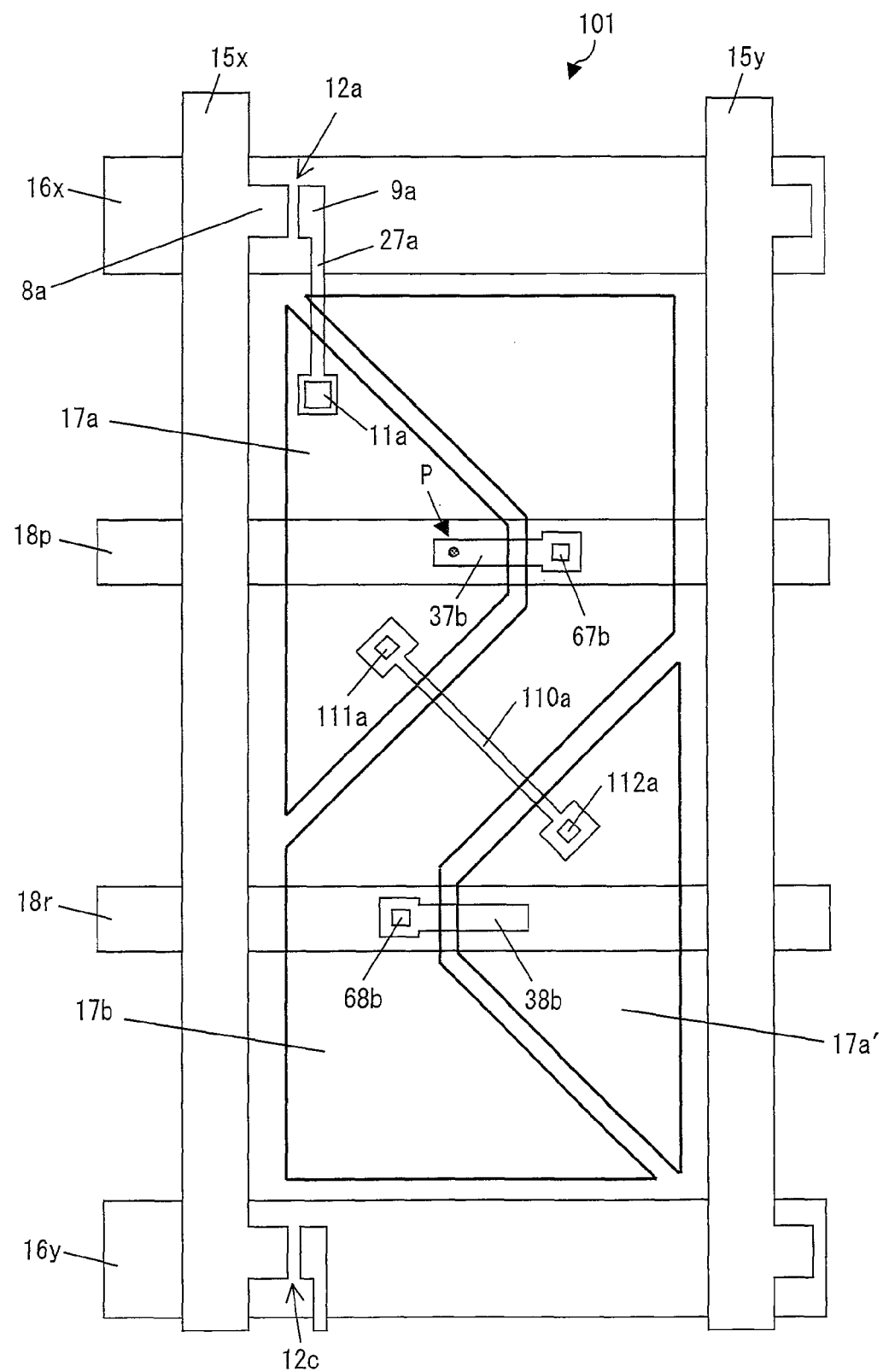
FIG. 35 is a plan view showing another specific example of the liquid crystal panel shown in FIG. 31.

It should be noted here that although each of those liquid crystal panels described above is configured such that a capacitor electrode is electrically connected to a pixel electrode corresponding to a subpixel that serves as a bright subpixel, this does not imply any limitation. The present liquid crystal panel may be configured such that as shown in FIG. 17, a capacitor electrode is electrically connected to a pixel electrode corresponding to a subpixel that serves as a dark subpixel. FIG. 35 shows a specific example of the pixel 101 thus configured.

In the liquid crystal panel of FIG. 35, the transistor 12a is disposed near an intersection between the data signal line 15x and the scanning signal line 16x. Provided in a pixel region defined by the two signal lines (15x and 16x) are: the pixel electrode 17a, which takes the shape of a trapezoid; the pixel electrode 17b, located at an angle of substantially 315 degrees to the row-wise direction of the retention capacitor wire 18p, which takes the shape of a trapezoid that coincides substantially with a shape that is obtained by rotating the pixel electrode 17a 180 degrees; and the pixel electrode 17b, which is disposed in a region excluding the pixel electrodes 17a and 17a' in such a way as to fit (engage) with the shapes of the pixel electrodes 17a and 17a'. Further, the retention capacitor wires 18p and 18r are disposed in parallel with each other. The retention capacitor wire 18p extends along the row-wise direction in such a way as to pass transversely across the pixel electrodes 17a and 17b, and the retention capacitor wire 18r extends along the row-wise direction in such a way as to pass transversely across the pixel electrodes 17b and 17a'.

Such a configuration allows the pixel electrodes 17a, 17b, and 17a' to be disposed in such a way that part of the pixel electrode 17a is close to the scanning signal wire 16x, that part of the pixel electrode 17a' is close to the scanning signal wire 16y, that one end of the pixel electrode 17b is close to the scanning signal line 16, and that the other end of the pixel electrode 17b is close to the scanning signal line 16y. In other words, at least part of the pixel electrode 17a and at least part of the pixel electrode 17a' are close to the scanning signal lines 16x and 16y, respectively, and the pixel electrode 17b extends along the column-wise direction in such a way as to connect the scanning signal wires 16x and 16y to each other. The capacitor electrode 37b is disposed in such a way as to overlap the retention capacitor wire 18p and the pixel electrodes 17a and 17b, and the capacitor electrode 38b is disposed in such a way as to overlap the retention capacitor wire 18r and the pixel electrodes 17b and 17a'. More specifically, the capacitor electrode 37b extends along the same direction as the direction along which the retention capacitor wire 18p extends, and overlaps the retention capacitor wire 18p and the pixel electrodes 17a and 17b. The capacitor electrode 38b, disposed in parallel with the capacitor electrode 37b to take a shape that coincides substantially with a shape that is obtained by rotating the capacitor electrode 37b 180 degrees, extends along the same direction as the direction along which the retention capacitor wire 18r extends, and overlaps the retention capacitor wire 18r and the pixel electrodes 17b and 17a'.

The transistor 12a has its source and drain electrodes 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. The pixel electrode 17a is connected to a relay wire 110a via a contact hole 111a, and the relay wire 110a is connected to the pixel electrode 17a' via a contact hole 112a. Further, the capacitor electrode 37b is connected to the pixel electrode 17b via a contact hole 67b and overlaps the pixel electrode 17a via an interlayer insulating film, with the coupling capacitor Cab1 (see FIG. 31) between the pixel electrodes 17a and 17b formed in the overlap section between the capacitor electrode 37b and the pixel electrode 17a. Further, the capacitor electrode 38b is connected to the pixel electrode 17b via a contact hole 68b and overlaps the pixel electrode 17a' via the interlayer insulting film, with the coupling capacitor Cab2 (see FIG. 31) between the pixel electrodes 17a' and 17b formed in the overlap section between the capacitor electrode 38b and the pixel electrode 17a'. Further, the capacitor electrode 37b overlaps the retention capacitor wire 18p via a gate insulating film, with most of the retention capacitor Chb1 (see FIG. 31) formed in the overlap section between the capacitor electrode 37b and the retention capacitor wire 18p, and the capacitor electrode 38b overlaps the retention capacitor wire 18r via the gate insulating film, with most of the retention capacitor Chb2 (see FIG. 31) formed in the overlap section between the capacitor electrode 38b and the retention capacitor wire 18r. Further, the pixel electrode 17a and the retention capacitor wire 18p overlap each other via the interlayer insulating film and the gate insulating film, with the retention capacitor Cha1 (see FIG. 31) formed in the overlap section between the pixel electrode 17a and the retention capacitor wire 18p, and the pixel electrode 17a' and the retention capacitor wire 18r overlap each other via the interlayer insulating film and the gate insulating film, with the retention capacitor Cha2 (see FIG. 31) formed in the overlap section between the pixel electrode 17a' and the retention capacitor wire 18r.

In the liquid crystal panel of FIG. 35, the subpixels including the pixel electrodes 17a and 17a' serve as "bright", and the subpixel including the pixel electrode 17b serves as "dark".

In the liquid crystal panel of FIG. 35, the pixel electrodes 17a and 17b are connected (capacitively coupled) to each other via the two parallel coupling capacitors (Cab1 and Cab2). Therefore, if the capacitor electrode 37b and the pixel electrode 17a are short-circuited at P in FIG. 35 (during the manufacturing process or the like), for example, the pixel electrodes 17a, 17b, and 17a' can be kept capacitively coupled to each other by carrying out a correcting step of cutting off the capacitor electrode 37b with a laser between the contact hole 67b and the short-circuited site. Alternatively, if the capacitor electrode 38b and the pixel electrode 17a' are short-circuited, the capacitor electrode 38b needs only be cut off with a laser between the contact hole 68b and the short-circuited site.

It should be noted, needless to say, that such a configuration as shown in FIG. 35 that a capacitor electrode is electrically connected to a pixel electrode corresponding to a subpixel that serves as a dark subpixel can be applied to those liquid crystal panels described above.

Embodiment 4

Figure 36:
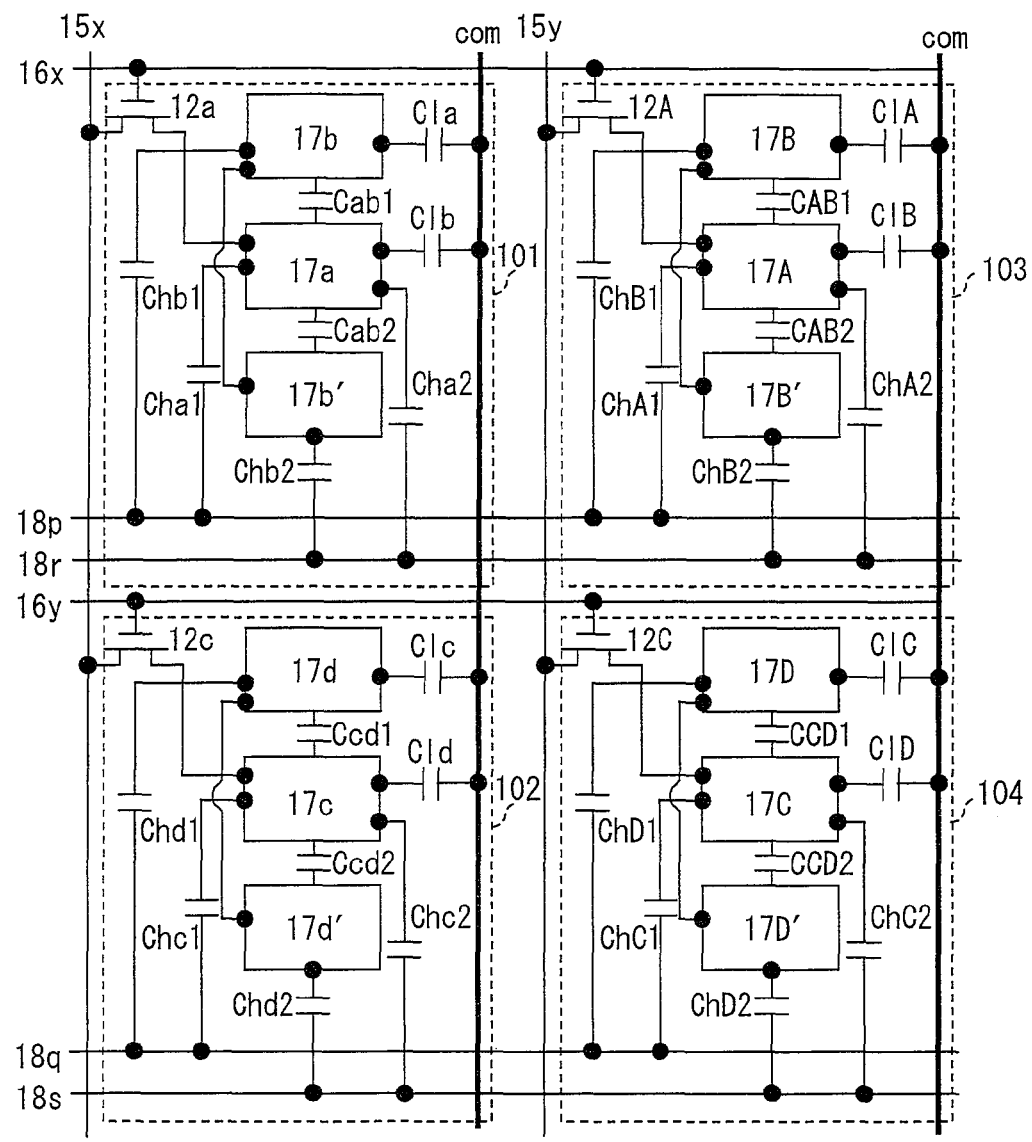
FIG. 36 is a circuit diagram showing the configuration of another liquid crystal panel according to Embodiment 4.

FIG. 36 is an equivalent circuit diagram showing part of a liquid crystal panel according to Embodiment 4. As shown in FIG. 36, the present liquid crystal panel includes: data signal lines (15x and 15y) extending along a column-wise direction (which corresponds to the vertical direction in the drawing); scanning signal lines (16x and 16y) extending along a row-wise direction (which corresponds to the horizontal direction in the drawing); pixels (101 to 104) arranged along the row-wise and column-wise directions; retention capacitor wires (18p to 18s); and a common electrode (counter electrode)

com, with the pixels being identical in structure to one another. It should be noted that a column of pixels including the pixels 101 and 102 and a column of pixels including the pixels 103 and 104 are adjacent to each other, and a row of pixels including the pixels 101 and 103 and a row of pixels including the pixels 102 and 104 are adjacent to each other.

In the present liquid crystal panel, there are provided one data signal line, one scanning signal line, and two retention capacitor wires in correspondence with each pixel. Further, each pixel has three pixel electrodes provided therein. Specifically, the pixel 101 has three pixel electrodes 17b, 17a, and 17b' provided therein. The pixel 102 has three pixel electrodes 17d, 17c, and 17d' provided therein. The pixel 103 has three pixel electrodes 17B, 17A, and 17B' provided therein. The pixel 104 has two pixel electrodes 17D, 17C, and 17D' provided therein.

Figure 37:
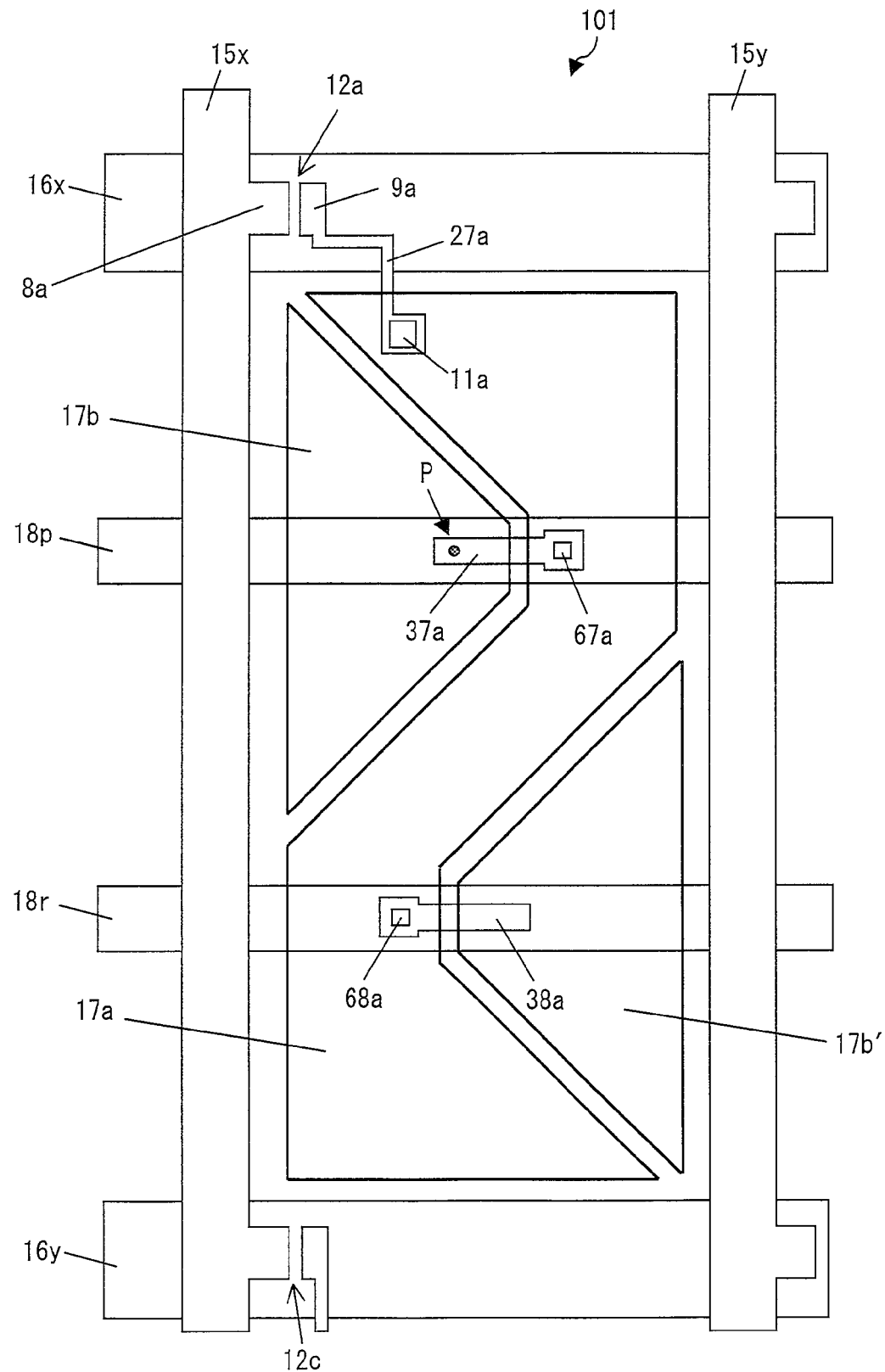
FIG. 37 is a plan view showing a specific example of the liquid crystal panel shown in FIG. 36.

FIG. 37 shows a specific example of the pixel 101 of FIG. 36. As shown in FIG. 37, the transistor 12a is disposed near an intersection between the data signal line 15x and the scanning signal line 16x. Provided in a pixel region defined by the two signal lines (15x and 16x) are: the pixel electrode 17b, which takes the shape of a trapezoid; the pixel electrode 17b', located at an angle of substantially 315 degrees to the row-wise direction of the retention capacitor wire 18p, which takes the shape of a trapezoid that coincides substantially with a shape that is obtained by rotating the pixel electrode 17b 180 degrees; and the pixel electrode 17a, which is disposed in a region excluding the pixel electrodes 17b and 17b' in such a way as to fit (engage) with the shapes of the pixel electrodes 17b and 17b'. Further, the retention capacitor wires 18p and 18r are disposed in parallel with each other. The retention capacitor wire 18p extends along the row-wise direction in such a way as to pass transversely across the pixel electrodes 17a and 17b, and the retention capacitor wire 18r extends along the row-wise direction in such a way as to pass transversely across the pixel electrodes 17a and 17b'.

Such a configuration allows the pixel electrodes 17b, 17a, and 17b' to be disposed in such a way that part of the pixel electrode 17b is close to the scanning signal wire 16x, that part of the pixel electrode 17b' is close to the scanning signal wire 16y, that one end of the pixel electrode 17a is close to the scanning signal line 16, and that the other end of the pixel electrode 17a is close to the scanning signal line 16y. In other words, at least part of the pixel electrode 17b and at least part of the pixel electrode 17b' are close to the scanning signal lines 16x and 16y, respectively, and the pixel electrode 17a extends along the column-wise direction in such a way as to connect the scanning signal wires 16x and 16y to each other. The capacitor electrode 37a is disposed in such a way as to overlap the retention capacitor wire 18p and the pixel electrodes 17a and 17b, and the capacitor electrode 38a is disposed in such a way as to overlap the retention capacitor wire 18r and the pixel electrodes 17a and 17b'. More specifically, the capacitor electrode 37a extends along the same direction as the direction along which the retention capacitor wire 18p extends, and overlaps the retention capacitor wire 18p and the pixel electrodes 17a and 17b. The capacitor electrode 38a, disposed in parallel with the capacitor electrode 37a to take a shape that coincides substantially with a shape that is obtained by rotating the capacitor electrode 37a 180 degrees, extends along the same direction as the direction along which the retention capacitor wire 18r extends, and overlaps the retention capacitor wire 18r and the pixel electrodes 17a and 17b'.

The transistor 12a has its source and drain electrode 8a and 9a formed on the scanning signal line 16x, with the source electrode 8a connected to the data signal line 15x. The drain electrode 9a is connected to a drain drawing wire 27a, and the drain drawing wire 27a is connected to the pixel electrode 17a via a contact hole 11a. Further, the capacitor electrode 37a is connected to the pixel electrode 17a via a contact hole 67a and overlaps the pixel electrode 17b via an interlayer insulating film, with the coupling capacitor Cab1 (see FIG. 36) between the pixel electrodes 17a and 17b formed in the overlap section between the capacitor electrode 37a and the pixel electrode 17b. Further, the capacitor electrode 38a is connected to the pixel electrode 17a via a contact hole 68a and overlaps the pixel electrode 17b' via the interlayer insulting film, with the coupling capacitor Cab2 (see FIG. 36) between the pixel electrodes 17a and 17b' formed in the overlap section between the capacitor electrode 38a and the pixel electrode 17b'. Further, the capacitor electrode 37a overlaps the retention capacitor wire 18p via a gate insulating film, with most of the retention capacitor Cha1 (see FIG. 36) formed in the overlap section between the capacitor electrode 37a and the retention capacitor wire 18p, and the capacitor electrode 38a overlaps the retention capacitor wire 18r via the gate insulating film, with most of the retention capacitor Cha2 (see FIG. 36) formed in the overlap section between the capacitor electrode 38a and the retention capacitor wire 18r. Further, the pixel electrode 17b and the retention capacitor wire 18p overlap each other via the interlayer insulating film and the gate insulating film, with the retention capacitor Chb1 (see FIG. 36) formed in the overlap section between the pixel electrode 17b and the retention capacitor wire 18p, and the pixel electrode 17b' and the retention capacitor wire 18r overlap each other via the interlayer insulating film and the gate insulating film, with the retention capacitor Chb2 (see FIG. 36) formed in the overlap section between the pixel electrode 17b' and the retention capacitor wire 18r.

In the liquid crystal panel of FIG. 37, the subpixel including the pixel electrode 17a serves as "bright", and the subpixels including the pixel electrodes 17b and 17b' serve as "dark".

In the liquid crystal panel of FIG. 37, the pixel electrode 17a and the pixel electrodes 17b and 17b' are connected (capacitively coupled) to each other via the two parallel coupling capacitors (Cab1 and Cab2). Therefore, if the capacitor electrode 37a and the pixel electrode 17b are short-circuited at P in FIG. 37 (during the manufacturing process or the like), for example, the pixel electrodes 17b, 17a, and 17b' can be kept capacitively coupled to each other by carrying out a correcting step of cutting off the capacitor electrode 37a with a laser between the contact hole 67a and the short-circuited site. Furthermore, even if the contact hole 67a is malformed during the manufacturing process or the like, the pixel electrodes 17b, 17a, and 17b' can be kept capacitively coupled to each other. It should be noted that if the capacitor electrode 38a and the pixel electrode 17b' are short-circuited, the capacitor electrode 38a needs only be cut off with a laser between the contact hole 68a and the short-circuited site.

It should be noted that if the capacitor electrode 37a and the retention capacitor wire 18p or the pixel electrode 17b are short-circuited, the pixel electrodes 17b, 17a, and 17b' can also be kept capacitively coupled to each other by removing (trimming) a part of the pixel electrode 17a inside of the contact hole 67a by laser or the like to electrically disconnect the pixel electrode 17a and the capacitor electrode 37a from each other.

For the reasons stated above, the present embodiment can increase yields of manufacture of liquid crystal panels and active matrix substrates for use therein.

Further, in the liquid crystal panel of FIG. 37, the capacitor electrode 37a extends along the same direction as the direction along which the retention capacitor wire 18*p* extends, and overlaps the retention capacitor wire 18*p* and the pixel electrodes 17*a* and 17*b*. The capacitor electrode 38*a*, taking a shape that coincides substantially with a shape that is obtained by rotating the capacitor electrode 37*a* 180 degrees, extends along the same direction as the direction along which the retention capacitor wire 18*r* extends, and overlaps the retention capacitor wire 18*r* and the pixel electrodes 17*a* and 17*b'*.

Further, in the liquid crystal panel of FIG. 32, the capacitor electrodes 37*a* overlaps the pixel electrode 17*b* and the retention capacitor wire 18*p*, and the capacitor electrodes 38*a* overlaps the pixel electrode 17*b'* and the retention capacitor wire 18*r*. By thus making the capacitor electrodes 37*a* and 38*a*, which are provided to form coupling capacitors, function also as electrodes to form retention capacitors, an increase in aperture ratio can be brought about.

Furthermore, since the capacitor electrodes 37*a* and 38*a* are shaped to extend along the row-wise direction and disposed in such a way as to overlap the retention capacitor wires 18*p* and 18*r*, the widths of the retention capacitor wires 18*p* and 18*r* can be narrowed. This brings about a further increase in aperture ratio.

Figure 38:
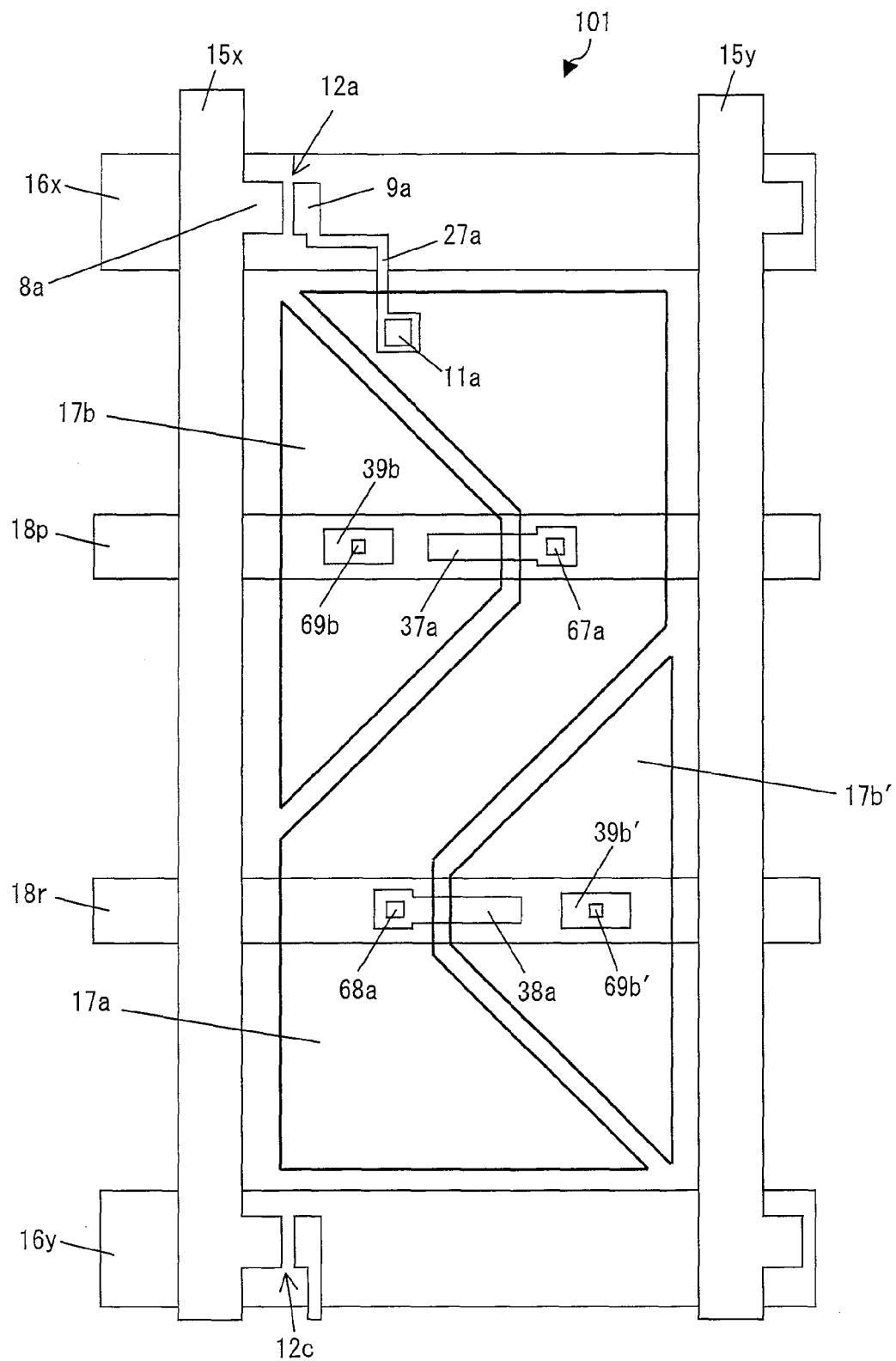
FIG. 38 is a plan view showing another specific example of the liquid crystal panel shown in FIG. 36.

It should be noted here that from a standpoint of reliability, it is preferable that the values of capacitance of the retention capacitors Chb1 and Chb2 be large. Accordingly, the retention capacitors Chb1 and Chb2 may be formed as configured in FIG. 38. That is, as shown in FIG. 38, a retention capacitor electrode 39*b*, formed in the same layer as the capacitor electrodes 37*a*, is connected to the pixel electrode 17*b* via a contact hole 69*b*, whereby the retention capacitor Chb1 is formed between the retention capacitor electrode 39*b* and the retention capacitor wire 18*p*, and a retention capacitor electrode 39*b'*, formed in the same layer as the capacitor electrodes 38*a*, is connected to the pixel electrode 17*b'* via a contact hole 69*b'*, whereby the retention capacitor Chb2 is formed between the retention capacitor electrode 39*b'* and the retention capacitor wire 18*r*. In the case of this configuration, as compared to the case of FIG. 37 where the retention capacitors Chb1 and Chb2 are formed between the pixel electrodes 17*b* and 17' and the retention capacitor wires 18*p* and 18*r*, respectively, a smaller (thinner) insulating film can be sandwiched therebetween; therefore, the value of retention capacitance can be gained. Further, since the retention capacitors Chb1 and Chb2 can be formed by a thinner insulating film, the widths of the retention capacitor wires 18*p* and 18*r* can be narrowed without changing the magnitude of value of retention capacitance. This brings about an increase in aperture ratio without erosion of reliability.

Figure 39:
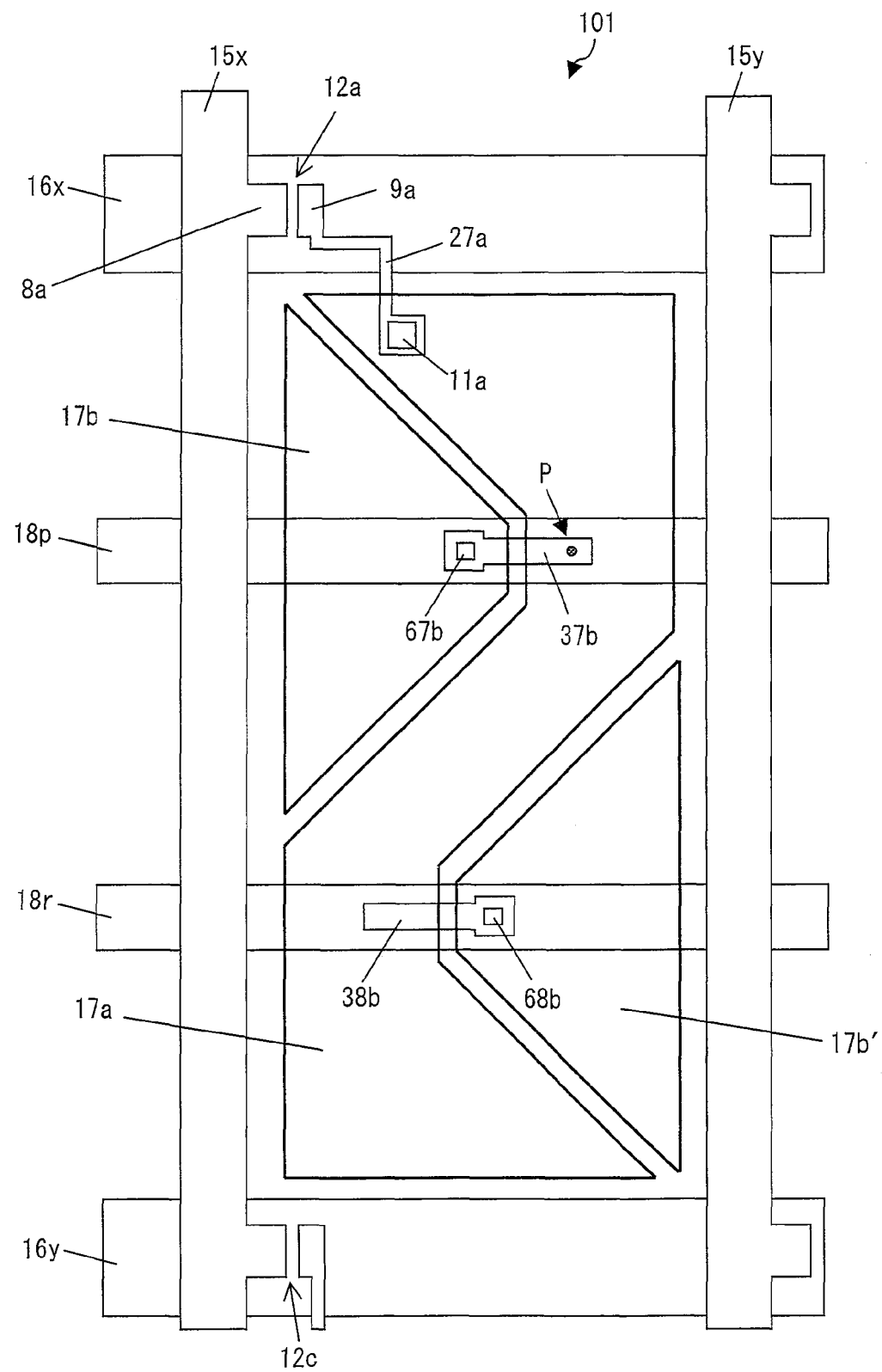
FIG. 39 is a plan view showing a modification of the liquid crystal panel shown in FIG. 36.

It should be noted here that although each of those liquid crystal panels described above is configured such that a capacitor electrode is electrically connected to a pixel electrode corresponding to a subpixel that serves as a bright subpixel, this does not imply any limitation. The present liquid crystal panel may be configured such that a capacitor electrode is electrically connected to a pixel electrode corresponding to a subpixel that serves as a dark subpixel. FIG. 39 shows a specific example of the pixel 101 thus configured.

In the liquid crystal panel of FIG. 39, the transistor 12*a* is disposed near an intersection between the data signal line 15*x* and the scanning signal line 16*x*. Provided in a pixel region defined by the two signal lines (15*x* and 16*x*) are: the pixel electrode 17*b*, which takes the shape of a trapezoid; the pixel electrode 17*b'*, located at an angle of substantially 315 degrees to the row-wise direction of the retention capacitor wire 18*p*, which takes the shape of a trapezoid that coincides substantially with a shape that is obtained by rotating the pixel electrode 17*b* 180 degrees; and the pixel electrode 17*a*, which is disposed in a region excluding the pixel electrodes 17*b* and 17*b'* in such a way as to fit (engage) with the shapes of the pixel electrodes 17*b* and 17*b'*. Further, the retention capacitor wires 18*p* and 18*r* are disposed in parallel with each other. The retention capacitor wire 18*p* extends along the row-wise direction in such a way as to pass transversely across the pixel electrodes 17*a* and 17*b*, and the retention capacitor wire 18*r* extends along the row-wise direction in such a way as to pass transversely across the pixel electrodes 17*a* and 17*b'*.

Such a configuration allows the pixel electrodes 17*b*, 17*a*, and 17*b'* to be disposed in such a way that part of the pixel electrode 17*b* is close to the scanning signal wire 16*x*, that part of the pixel electrode 17*b'* is close to the scanning signal wire 16*y*, that one end of the pixel electrode 17*a* is close to the scanning signal line 16, and that the other end of the pixel electrode 17*a* is close to the scanning signal line 16*y*. In other words, at least part of the pixel electrode 17*b* and at least part of the pixel electrode 17*b'* are close to the scanning signal lines 16*x* and 16*y*, respectively, and the pixel electrode 17*a* extends along the column-wise direction in such a way as to connect the scanning signal wires 16*x* and 16*y* to each other. The capacitor electrode 37*b* is disposed in such a way as to overlap the retention capacitor wire 18*p* and the pixel electrodes 17*a* and 17*b*, and the capacitor electrode 38*b* is disposed in such a way as to overlap the retention capacitor wire 18*r* and the pixel electrodes 17*a* and 17*b'*. More specifically, the capacitor electrode 37*b* extends along the same direction as the direction along which the retention capacitor wire 18*p* extends, and overlaps the retention capacitor wire 18*p* and the pixel electrodes 17*a* and 17*b*. The capacitor electrode 38*a*, disposed in parallel with the capacitor electrode 37*b* to take a shape that coincides substantially with a shape that is obtained by rotating the capacitor electrode 37*b* 180 degrees, extends along the same direction as the direction along which the retention capacitor wire 18*r* extends, and overlaps the retention capacitor wire 18*r* and the pixel electrodes 17*a* and 17*b'*.

The transistor 12*a* has its source and drain electrodes 8*a* and 9*a* formed on the scanning signal line 16*x*, with the source electrode 8*a* connected to the data signal line 15*x*. The drain electrode 9*a* is connected to a drain drawing wire 27*a*, and the drain drawing wire 27*a* is connected to the pixel electrode 17*a* via a contact hole 11*a*. Further, the capacitor electrode 37*b* is connected to the pixel electrode 17*b* via a contact hole 67*b* and overlaps the pixel electrode 17*a* via an interlayer insulating film, with the coupling capacitor Cab1 (see FIG. 36) between the pixel electrodes 17*a* and 17*b* formed in the overlap section between the capacitor electrode 37*b* and the pixel electrode 17*a*. Further, the capacitor electrode 38*b* is connected to the pixel electrode 17*b'* via a contact hole 68*b* and overlaps the pixel electrode 17*a* via the interlayer insulting film, with the coupling capacitor Cab2 (see FIG. 36) between the pixel electrodes 17*a* and 17*b'* formed in the overlap section between the capacitor electrode 38*b* and the pixel electrode 17*a*. Further, the capacitor electrode 37*b* overlaps the retention capacitor wire 18*p* via a gate insulating film, with most of the retention capacitor Chb1 (see FIG. 36) formed in the overlap section between the capacitor electrode 37*b* and the retention capacitor wire 18*p*, and the capacitor electrode 38*b* overlaps the retention capacitor wire 18*r* via the gate insulating film, with most of the retention capacitor Chb2 (see FIG. 36) formed in the overlap section between the capacitor electrode 38*b* and the retention capacitor wire 18*r*. Further, the pixel electrode 17*a* and the retention capacitor wire 18*p* overlap each other via the interlayer insulating film and the gate insulating film, with the retention capacitor Cha1 (see FIG. 36) formed in the overlap section between the pixel electrode 17a and the retention capacitor wire 18p, and the pixel electrode 17a and the retention capacitor wire 18r overlap each other via the interlayer insulating film and the gate insulating film, with the retention capacitor Cha2 (see FIG. 36) formed in the overlap section between the pixel electrode 17a and the retention capacitor wire 18r.

Thus, in the liquid crystal panel of FIG. 39, the subpixel including the pixel electrode 17a serves as "bright", and the subpixels including the pixel electrodes 17b and 17b' serve as "dark".

In the liquid crystal panel of FIG. 39, the pixel electrode 17a and the pixel electrodes 17b and 17b' are connected (capacitively coupled) to each other via the two parallel coupling capacitors (Cab1 and Cab2). Therefore, if the capacitor electrode 37b and the pixel electrode 17a are short-circuited at P in FIG. 39 (during the manufacturing process or the like), for example, the pixel electrodes 17b, 17a, and 17b' can be kept capacitively coupled to each other by carrying out a correcting step of cutting off the capacitor electrode 37b with a laser between the contact hole 67b and the short-circuited site. Alternatively, if the capacitor electrode 38b and the pixel electrode 17a are short-circuited, the capacitor electrode 38b needs only be cut off with a laser between the contact hole 68b and the short-circuited site.

It should be noted, needless to say, that such a configuration as shown in FIG. 39 that a capacitor electrode is electrically connected to a pixel electrode corresponding to a subpixel that serves as a dark subpixel can be applied to those liquid crystal panels described above.

Figure 40:
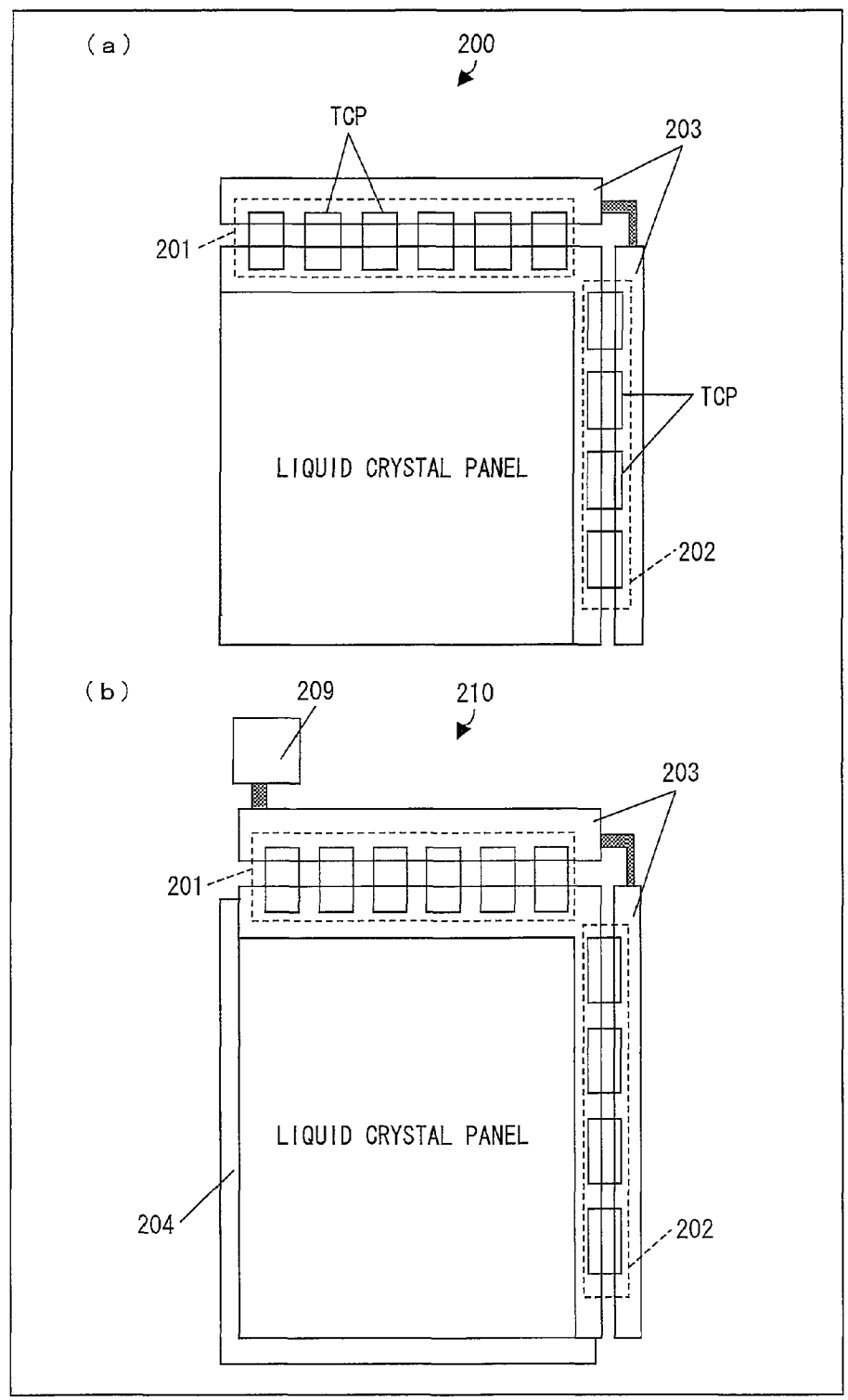
FIG. 40 includes (a) a schematic view showing the configuration of the present liquid crystal display unit and (b) a schematic view showing the configuration of the present liquid crystal display device.

Finally, example configurations of a liquid crystal display unit and a liquid crystal display device according to the present invention are described. In each of the embodiments above, the present liquid crystal display unit and liquid crystal display device are configured as described below. That is, two polarizing plates A and B are attached onto both surfaces of the present liquid crystal panel, respectively, so that the polarization axis of the polarizing plate A and the polarization axis of the polarizing plate B are orthogonal to each other. It should be noted that an optical compensation sheet may be laminated on each of the polarizing plates as needed. Next, as shown in (a) of FIG. 40, drivers (a gate driver 202 and a source driver 201) are connected. An example is described here where the drivers are connected according to TCP (tape carrier package). First, an ACF (anisotropic conductive film) is pressure-bonded temporarily to terminal parts of the liquid crystal panel. Then, TCPs having the drivers mounted thereon are punched out from the carrier tape, aligned with the panel terminal electrodes, heated, and bonded permanently. After that, circuit boards 203 (PWBs: printed wiring boards) via which the driver TCPs are coupled to each other and the input terminals of the TCPs are connected to each other via the ACF, whereby a liquid crystal display unit 200 is completed. After that, as shown in (b) of FIG. 40, a display control circuit 209 is connected to each of the drivers (201 and 202) of the liquid crystal display unit via the circuit boards 203, and the liquid crystal display unit is integrated with an illumination device (backlight unit), whereby a liquid crystal display device 210 is obtained.

The term "polarity of a potential" here means a potential equal to or higher (positive) than a reference potential or a potential equal to or lower (negative) than the reference potential. It should be noted here that the reference potential may be either Vcom (common potential), which is the potential of a common electrode (counter electrode), or any other potential.

Figure 41:
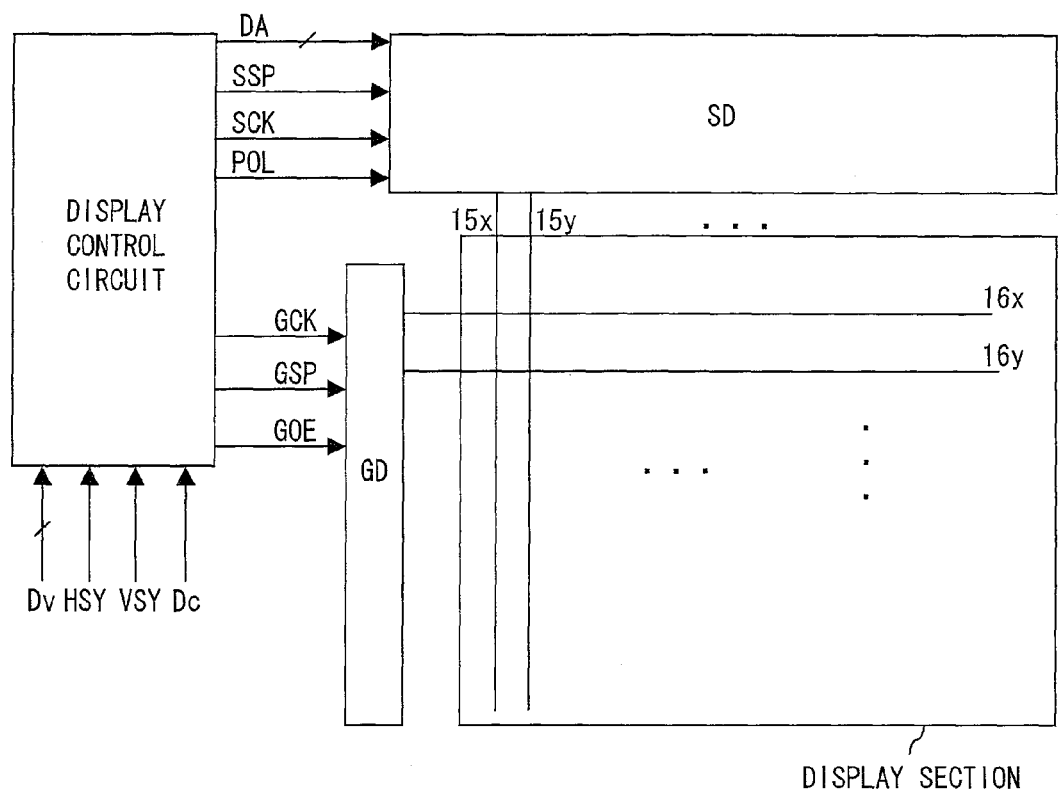
FIG. 41 is a block diagram explaining the overall configuration of the present liquid crystal display device.

FIG. 41 is a block diagram showing the configuration of the present liquid crystal display device. As shown in FIG. 41, the present liquid crystal display device includes a display section (liquid crystal panel), a source driver (SD), a gate driver (GD), and a display control circuit. The source driver drives data signal lines. The gate driver drives scanning signal lines. The display control circuit controls the source driver and the gate driver.

The display control circuit receives from an outside signal source (e.g., a tuner) a digital video signal Dv representing an image to be displayed, horizontal and vertical synchronization signals HSY and VSY corresponding to the digital video signal Dv, and a control signal Dc in accordance with which a display operation is controlled. Further, in accordance with these signals Dv, HSY, VSY, and Dc thus received, the display control circuit generates and outputs, as signals in accordance with which the image represented by the digital video signal Dv is displayed, a data start pulse signal SSP, a data clock signal CSK, a charge share signal sh, a digital image signal DA representing the image to be displayed (which corresponds to the video signal Dv), a gate start pulse signal GSP, a gate clock signal GCK, and a gate driver output control signal (scanning signal output control signal) GOE.

More specifically, after subjecting the video signal Dv to timing adjustment or the like as needed in an internal memory, the display control circuit outputs it as the digital image signal DA, generates the data clock signal SCK as a signal composed of pulses corresponding to pixels of the image represented by the digital image signal DA, generates the data start pulse signal SSP as a signal that is at a high level (H level) in accordance with the horizontal synchronization signal HSY only for a predetermined period of time in each horizontal scanning period, generates the gate start pulse signal GSP as a signal that is at a H level in accordance with the vertical synchronization signal VSY only for a predetermined period of time in each frame period (vertical scanning period), generates the gate clock signal GCK in accordance with the horizontal synchronization signal HSY, and generates the charge share signal sh and the gate driver output control signal GOE in accordance with the horizontal synchronization signal HSY and the control signal Dc.

Among the signals thus generated by the display control circuit, the digital image signal DA, the charge share signal sh, a signal POL in accordance with which the polarity of a signal potential (data signal potential) is controlled, the data start pulse signal SSP, and the data clock signal SCK are inputted to the source driver, and the data start pulse signal GSP, the gate clock signal GCK, and the data driver output control signal GOE are inputted to the gate driver.

In accordance with the digital image signal DA, the data clock signal SCK, the charge share signal sh, the data start pulse signal SSP, and the reverse polarity signal POL, the source driver generates, in sequence for each horizontal scanning period, analog potentials (signal potentials) corresponding to pixel values in each scanning signal line of the image represented by the digital image signal DA, and outputs these data signals to the data signal lines (e.g., 15x, 15y).

In accordance with the gate start pulse signal GSP, the gate clock signal GCK, and the gate driver output control signal GOE, the gate driver generates gate-on-pulse signals and output them to the scanning signal lines, thereby selectively driving the scanning signal lines.

By the source driver and gate driver thus driving the data signal lines and scanning signal lines of the display section (liquid crystal panel), the signal potentials are written from the data signal lines to the pixel electrodes through the transistors (TFTs) connected to the scanning signal lines thus selected. This allows a voltage to be applied to the liquid crystal layer of each subpixel, whereby the amount of transmission of light from the backlight is controlled, and the image represented by the digital video signal Dv is displayed by the subpixels.

Figure 42:
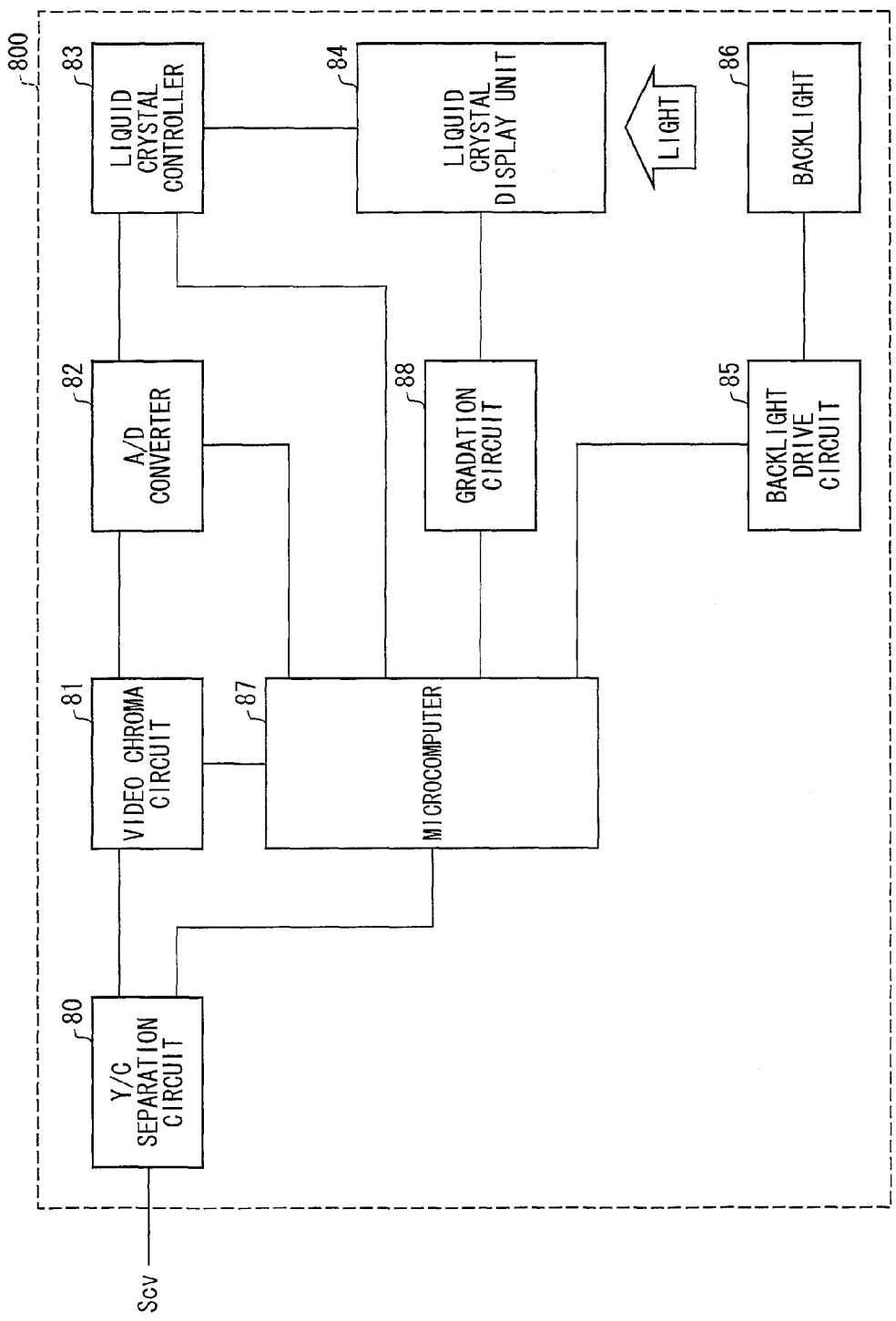
FIG. 42 is a block diagram explaining the functions of the present liquid crystal display device.

The following describes an example configuration where the present liquid crystal display device is applied to a television receiver. FIG. 42 is a block diagram showing a liquid crystal display device 800 for use in a television receiver. The liquid crystal display device 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. It should be noted that the liquid crystal display unit 84 is constituted by a liquid crystal panel and source and gate drivers by which the liquid crystal panel is driven.

In the liquid crystal display device 800 thus configured, first, the Y/C separation circuit 80 receives a composite color video signal Scv as a television signal from an outside source and separates it into a luminance signal and a color signal. The luminance signal and the color signal are converted by the video chroma circuit 81 into an analog RGB signal corresponding to the three primary colors of light, and this analog RGB signal is further converted by the A/D converter 82 into a digital RGB signal. This digital RGB signal is inputted to the liquid crystal controller 83. Further, the Y/C separation circuit 80 also takes out horizontal and vertical synchronization signals from the composite color video signal Scv sent from the outside source, and these synchronization signals are also inputted to the liquid crystal controller 83 via the microcomputer 87.

The liquid crystal display unit 84 receives the digital RGB signal from the liquid crystal controller 83 at a predetermined timing together with a timing signal based on the synchronization signals. Further, the gradation circuit 88 generates the respective gradation potentials of the three primary colors R, G, and B of the color display, and those gradation potentials are also supplied to the liquid crystal display unit 84. The liquid crystal display unit 84 uses the internal source driver, the internal gate driver, etc. to generate driving signals (data signals, which are equivalent to signal potentials, scanning signals, etc.) in accordance with the RGB signal, the timing signal, and the gradation potentials, and uses the internal liquid crystal panel to display a color image in accordance with those driving signals. It should be noted that in order for the liquid crystal display unit 84 to display an image, it is necessary to irradiate the liquid crystal panel with light from behind it inside of the liquid crystal display unit. In this liquid crystal display device 800, the backlight drive circuit 85 drives the backlight 86 under the control of the microcomputer 87, whereby the rear surface of the liquid crystal panel is irradiated with light. Control of the whole system, including the process described above, is carried out by the microcomputer 87. It should be noted that usable examples of video signals (composite color video signals) that are inputted from outside sources include not only video signals based on television broadcasts, but also video signals taken by cameras, video signals that are supplied via Internet lines, etc. This liquid crystal display device 800 can display images based on various video signals.

Figure 43:
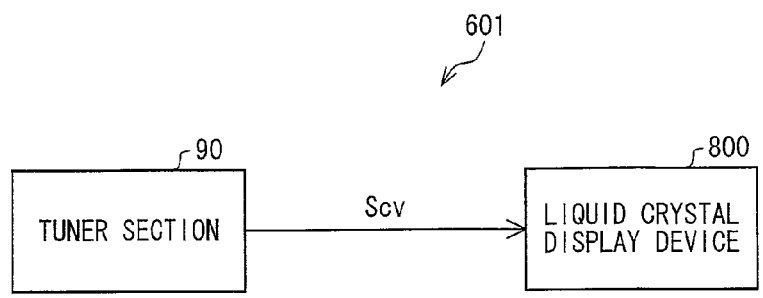
FIG. 43 is a block diagram explaining the functions of the present television receiver.

For the liquid crystal display device 800 to display an image based on a television broadcast, the present television receiver 601 is configured by connecting a tuner section 90 to the liquid crystal display device 800 as shown in FIG. 43. This tuner section 90 extracts a signal of a channel to be received from among waves (high-frequency signals) received by an antenna (not illustrated), converts it into an intermediate frequency signal, and detects this intermediate frequency signal, thereby taking out a composite color video signal Scv as a television signal. This composite color video signal Scv is inputted to the liquid crystal display device 800 as already mentioned, and the liquid crystal display device 800 displays an image based on this composite color video signal Scv.

Figure 44:
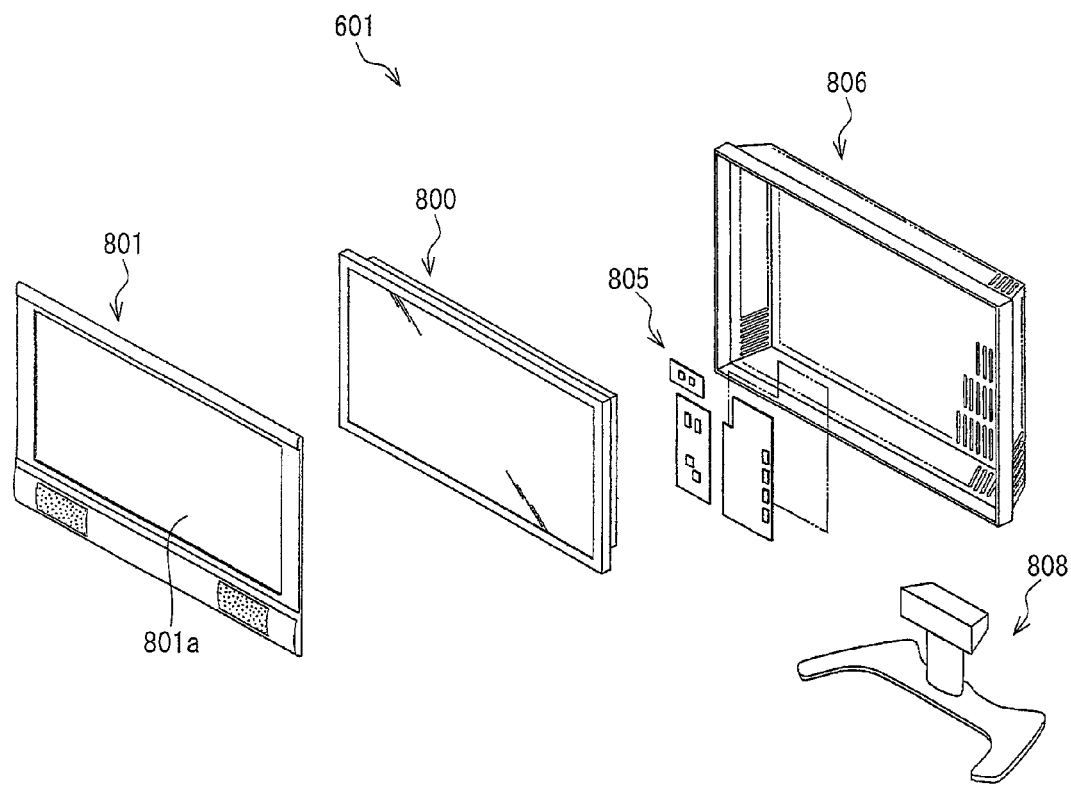
FIG. 44 is an exploded perspective view showing the configuration of the present television receiver.

FIG. 44 is an exploded perspective view showing an example configuration of the present television receiver. As shown in FIG. 44, the present television receiver 601 has as its components a first housing 801 and a second housing 806 in addition to the liquid crystal display device 800, with the liquid crystal display device 800 sandwiched between the first and second housings 801 and 806 in such a way as to be covered thereby. The first housing 801 is formed with an opening 801a through which an image displayed by the liquid crystal display device 800 is transmitted. Further, the second housing 806, which serves to cover the back surface of the liquid crystal display device 800, is provided with an operation circuit 805 for operating the liquid crystal display device 800 and has a supporting member 808 attached to the lower side thereof.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An active matrix substrate of the present invention and a liquid crystal panel including the same are suitable, for example, for a liquid crystal television.

REFERENCE SIGNS LIST

101 to 104 Pixel
12a, 12c, 12A, 12C Transistor
15x, 15y, 15z Data signal line
16x, 16y Scanning signal line
17a, 17b, 17c, 17d Pixel electrode
17A, 17B, 17C, 17D Pixel electrode
17a', 17b', 17c', 17d' Pixel electrode
17A', 17B', 17C', 17D' Pixel electrode
18p, 18q, 18r, 18s Retention capacitor wire
21 Organic gate insulting film
22 Inorganic gate insulting film
24 Semiconductor layer
25 Inorganic interlayer insulating film
26 Organic interlayer insulating film
27a Drain drawing wire
37a, 37b, 38a, 38b Capacitor electrode
39b, 39b' Retention capacitor electrode
51a Thin-film part
84 Liquid crystal display unit
601 Television receiver
800 Liquid crystal display device

What is claimed is:

1. An active matrix substrate including a scanning signal line, a data signal line, and a transistor connected to the scanning signal line and the data signal line, with first and second pixel electrodes provided in each pixel region, the first pixel electrode being connected to the data signal line via the transistor, the active matrix substrate comprising first and second capacitor electrodes electrically connected to one of the first and second pixel electrodes, and a capacitor being formed between the other one of the first and second pixel electrodes and the first capacitor electrode, a capacitor being formed between the other pixel electrode and the second pixel electrode, wherein at least part of the first capacitor electrode overlaps the other pixel electrode via an interlayer insulating film covering a channel of the transistor, and at least part of the second capacitor electrode overlaps the other pixel electrode via the interlayer insulating film, the interlayer insulating film is composed of an inorganic insulating film and an organic insulating film that is thicker than the inorganic insulating film, the interlayer insulating film has its organic insulating film removed in at least part of the interlayer insulating film that overlaps the first capacitor electrode and in at least part of the interlayer insulating film that overlaps the second capacitor electrode, the interlayer insulating film has a thin-film part, obtained by removing the organic insulating film, which includes a region that overlaps part of the first capacitor electrode and part of the second capacitor electrode, the first and second capacitor electrodes are disposed side by side along the direction along which the scanning signal line extends, and the first capacitor electrode straddles one side of the thin-film part, and the second capacitor electrode straddles a side opposite to that side.

2. The active matrix substrate as set forth in claim 1, wherein one conducting electrode of the transistor, the first capacitor electrode, and the second capacitor electrode exist in one layer.

3. The active matrix substrate as set forth in claim 1, wherein:
   each of the first and second pixel electrodes has an outer periphery consisting of a plurality of sides;
   one of the sides of the first pixel electrode and one of the sides of the second pixel electrode are adjacent to each other; and
   each of the first and second pixel electrodes is disposed in such a way as to overlap a space between the two adjacent sides, the first pixel electrode, and the second pixel electrode.

4. The active matrix substrate as set forth in claim 1, wherein:
   the transistor has one conducting electrode connected to the first pixel electrode via a contact hole, with the conducting electrode connected to the first capacitor electrode via a drawing wire drawn from the conducting electrode; and
   the first pixel electrode and the second capacitor electrode are connected to each other via a contact hole.

5. The active matrix substrate as set forth in claim 1, wherein:
   the transistor has one conducting electrode connected to the first pixel electrode via a contact hole, with the first pixel electrode and the first capacitor electrode connected to each other via a contact hole; and
   the first pixel electrode and the second capacitor electrode are connected to each other via a contact hole.

6. The active matrix substrate as set forth in claim 1, wherein:
   the transistor has one conducting electrode connected to the first pixel electrode via a contact hole; and
   the second pixel electrode and the first capacitor electrode are connected to each other via a contact hole, with the second pixel electrode and the second capacitor electrode connected to each other via a contact hole.

7. The active matrix substrate as set forth in claim 1, wherein the first and second pixel electrode are arranged along a row-wise direction, it being assumed that the row-wise direction is a direction along which the scanning signal line extends.

8. The active matrix substrate as set forth in claim 7, wherein as for two pixel regions that are adjacent to each other along the row-wise direction, the pixel electrode in one of the pixel regions and the second pixel electrode in the other pixel region are adjacent to each other along the row-wise direction.

9. The active matrix substrate as set forth in claim 1, wherein the first pixel electrode surrounds the second pixel electrode.

10. The active matrix substrate as set forth in claim 1, wherein the second pixel electrode surrounds the first pixel electrode.

11. The active matrix substrate as set forth in claim 1, further comprising a retention capacitor wire that forms a capacitor with the first pixel electrode or an electric conductor electrically connected the first pixel electrode and forms a capacitor with the second pixel electrode or an electric conductor electrically connected the second pixel electrode.

12. The active matrix substrate as set forth in claim 11, wherein the retention capacitor wire extends along the same direction as the scanning signal line in such a way as to pass transversely across the center of the pixel region.

13. The active matrix substrate as set forth in claim 11, wherein each of the first and second capacitor electrodes forms a capacitor with the retention capacitor wire.

14. The active matrix substrate as set forth in claim 1, wherein the thin-film part overlaps either the first or second pixel electrode.

15. The active matrix substrate as set forth in claim 1, wherein a space between the first and second pixel electrodes functions as an alignment controlling structure.

16. The active matrix substrate as set forth in claim 1, wherein:
   the first pixel electrode surrounds the second pixel electrode;
   the second pixel electrode has an outer periphery including two sides that are parallel to each other, and the first pixel electrode has an outer periphery including a side facing one of the two sides across a first space and a side facing the other side across a second space;
   the first capacitor electrode is disposed in such a way as to overlap the first pixel electrode, the first space, and the second pixel electrode, and the second capacitor electrode is disposed in such a way as to overlap the second pixel electrode, the second space, and the first pixel electrode.

17. A liquid crystal panel comprising an active matrix substrate as set forth in claim 1.

18. A liquid crystal display unit comprising:
   a liquid crystal panel as set forth in claim 17; and
   a driver.

19. A liquid crystal display device comprising:
   a liquid crystal display unit as set forth in claim 18; and
   a light source device.

20. A television receiver comprising:
   a liquid crystal display device as set forth in claim 19; and
   a tuner section for receiving a television broadcast.

* * * * *